United States Patent
Ohmori et al.

(10) Patent No.: US 7,448,087 B2
(45) Date of Patent: Nov. 4, 2008

(54) SYSTEM FOR PREVENTING UNAUTHORIZED USE OF RECORDING MEDIA

(75) Inventors: Motoji Ohmori, Hirakata (JP); Kenichi Ueda, Yamatokooriyama (JP); Eiji Ueda, Toyoda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 862 days.

(21) Appl. No.: 10/620,690

(22) Filed: Jul. 17, 2003

(65) Prior Publication Data

US 2004/0039930 A1   Feb. 26, 2004

(30) Foreign Application Priority Data

Jul. 17, 2002   (JP) ............................. 2002-208398

(51) Int. Cl.
*G06F 12/14* (2006.01)
*G06F 7/04* (2006.01)
*G06F 11/30* (2006.01)
*H04L 9/32* (2006.01)
*G08B 29/00* (2006.01)

(52) U.S. Cl. ................. 726/27; 713/189; 713/193; 726/20; 726/35

(58) Field of Classification Search ......... 713/193, 713/186; 726/20, 27, 35
See application file for complete search history.

(56) References Cited

U.S. PATENT DOCUMENTS

| | | | |
|---|---|---|---|
| 5,280,527 A | 1/1994 | Gullman et al. ............. 713/184 |
| 5,293,424 A * | 3/1994 | Holtey et al. ............. 713/193 |
| 5,790,074 A * | 8/1998 | Rangedahl et al. ..... 342/357.13 |
| 6,104,815 A * | 8/2000 | Alcorn et al. ............. 380/251 |
| 6,167,513 A * | 12/2000 | Inoue et al. ................. 713/150 |
| 6,216,007 B1 | 4/2001 | Havinis et al. .......... 455/456.2 |
| 6,230,002 B1 * | 5/2001 | Floden et al. .............. 455/411 |
| 6,311,272 B1 * | 10/2001 | Gressel ...................... 713/186 |
| 6,370,629 B1 * | 4/2002 | Hastings et al. ............. 711/163 |
| 6,466,804 B1 * | 10/2002 | Pecen et al. ................. 455/558 |
| 6,501,380 B1 * | 12/2002 | Jakobsson ................... 340/571 |
| 6,577,274 B1 * | 6/2003 | Bajikar ....................... 342/450 |
| 6,615,264 B1 * | 9/2003 | Stoltz et al. ................ 709/227 |
| 6,763,249 B2 * | 7/2004 | Shirai ........................ 455/558 |
| 6,799,155 B1 * | 9/2004 | Lindemann et al. .......... 703/24 |
| 6,832,721 B2 * | 12/2004 | Fujii ........................... 235/382 |
| 7,092,943 B2 * | 8/2006 | Roese et al. .................. 707/9 |
| 7,093,131 B1 * | 8/2006 | Kobayashi ................. 713/176 |

(Continued)

FOREIGN PATENT DOCUMENTS

EP   1 237 091   9/2002

(Continued)

*Primary Examiner*—Emmanuel L Moise
*Assistant Examiner*—Michael Pyzocha
(74) *Attorney, Agent, or Firm*—Wenderoth, Lind & Ponack, L.L.P.

(57) ABSTRACT

A recording medium is provided which is protected against unauthorized use and has heightened security. The recording medium stores storage authentication information that authenticates a user, and has an area that corresponds to the storage authentication information. The recording medium further includes a tamper-resistant authentication unit that judges whether or not received authentication information that authenticates a user matches the storage authentication information. The authentication unit is prevented from being decoded or tampered by third parties. In addition, it is possible to restrict access to the area according to the content of authentication.

25 Claims, 28 Drawing Sheets

U.S. PATENT DOCUMENTS

| | | | |
|---|---|---|---|
| 7,406,604 B2 * | 7/2008 | Berry et al. | 713/193 |
| 2002/0051540 A1 * | 5/2002 | Glick et al. | 380/258 |
| 2002/0065106 A1 * | 5/2002 | Bishop et al. | 455/558 |
| 2002/0133716 A1 * | 9/2002 | Harif | 713/201 |
| 2003/0115490 A1 * | 6/2003 | Russo et al. | 713/202 |
| 2003/0129973 A1 * | 7/2003 | Oishi et al. | 455/414 |
| 2004/0006710 A1 * | 1/2004 | Pollutro et al. | 713/201 |
| 2004/0014423 A1 * | 1/2004 | Croome et al. | 455/41.2 |

FOREIGN PATENT DOCUMENTS

| | | |
|---|---|---|
| EP | 1 237 327 | 9/2002 |
| WO | 00/02358 | 1/2000 |
| WO | 01/28155 | 4/2001 |

* cited by examiner

| PROCESS NUMBER | PROCESS INFORMATION |
|---|---|
| 1 | "MEMORY A" |
| 2 | "MEMORY A+B" |
| 3 | "MEMORY A","GAME" |
| 4 | "MEMORY A+B","GAME" |
| ⋮ | |

| COMMUNICATION NUMBER | COMMUNICATION INFORMATION |
|---|---|
| 1 | ○○○−○○○−○○○○(CORPORATE) |
| 2 | △△△−△△△−△△△△(PRIVATE 1) |
| 3 | ×××−×××−××××(PRIVATE 2) |
| ⋮ | ⋮ |

| PROCESS NUMBER | | PROCESS INFORMATION |
|---|---|---|
| FIRST NUMBER | SECOND NUMBER | |
| 1 | 1 | "MEMORY B" |
| 1 | 2 | "COMMUNICATION FUNCTION" |
| 1 | 3 | "COMMUNICATION FUNCTION", "ELECTRONIC COMMERCE" |
| 2 | 2 | "COMMUNICATION FUNCTION" |
| 2 | 4 | "MEMORY A+B" |
| 2 | 5 | "MEMORY A+B", "COMMUNICATION FUNCTION" |
| 3 | 3 | "GAME" |
| 3 | 6 | "COMMUNICATION FUNCTION" |
| ... | ... | ... |

| ITEM | DATE/TIME | POSITION |
|---|---|---|
| MOUNTING | 2003/03/01 12:00 | A PREFECTURE B CITY | ← 401
| MOUNTING | 2003/03/01 12:50 | A PREFECTURE B CITY | ← 402
| MOUNTING | 2003/03/01 13:10 | A PREFECTURE C CITY | ← 403
| MOUNTING | 2003/03/01 13:15 | A PREFECTURE C CITY | ← 404
| ... | ... | ... |

| AUTHENTICATION INFORMATION | PROCESS INFORMATION |
|---|---|
| N.A. | "MEMORY A" |
| PW1 | "MEMORY A+B" |
| PW2 | "MEMORY A","GAME" |
| PW3 | "MEMORY A+B","GAME" |

FIG.27

| COMMUNICATION INFORMATION | AUTHENTICATION INFORMATION | PROCESS INFORMATION |
|---|---|---|
| ○○○ | N.A. | "MEMORY A" |
| —○○○○ | PW1 | "MEMORY A+B" |
| —○○○○ | PW2 | "MEMORY A+B", "COMMUNICATION FUNCTION" |
| | PW3 | "MEMORY A+B", "COMMUNICATION FUNCTION", "ELECTRONIC COMMERCE" |

FIG.28

| COMMUNICATION INFORMATION | AUTHENTICATION INFORMATION | PROCESS INFORMATION |
|---|---|---|
| ○○○-○○○-○○○○ (CORPORATE) | PW1 | "COMMUNICATION FUNCTION" |
| | PW2 | "COMMUNICATION FUNCTION", "ELECTRONIC COMMERCE" |
| | N.A. | "MEMORY B" |
| △△△-△△△△-△△△△ (PRIVATE 1) | PW3 | "MEMORY A + MEMORY B" |
| | PW4 | "MEMORY A,B", "COMMUNICATION FUNCTION" |
| ×××-××××-×××× (PRIVATE 2) | PW5 | "COMMUNICATION FUNCTION" |
| | N.A. | "MEMORY A" |

US 7,448,087 B2

SYSTEM FOR PREVENTING UNAUTHORIZED USE OF RECORDING MEDIA

This application is based on an application No. 2002-208398 filed in Japan, the content of which is hereby incorporated by reference.

BACKGROUND OF THE INVENTION (1) Field of the Invention

The present invention relates to a technology for preventing unauthorized use of a recording medium which is mountable to a terminal device.

(2) Description of the Related Art

In recent years, a system has been proposed that enables users to access information recorded on a recording medium with use of a terminal device to which the recording medium is mountable, such as a portable telephone.

JP 2001-134688 is a reference which discloses a system that includes a smartcard and a portable terminal device. Here, the smart card stores thereon user information and information relating to applications to be used, and the portable terminal device is equipped with an authentication unit that authenticates whether the user is authorized to use the portable terminal device.

In this system, when the smart card is mounted to the portable terminal device, authentication is performed to determine whether the user is the authorized user, with use of information inputted through the portable terminal device and information that is on the smart card. When the user is authenticated as the authorized user, the user will be allowed to access information written on the smart card.

However, with the aforementioned technology, the authentication unit within the portable terminal device is not protected against an unauthorized external attack. Therefore, there is a possibility that a malicious third party decodes the authentication unit of the portable terminal, and changes the authentication unit to always authenticate the third party to be the authorized user. Such tampering will allow third parties to access the information recorded on the recording medium.

SUMMARY OF THE INVENTION

The object of the present invention is to provide a recording medium that is protected against unauthorized use, that therefore has heightened security, and further to provide a terminal apparatus, a system, a method, and a program, for preventing unauthorized use of the recording medium.

In order to achieve the stated object, the present invention is a portable recording medium which includes a storage unit which stores therein storage authentication information for authenticating a user and has an area that corresponds to the storage authentication information, a judgment unit operable to judge whether to perform authentication, a reception unit operable to receive reception authentication information that authenticates a user if the judgment unit judges affirmative, an authentication unit that is tamper-resistant and is operable to judge whether or not the received reception authentication information matches the storage authentication information, and a process unit operable to permit use of the area if the reception authentication information is judged to match the storage authentication information.

According to this structure, the recording medium includes therein an authentication unit that is tamper resistant. Because of being tamer-resistant, the authentication unit will be prevented from being decoded or tampered by third parties. Accordingly, the recording medium is protected from third parties illegally using the area within the recording medium.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 5 illustrates the data structure of the process information table T301 of the second storage area 312 according to the first embodiment;

FIG. 13 illustrates the data structure of the communication information table T351 of the third storage area 313A according to the second embodiment;

FIG. 14 illustrates the data structure of the process information table T352 of the second storage area 312A according to the second embodiment;

FIG. 21 illustrates the data structure of the history information table T400 of the history information storage area 354B according to the third embodiment;

FIG. 26 illustrates the data structure of the table consisting of authentication information and process information;

FIG. 27 illustrates the data structure of a table consisting of authentication information, communication information, and process information, where there is only one piece of communication information; and FIG. 28 illustrates the data structure of a table consisting of authentication information, communication information, and process information, where there are a plurality of pieces of communication information.

DETAILED DESCRIPTION OF THE INVENTION

1. The First Embodiment

As the first embodiment according to the present invention, a recording-medium unauthorized use prevention system 1 is described as follows.

1.1 The Structure of the Recording-Medium Unauthorized Use Prevention System 1

Figure 1:
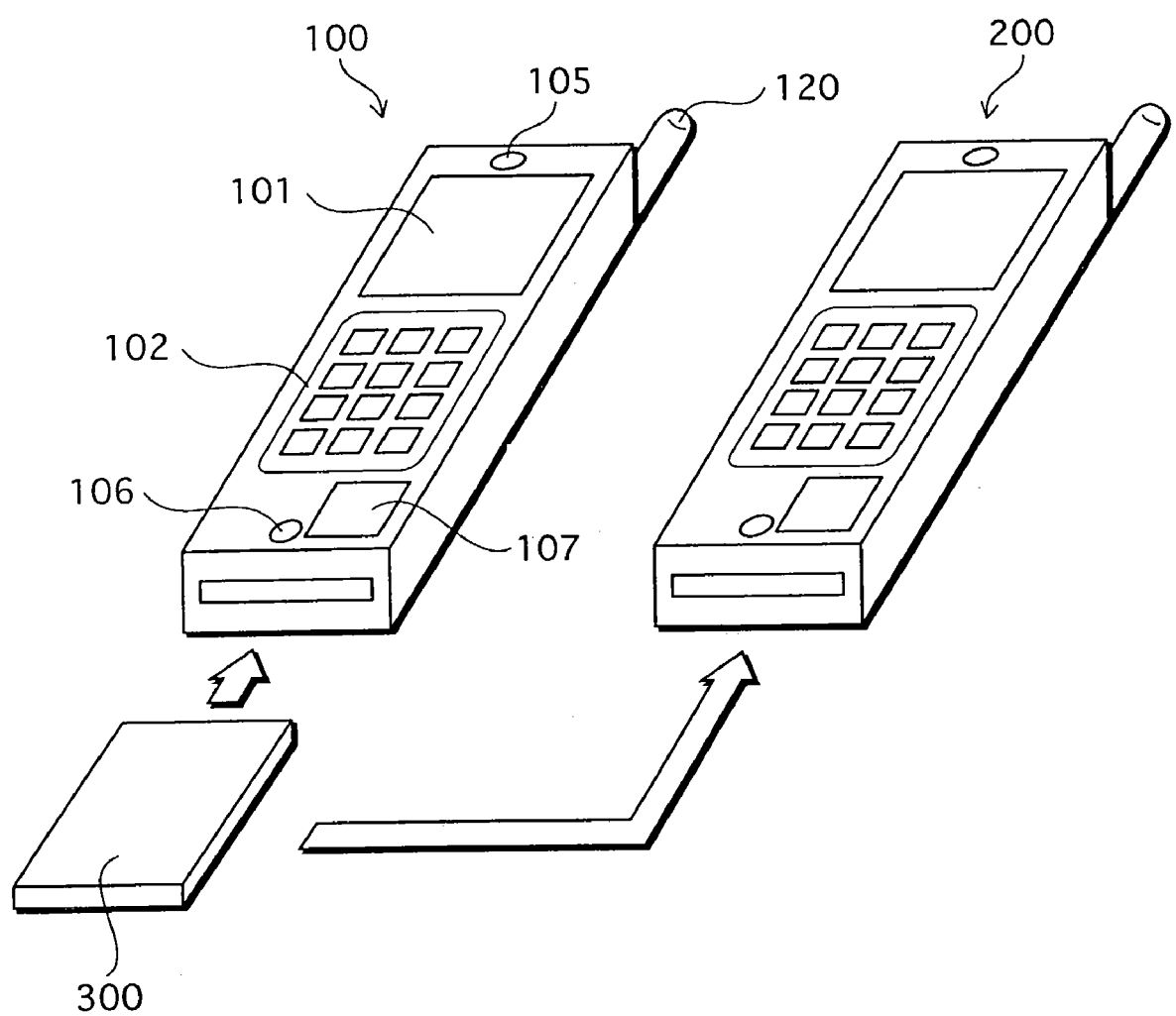
FIG. 1 illustrates an overall structure of the recording-medium unauthorized use prevention system.

As shown in FIG. 1, the recording-medium unauthorized use prevention system 1 is comprised of portable telephones 100 and 200, an IC-function equipped recording medium (herein after simply "recording medium") 300 to which each portable telephone is mountable.

The recording medium 300 is mounted to a portable telephone 100, for use. Likewise, the recording medium 300 can be mounted to the portable telephone 200, for use.

1.2 The Structure of the Portable Telephone 100

In this section, the structure of the portable telephone 100 is described.

Figure 2:
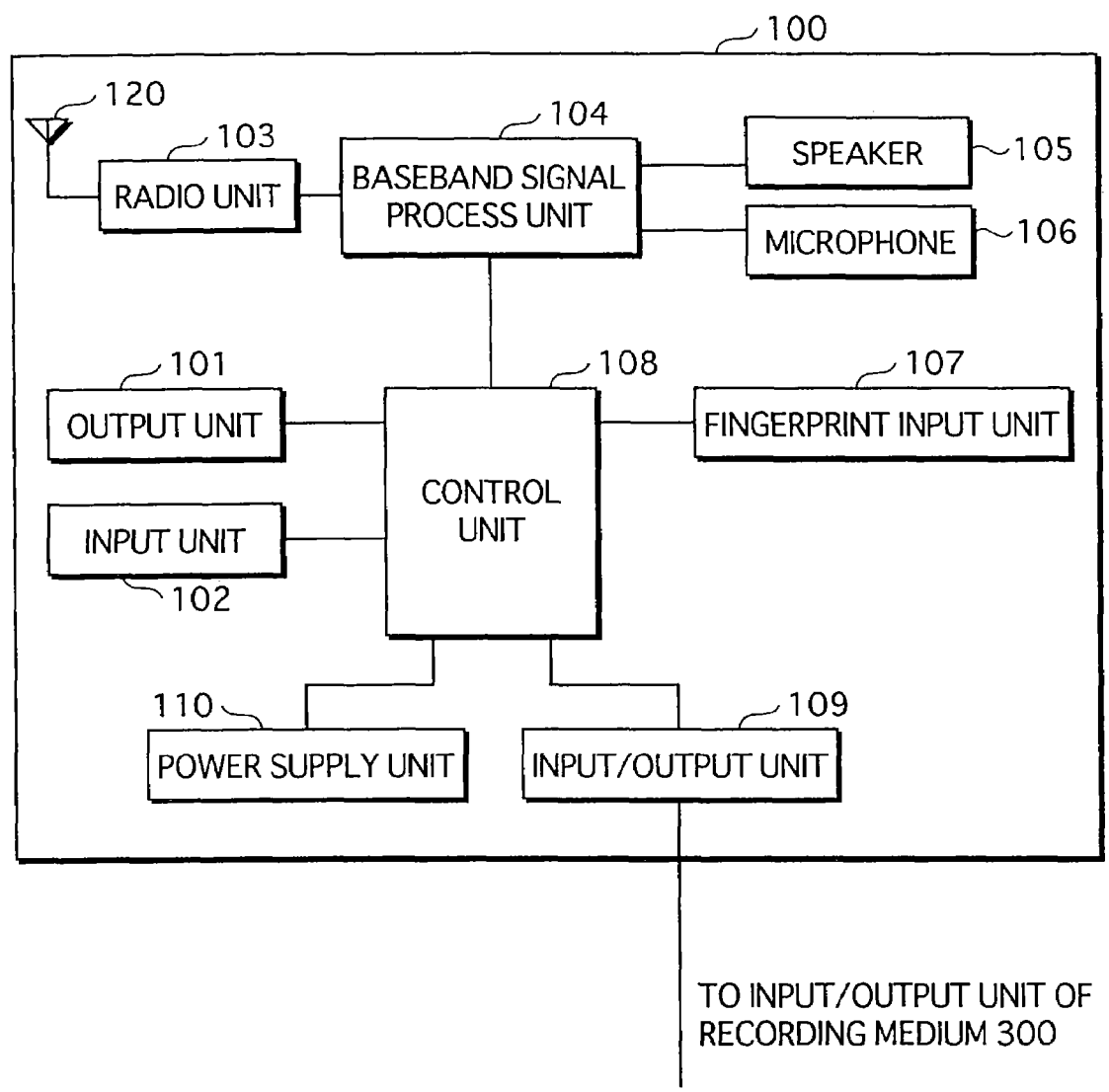
FIG. 2 is a block diagram illustrating the structure of a portable telephone 100 that relates to the first embodiment.

As shown in FIG. 2, the portable telephone 100 is comprised of an output unit 101, an input unit 102, a radio unit 103, a baseband signal process unit 104, a speaker 105, a microphone 106, a fingerprint input unit 107, a control unit 108, an input/output unit 109, and a power supply unit 110.

The portable telephone 100 is specifically a computer system comprised of a microprocessor, a ROM, a RAM, a display unit, and the like. The ROM stores thereon a computer program. The portable telephone 100 pursues its function by the microprocessor performing according to the computer program.

The portable telephone 200 has the same structure as the portable telephone 100, therefore the description thereof is omitted.

(1) The Output Unit 101

The output unit 101 outputs display of data according to the instruction by the control unit 108.

The output unit 101, upon receiving from the control unit 108 input-means information for inquiring about which input means to be used in authentication in relation to the recording medium 300, outputs a message inquiring about which input means to be used in authentication.

The output unit 101, if it receives from the control unit 108 a character input request, outputs a message prompting the user to input character information. The character input request specifically requests input of character information that is composed of a combination of one or more numbers, alphabets, and signs, and is used for proving that he is the authorized user of the recording medium 300. If the output unit 101 receives from the control unit 108 a fingerprint input request, it outputs a message prompting the user to input fingerprint information. The fingerprint input request specifically requests input of fingerprint information that exhibits characteristics of the fingerprint of the user, and is used for proving that the user is the authorized user of the recording medium 300.

Further, the output unit 101, upon receiving authentication-impossible information showing that there is no information within the recording medium 300 that matches the character information, the fingerprint information, or the combination of character information and fingerprint information, having been received from the input unit 102, outputs a message reporting that there is no matching information within the recording medium 300.

(2) The Fingerprint Input Unit 107

The fingerprint input unit 107 has a fingerprint sensor that reads the fingerprint pattern of the user, generates from the fingerprint pattern fingerprint information composed of characteristic points of the fingerprint pattern, and outputs the generated fingerprint information to the control unit 108.

Specifically, the characteristic points of the fingerprint pattern are (1) direction of ridges and bifurcations or the like, and (2) relative position for the end of ridges and bifurcations, or the like.

(3) The Input Unit 102

The input unit 102 is comprised of a touch panel, a keyboard having ten key input function, and the like, and outputs to the control unit 108 an input instruction from the user, the input instruction including coordinates information showing the location at the touch panel that has been pushed, and a key operation signal generated by a key input through the keyboard.

The input unit 102 receives input of authentication-start information that indicates to start authentication in relation to the recording medium 300, and also receives input of other kinds of information. The input unit 102 outputs the authentication-start information and the other kinds of information to the control unit 108.

The input unit 102, when the output unit 101 outputs a message inquiring about an input means of information that is necessary for authentication, receives one of first input information, second input information, and third input information. The first information indicates that information necessary for authentication will be input through the input unit 102; the second input information indicates that such information will be input through the fingerprint input unit 107; and the third input information indicates that such information will be input through both the input unit 102 and the fingerprint input unit 107. The input unit 102 then outputs the received one of the first, second, or third information to the control unit 108.

Furthermore, the input unit 102, when the output unit 101 outputs a message prompting the user to input character information, receives the input of such character information which is used for proving that he is the authorized user of the recording medium 300, and outputs the received character information to the control unit 108.

(4) The Radio Unit 103

The radio unit 103 is equipped with an antenna 120, and transmits/receives radio signals.

(5) The Baseband Signal Process Unit 104

The baseband signal process unit 104 processes a signal received from the radio unit 103 to output it to the speaker 105, and processes an audio received from the microphone 106 to output it to the radio unit 103.

(6) The Speaker 105

The speaker 105 outputs the audio processed at the baseband signal process unit 104.

(7) The Microphone 106

The microphone 106 receives an audio of the user, and outputs the audio to the baseband signal process unit 104.

(8) The Control Unit 108

The control unit 108 controls the portable telephone 100 as a whole.

The control unit 108, upon receiving authentication-start information or other kinds of information from the input unit 102, outputs the authentication-start information or the other kinds of information to the recording medium 300 via the input/output unit 109. Further, the control unit 108, upon receiving the input-means information from the recording medium 300 via the input/output unit 109, outputs the received input-means information to the output unit 101.

Furthermore, the control unit 108, when it receives from the input unit 102, one of the first, second, and third input information, outputs the received one of the first, second, and third input information, to the recording medium 300 via the input/output unit 109. The control unit 108, upon receiving from the recording medium 300 either a character input request or a fingerprint input request, outputs the received one of the character input request and the fingerprint input request to the output unit 101.

The control unit 108 receives character information or fingerprint information, which identifies the user, and outputs the received one of the character information and fingerprint information, to the recording medium 300 via the input/output unit 109. Further, the control unit 108, upon receiving authentication-impossible information from the recording medium 300, outputs the received authentication-impossible information to the output unit 101.

The control unit 108 includes a memory, which is operable to store data and program, the data including input instructions received from the input unit 102 and content which has been processed by the control unit 108, and the program including a variety of process programs and a variety of application programs that are to be executed. The control unit 108, when using data of the recording medium 300, receives the data from the recording medium 300, and records the received data to this memory.

For example, when there is, via the input unit 102, an instruction from a user that a game stored in the recording medium 300 should be executed, the control unit 108 receives data necessary for execution of the game from the recording medium 300, records it on the memory, and executes the game processing with use of the recorded data.

(9) The Input/Output Unit 109

The input/output unit 109 performs input/output of information with the recording medium 300, after the recording medium 300 has been inserted to a slot provided for the portable telephone 100, and with use of the slot as an interface.

(10) The Power Supply Unit 110

The power supply unit 110 supplies power voltage to each part constituting the portable telephone 100, and to the recording medium 300.

1.3 The Structure of the Recording Medium 300

In this section, the structure of the recording medium 300 is described.

Figure 3:
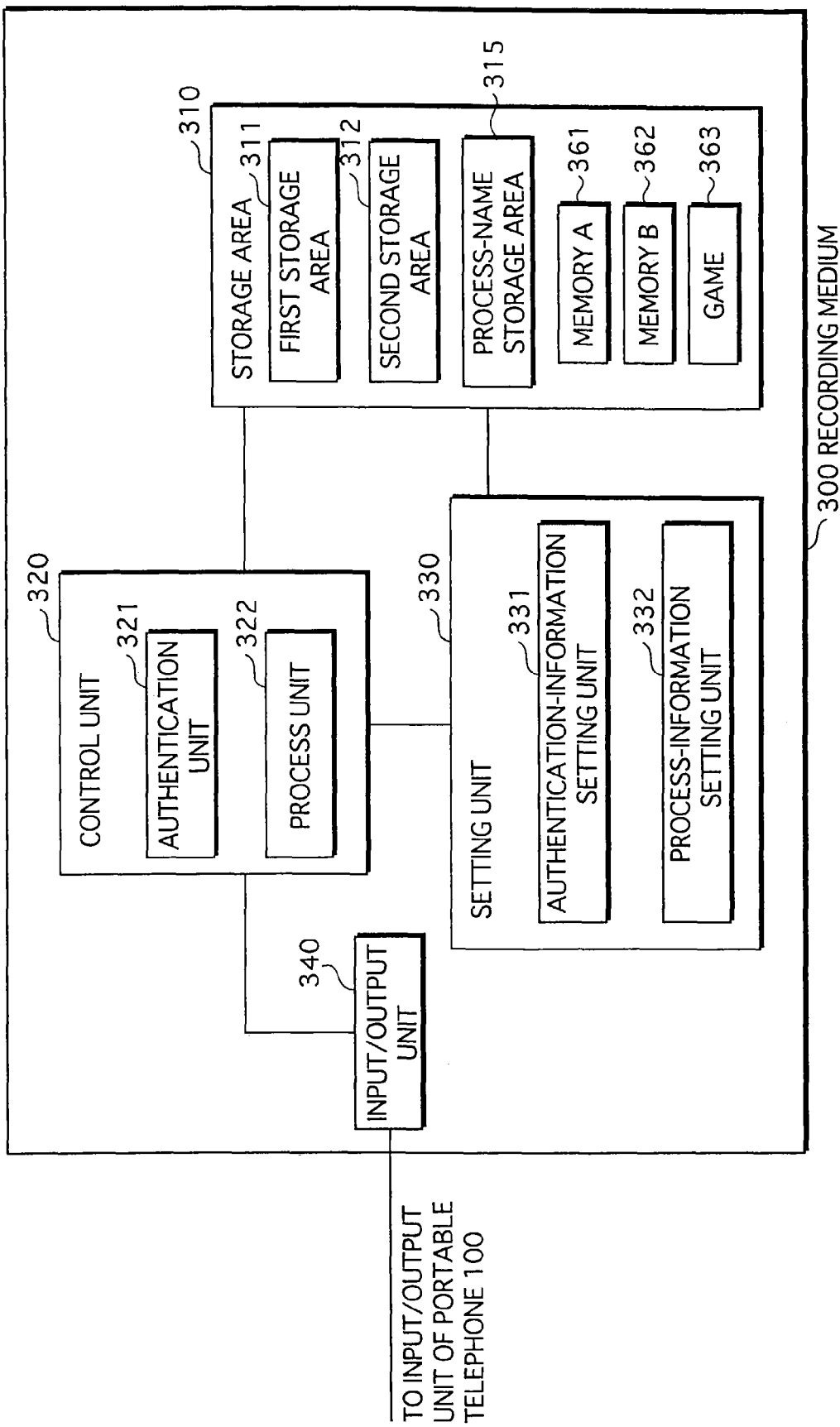
FIG. 3 is a block diagram illustrating the structure of a recording medium 300 that relates to the first embodiment.

As shown in FIG. 3, the recording medium 300 is comprised of a storage area 310, a control unit 320, a setting unit 330, and an input/output unit 340.

The recording medium 300 is specifically a computer system which is comprised of a microprocessor, a ROM, a RAM, and the like. The ROM stores thereon a computer program. The recording medium 300 pursues its function by the microprocessor performing according to the computer program.

(1) The Storage Area 310

The storage area 310 includes a first storage area 311, a second storage area 312, and a process-name storage area 315. The storage area 310 further includes a memory A 361, a memory B 362, and a game 363, which are respectively data accessible to a user. Note here that the memory A 361, the memory B 362, and the game 363 have been stored in the recording medium 300 before purchase.

(a) The First Storage Area 311

Figure 4:
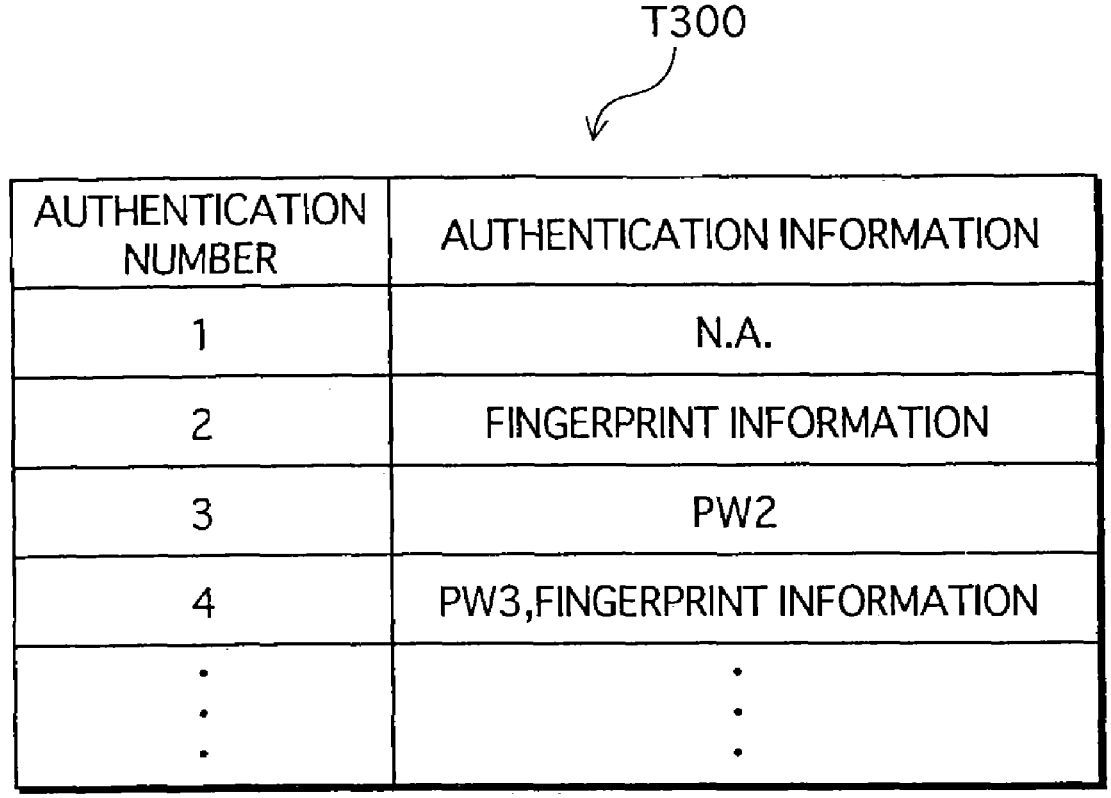
FIG. 4 illustrates the data structure of the authentication information table T300 of the first storage area 311 according to the first embodiment.

The first storage area 311 has an authentication information table T300, one example of which is shown in FIG. 4.

This authentication information table T300 stores thereon at least one set of an authentication number and authentication information.

The authentication number is a number assigned to each piece of authentication information.

The authentication information is for identifying the authorized user of the recording medium 300, which is necessary for judging whether to allow access to the recording medium. The authentication information is specifically one of character information, fingerprint information, and a combination of character information and fingerprint information.

It should be noted here that "N.A." in FIG. 4 represents that the authentication information is not necessary. Hereinafter, the authentication number that corresponds to the authentication information of "N.A." is referred to as "authentication-unnecessary number".

(b) The Second Storage Area 312

The second storage area 312 has a process-information table T301, an example of which is shown in FIG. 5.

The process-information table T301 stores thereon at least one set of a process number and process information.

The process number is a number assigned to each piece of process information.

The process information shows a name of a process which becomes accessible after authentication.

An authentication number and the corresponding process number are assigned a same number, so as to associate the authentication information and the corresponding process information.

The process names registered in the process information include "memory A", and "memory B", each of which correspond to the names of the memory A 361 and the memory B 362, and "game" that corresponds to the name of the game 363. If "memory A" has been registered as the process name, such processes are enabled as referring to, changing, and deleting the content of the data files within the memory A 361, and registering a new data file to the memory A 361. The same thing as the aforementioned case of "memory A" applies to the case in which "memory B" has been registered.

If "game" has been registered, it enables use of program data and data files necessary for the execution of the game 363. The game is executed by using the program data and the data files.

(c) The Process-Name Storage Area 315

The process-name storage area 315 stores thereon process-in-use information identifying the process names of processes that are currently made accessible after the authentication was performed in relation to the recording medium 300.

Please note here that, after the purchase of the recording medium 300 and until the first authentication is performed, no process-in-use information is stored in the process-name storage area 315.

(2) The Setting Unit 330

The setting unit 330 is tamper-resistant, and includes therein an authentication-information setting unit 331 and a process-information setting unit 332.

(a) The Authentication-Information Setting Unit 331

The authentication-information setting unit 331 registers authentication information received through an external terminal, into the first storage area 311, either at the time when the recording medium 300 is purchased or at the time when usage is commenced. Here, the external terminal is a terminal located at a sales office selling the recording medium 300.

The authentication-information setting unit 331 receives, as authentication information, one of character information, fingerprint information, or a combination of character information and fingerprint information, that is to be registered into the first storage area 311 from the external terminal via the input/output unit 340, then judges whether or not the received authentication information has been registered in the authentication information table T300. If the authentication information has not been registered, the authentication-information setting unit 331 calculates an authentication number for the authentication information to be registered, and registers the authentication information with the calculated authentication number into the authentication information table T300 of the first storage area 311. Note here that the authentication-information setting unit 331 temporarily stores the calculated authentication number in order to be referred to by the process-information setting unit 332.

Please note that judgment of whether or not the received authentication information has been already registered in the authentication information table T300 is performed as follows.

If the received authentication information consists of only character information, judgment is performed by searching for information matching the received character information within the authentication information table T300.

If the received authentication information consists of only fingerprint information, judgment is performed by searching for information matching the received fingerprint information within the authentication information table T300. Here, the information matching the received fingerprint information is information that matches 80% or more of the characteristic points of the fingerprint pattern of the received fingerprint information.

If the received authentication information consists of both of character information and fingerprint information, judgment is performed by searching for information matching both the character information and the fingerprint information, within the authentication information table T300. Here, the information matching both the character information and the fingerprint information is information that perfectly matches the received character information, and that matches 80% or more of the characteristic points of the fingerprint pattern of the received fingerprint information.

(b) The Process-Information Setting Unit 332

The process-information setting unit 332 registers process information received through the external terminal into the second storage area 312, either at the time when the recording medium 300 is purchased, or at the time when usage is commenced.

The process-information setting unit 332 receives process information to be registered to the second storage area 312, from the input/output unit 340 via the control unit 320, and acquires the value of the temporarily stored authentication number as process number. The process-information setting unit 332 then registers the acquired process number and the received process information into the process information table T301 of the second storage area 312, and the data relating to the acquired process information to the storage area 310. In registration, the process-information setting unit 332 sets the process for the process name to be registered to a state in which it is impossible to be used.

According to the above-described operations, the authentication information and the process information are associated with each other.

(3) The Control Unit 320

The control unit 320 is tamper-resistant, and includes therein an authentication unit 321 and a process unit 322.

The control unit 320 receives authentication-start information and other kinds of information, from the portable telephone 100 via the input/output unit 340. Upon receiving information from the portable telephone 100, the control unit 320 judges whether or not the received information is authentication-start information. If it is judged that the received information is authentication-start information, the control unit 320 outputs the received authentication-start information to the authentication unit 321, and instructs the authentication unit 321 to start authentication. If the received information is judged to not be authentication-start information, authentication will not be performed.

(a) The Authentication Unit 321

The authentication unit 321, upon receiving authentication-start information from the control unit 320, outputs input-means information to the portable telephone 100 via the input/output unit 340.

The authentication unit 321, if receiving first input information from the portable telephone 100 via the input/output unit 340, outputs a character input request to the portable telephone 100 via the input/output unit 340, then receives character information from the portable telephone 100 via the input/output unit 340.

The authentication unit 321, if receiving second input information from the portable telephone 100 via the input/output unit 340, outputs a fingerprint input request to the portable telephone 100 via the input/output unit 340, then receives fingerprint information from the portable telephone 100 via the input/output unit 340.

The authentication unit 321, if receiving third input information from the portable telephone 100 via the input/output unit 340, first outputs a character input request to the portable telephone 100 via the input/output unit 340, and receives character information from the portable telephone 100 via the input/output unit 340. Next, the authentication unit 321 outputs a fingerprint input request to the portable telephone 100 via the input/output unit 340, and receives fingerprint information from the portable telephone 100 via the input/output unit 340.

The authentication unit 321 receives, from the portable telephone 100 via the input/output unit 340, one of character information, fingerprint information, or a combination of character information and fingerprint information identifying the user. Then the authentication unit 321 performs authentication by judging whether or not authentication information matching the received information exists within the authentication information table T300.

If receiving character information, the authentication unit 321 judges whether or not authentication matching the received character information exists in the authentication information table T300. Here, the authentication information matching the received character information is authentication information that perfectly matches the received character information.

If receiving fingerprint information, the authentication information unit 321 judges whether or not authentication information matching the received fingerprint information exists in the authentication information table T300. Here, the authentication information matching the received fingerprint information is authentication information that matches 80% or more of the characteristic points of the fingerprint pattern of the received fingerprint information.

If receiving both character information and fingerprint information, the authentication unit 321 judges whether or not authentication information matching both the character information and the fingerprint information exists in the authentication information table T300. Here, the authentication information matching both the character information and the fingerprint information is authentication information that perfectly matches the received character information, and that matches 80% or more of the characteristic points of the fingerprint pattern of the received fingerprint information.

Please note that information received from the portable telephone 100 at the time of authentication is herein after referred to as "user information." This user information is information that identifies a user, and is represented by one of character information, fingerprint information, or a combination of character information and fingerprint information.

If authentication information matching the received user information exists in the authentication information table T300, the authentication unit 321 acquires the authentication number of the authentication information and outputs it to the process unit 322.

If authentication information matching the received user information does not exist in the authentication information table T300, the authentication unit 321 generates authentication-impossible information and outputs it to the portable telephone 100 via the input/output unit 340. If the authentication information table T300 has information whose authentication information is "N.A.", the corresponding authentication number is acquired and output to the process unit 322.

Please note here that, if only character information is received, the authentication information matching the received user information is authentication information that matches the received character information; and if only fingerprint information is received, it is authentication information that matches the received fingerprint information; and if both character information and fingerprint information are received, it is authentication information that matches both the character information and the authentication information that have been received.

(b) The Process Unit 322

The process unit 322 receives an authentication number from the authentication unit 321.

In the meantime, the process unit 322 judges whether or not the process-name storage area 315 stores thereon process-in-use information. If the judging is affirmative, the process unit 322 reads the process-in-use information from the process-name storage area 315, to acquire the name of the process that is permitted for use. Then the process unit 322 sets access right so that the process corresponding to the acquired process name is inaccessible.

Further, the process unit 322 acquires from the process information table T301 process information corresponding to the process number that matches the received authentication number, and sets access rights so that the process for the process name registered in the acquired process information is accessible. Further, the process unit 322 updates the process-name storage area 315 so that the process-in-use information is replaced by the process name registered in the acquired process information.

For example, if the process name registered in the acquired process information is "game", access rights are set so that only "game" is accessible for execution.

By the above operation, only a process for the process name that corresponds to the authentication information is enabled to be used.

After the authentication and while the portable telephone performs the process set which is to be accessible, the process unit 322 performs control between the portable telephone 100 and the process set to be accessible, by performing read/write of data to/from the process set to be accessible.

(4) The Input/Output Unit 340

The input/output unit 340 receives information either from the portable telephone 100 or from an external terminal, and according to the content of the received information, outputs it either to the control unit 320, or to the setting unit 330 via the control unit 320.

The input/output unit 340 also receives information from the control unit 320, and outputs the received information to the portable telephone 100.

1.4. The Operations of the Recording-Medium Unauthorized Use Prevention System 1

In this section, each operation of the recording-medium unauthorized use prevention system 1 is described.

(1) The Setting Operations for Authentication Information and Process Information Here, the operations for setting authentication information and process information are described with reference to the flowchart of FIG. 6.

The authentication-information setting unit 331 receives, from the input/output unit 340, authentication information having been input from the external device (Step S1). Then it judges whether or not the received authentication information has already been registered in the authentication information table T300 (Step S3). If the authentication information has already been registered the operation ends. If the authentication information has not yet been registered, the authentication-information setting unit 331 calculates an authentication number with use of the authentication table T300, registers the calculated authentication number and the received authentication information in the authentication information table T300 of the first storage area 311, and also temporarily stores thereon the authentication number in order to be referred to by the process-information setting unit 332 (Step S5).

The process-information setting unit 332 receives, from the input/output unit 340, process information input from the external device, and sets the temporarily stored authentication number to be the process number, registers the process number and the received process information in the process information table T301, and sets the process whose process name has just been registered, to be inaccessible (Step S10).

Note here that the process information registered at Step S10 may be process information unregistered in the process information table T301, and also may be process information already registered in the process information table T301.

(2) The Authentication Operation

Here, the authentication operation is described with reference to the flowchart shown in FIG. 7.

The control unit 320 receives information from the portable telephone 100 (Step S45), and judges whether or not the received information is authentication-start information (Step S48). If it is judged not to be authentication-start information, authentication will not be performed. If it is judged to be authentication-start information, the control unit 320 outputs the authentication-start information to the authentication unit 321 (Step S50). Upon receiving the authentication-start information from the control unit 320, the authentication unit 321 outputs input-means information to the portable telephone 100, and receives, from the portable telephone 100, one of first input information, second input information, or third input information (Step S51). The authentication unit 321 performs operation for receiving user information (Step S52).

Next, the authentication unit 321 judges whether authentication information that matches the received user information exists in the authentication information table T300 (Step S55).

If such authentication information matching the received user information exists, the authentication unit 321 acquires the authentication number that corresponds to the authentication information from the authentication information table T300, and outputs the acquired authentication number to the process unit 322 (Step S60). The process unit 322 performs an operation for setting access rights (Step S65).

If such authentication information matching the received user information does not exist, the authentication unit 321 generates authentication-impossible information, and outputs the generated authentication-impossible information to the portable telephone 100 via the input/output unit 340 (Step S70). Next, the authentication unit 321 judges whether or not an authentication-unnecessary number exists in the authentication information table T300 (Step S75). If such authentication-unnecessary number exists, the authentication unit 321 acquires the authentication-unnecessary number, and outputs it to the process unit 322 (Step S80). The process unit 322 performs operation for setting access right (Step S83).

If there is no authentication-unnecessary number, the operation ends.

(3) The User Information Reception Operation

Figure 7:
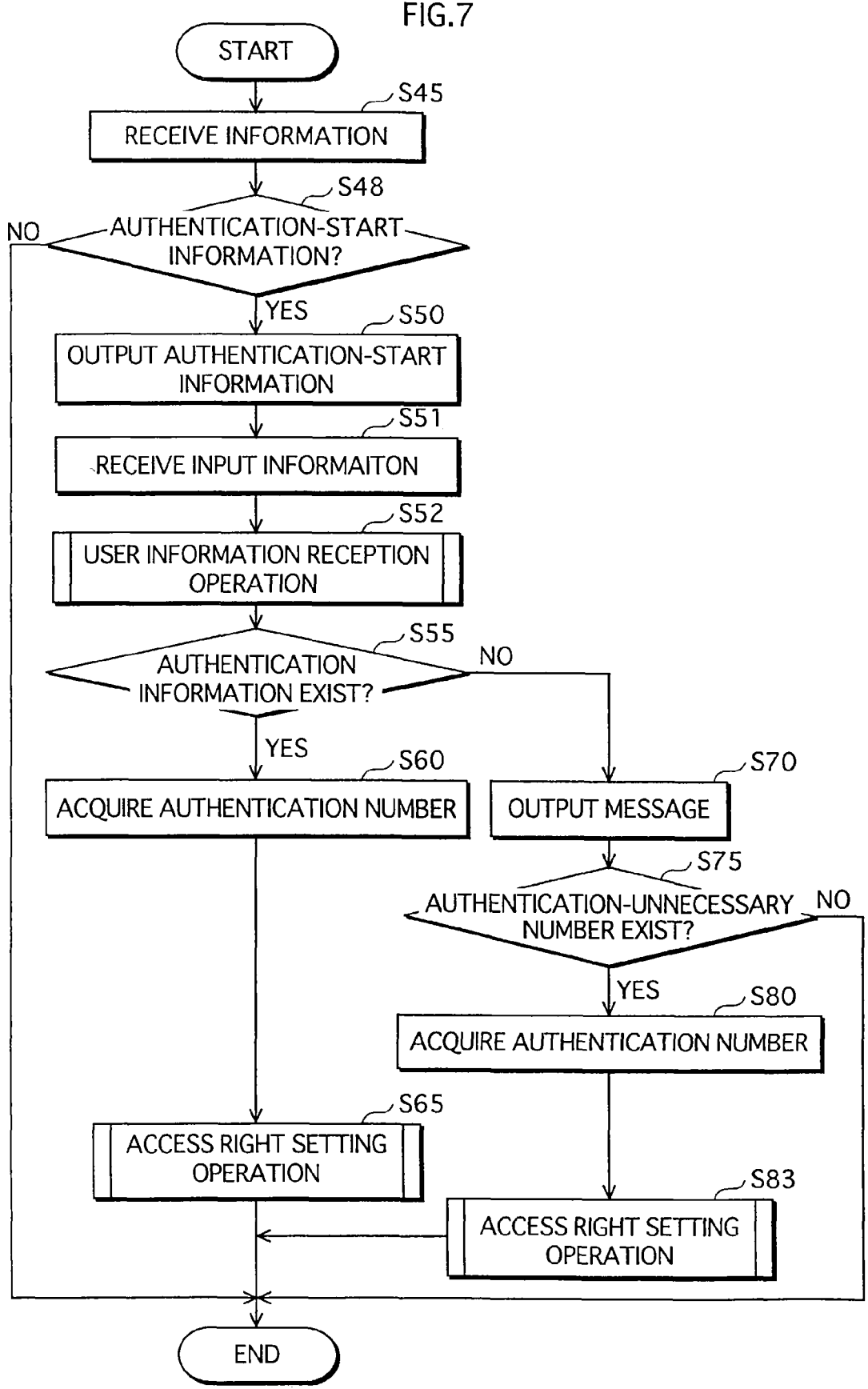
FIG. 7 is a flowchart illustrating the authentication operation that relates to the first embodiment.

Here, the operation for the user information reception process performed at Step S52 of FIG. 7 is described with reference to the flowchart shown in FIG. 8.

The authentication unit 321 judges whether the information received from the portable telephone 100 is first input information or not (Step S85). If the received information is first input information, the authentication unit 321 outputs a character input request to the portable telephone 100, and receives character information from the portable telephone 100 (Step S86). Note here that until character information is received as user information at Step S86, the operation is in a state of waiting to receive character information.

If the received information is not first input information, the authentication unit 321 judges whether or not it is second input information (Step S87). If the received information is second input information, the authentication unit 321 outputs a fingerprint input request to the portable telephone 100, and receives fingerprint information from the portable telephone 100 (Step S88). Note here that until fingerprint information is received as user information at Step 88, the operation is in a state of waiting to receive fingerprint information.

If the received information is not second information, the authentication unit 321 outputs a character input request to the portable telephone 100, and receives character information from the portable telephone 100 (Step S89), and then outputs a fingerprint input request to the portable telephone 100, and receives fingerprint information from the portable telephone 100 (Step S90). Note here that until character information is received at Step S89, the operation is in a state of waiting to receive character information, and that until fingerprint information is received at Step S90, the operation is in a state of waiting to receive fingerprint information.

(4) The Access Right Setting Operation

Figure 9:
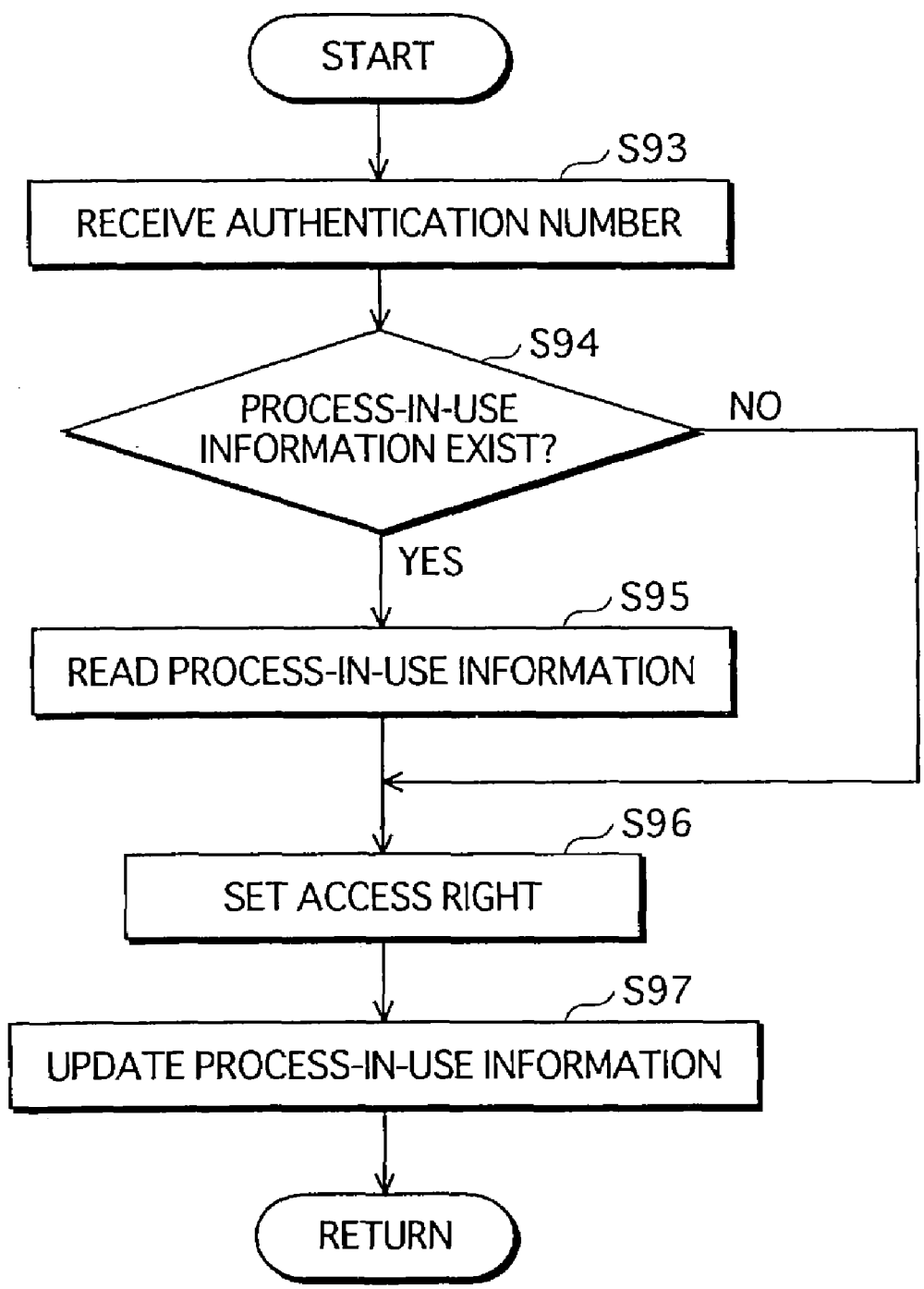
FIG. 9 is a flowchart illustrating the access right setting operation.

Here, the access right setting operation performed at Step S65 and Step S83 shown in FIG. 7 is descried with reference to the flowchart shown in FIG. 9.

The process unit 322 receives an authentication number from the authentication unit 321 (Step S93). Next, the process unit 322 judges whether or not process-in-use information exists (Step S94).

If process-in-use information exists, the process unit 322 reads the process-in-use information from the process-name storage area 315, acquires the process name of the process that has been made accessible, and sets access right so that the process corresponding to the acquired process name is made inaccessible (Step S95). Further, the process unit 322 acquires from the process information table T301 process information that corresponds to the process number that matches the authentication number received at Step S93, sets access right to the process corresponding to the process name registered in the acquired process information, so that the process will become accessible (Step S96). The process unit 322 updates the process-in-use information in the process-name storage area 315, with use of the process name registered in the process information acquired at the Step S96 (Step S97).

If process-in-use information does not exist, the operation from Step S96 will be performed.

(5) Examples of Authentication Operation

Here, a specific flow of the authentication operation is described with reference to each table shown in FIG. 4 and FIG. 5.

The authentication unit 321, upon receiving, from the portable telephone 100, fingerprint information and character information "PW3" as user information, acquires the authentication number "4" from the authentication information table T300. The process unit 322 acquires, from the process information table T301, process information in which "memory A+B" and "game" are registered as the process name, with use of the process number "4" that matches the authentication number "4", thereby setting access right to the memory A+B and to the game, so that they become accessible.

When receiving character information "PW2" as user information, the authentication unit 321 makes the memory A and the game accessible.

When receiving character information "PW5" as user information, the authentication unit 321 outputs to the portable telephone 100 a message reporting that there is no authentication information that matches the "PW5" in the authentication information table T300. Then, the authentication unit 321 judges whether or not an authentication-unnecessary number exists in the authentication information table T300. Since this example has an authentication-unnecessary number, the authentication unit 321 acquires "1" which is the authentication-unnecessary number. The process unit 322 acquires, from the process information table T301, process information whose registered process name is "memory A" with use of the process number "1" that corresponds to the authentication number "1", thereby setting access rights to the memory A to make it accessible.

The above operations enable setting of different authentication information to information of different importance levels, by classifying information relating to the memory A and memory B according to importance level.

1.5 Summary of the First Embodiment

As described above, the recording-medium unauthorized use prevention system 1 has, within the recording medium 300, an authentication unit 321 that is tamper-resistant. This makes it difficult for third parties to encode or tamper with the authentication system of the authentication unit. Therefore, unauthorized access of third parties to the recording medium 300 is prevented.

In addition, the recording medium 300 stores thereon one or more pieces of authentication information, and further one or more pieces of process information that each correspond to a piece of authentication information. Therefore, the authentication information makes it possible to restrict accessible data, unlike conventionally where one authentication is enough for using all the data stored in the recording medium. By this arrangement, the recording medium 300 has heightened security for the owner.

2. The Second Embodiment

As the second embodiment according to the present invention, a recording-medium unauthorized use prevention system 2 is described as follows.

2.1 The Structure of the Recording-Medium Unauthorized Use Prevention System 2

The recording-medium unauthorized use prevention system 2 has the same structure as the recording-medium unauthorized use prevention system 1, and is comprised of portable telephones 100A, 200A, and a recording medium 300A to which each portable telephone is mountable.

The recording medium 300A stores thereon at least one piece of communication information that represents a telephone number which is used when the portable telephone 100A is used as a communication device. The process means is associated with both the communication information and authentication information.

The portable telephone 100A accepts an input of communication information from the recording medium 300A, and an input of user information, acquires process information that corresponds to both the accepted communication information and the authentication information that matches the received user information, and permits use of the process name registered in the acquired process information.

The recording medium 300A can be also mounted to the portable telephone 200A, for use.

In this section, the description mainly focuses on the differences with the recording-medium unauthorized use prevention system 1.

2.2 The Structure of the Portable Telephone 100A

In this section, the structure of the portable telephone 100A is described.

Because the portable telephone 100A has a similar structure to the portable telephone 100 of the first embodiment, the difference between them will be mainly described.

Figure 10:
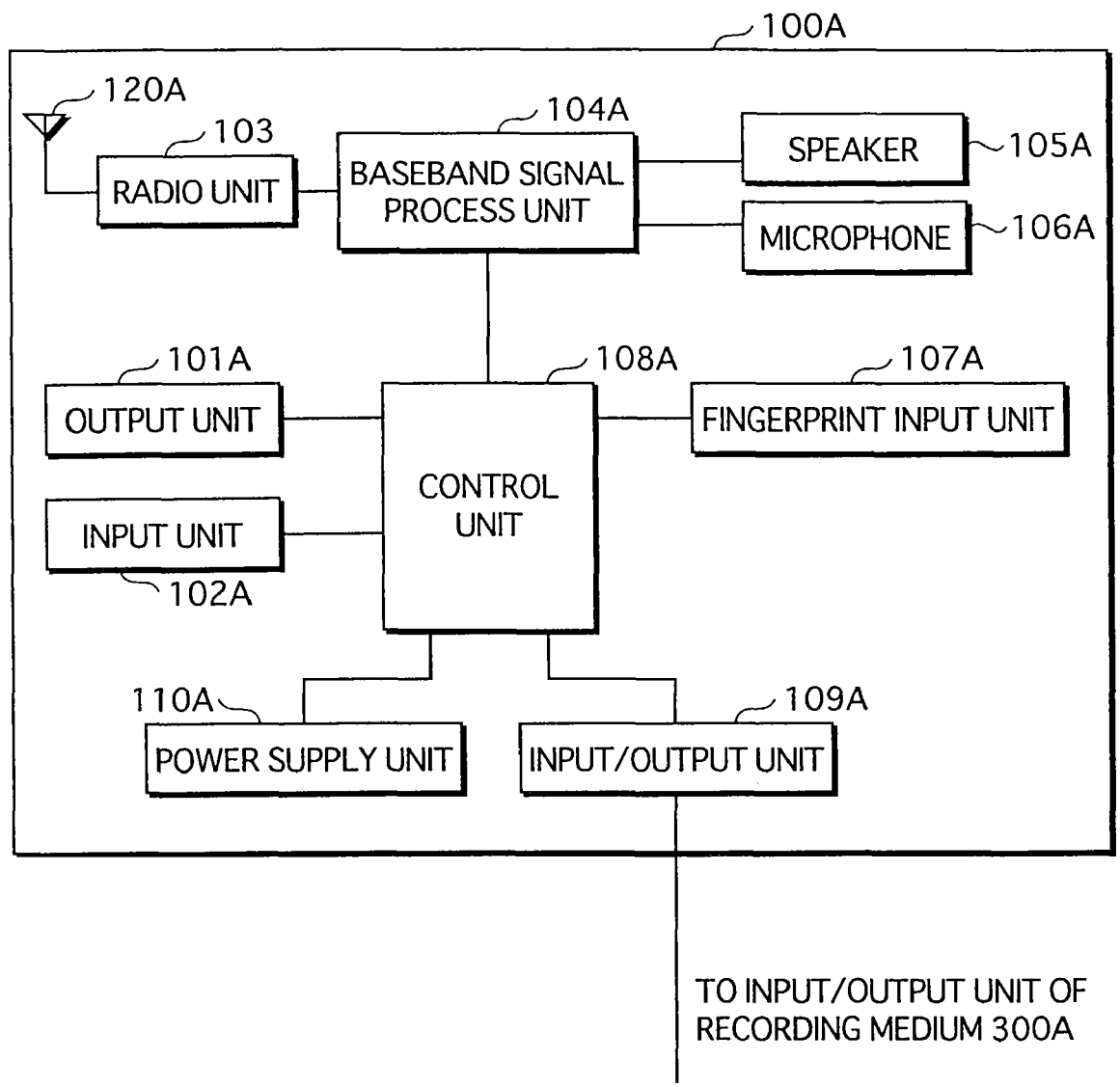
FIG. 10 is a block diagram illustrating the structure of the portable telephone 100A that relates to the second embodiment.

As shown in FIG. 10, the portable telephone 100A is comprised of an output unit 101A, an input unit 102A, a radio unit 103A, a baseband signal process unit 104A, a speaker 105A, a microphone 106A, a fingerprint input unit 107A, a control unit 108A, an input/output unit 109A, and a power supply unit 110A.

The portable telephone 100A is specifically a computer system comprised of a microprocessor, a ROM, a RAM, a display unit, and the like. The ROM stores thereon a computer program. The portable telephone 100A performs functions by using the microprocessor which performs according to the computer program.

The portable telephone 200A has the same structure as the portable telephone 100A, therefore the description thereof is omitted.

(1) The Output Unit 101A

The output unit 101A receives, from the recording medium 300A, list information having at least one piece of communication information that the user owns, displays a list of the communication information that the user owns, with use of the received list information, and prompts the user to input number-to-be used information that indicates the communication information that the user wants to use.

Further, if the output unit 101A receives, from the recording medium 300A, combination-impossible information indicating that there is no process information corresponding to both the number-to-be used information and the authentication information, the output unit 101A outputs a message reporting that there is no process information corresponding to both the number-to-be used information and the user information.

The output unit 101A also outputs the same type of messages as the output unit 101 of the first embodiment.

(2) The Fingerprint Input Unit 107A

The fingerprint input unit 107A is the same as the fingerprint input unit 107 of the first embodiment, therefore a description thereof is omitted.

(3) The Input Unit 102A

The input unit 102A is comprised of a touch panel, a keyboard having a ten key input function, and the like, and outputs to the control unit 108A an input instruction from the user, the input instruction including coordinate information showing the location at the touch panel that has been pushed, and a key operation signal generated by a key input through the keyboard.

When the list of communication information is displayed by the output unit 101A, the input unit 102A accepts number-to-be used information showing the communication information that the user wants to use, and outputs the accepted number-to-be used information to the control unit 108A.

The input unit 102A also accepts inputs of the same types of information as the input unit 102 of the first embodiment, and outputs these pieces of accepted information to the control unit 108A.

(4) The Radio Unit 103A

The radio unit 103A is the same as the radio unit 103 of the first embodiment, therefore the description thereof is omitted.

(5) The Baseband Signal Process Unit 104A

The baseband signal process unit 104A is the same as the baseband signal process unit 104 of the first embodiment, therefore the description thereof is omitted.

(6) The Speaker 105A

The speaker 105A is the same as the speaker 105 of the first embodiment, therefore the description thereof is omitted.

(7) The Microphone 106A

The microphone 106A is the same as the microphone 106 of the first embodiment, therefore the description thereof is omitted.

(8) The Control Unit 108A

The control unit 108A controls the portable telephone 100A as a whole.

The control unit 108A, upon receiving the list information from the recording medium 300A, outputs the received list information to the output unit 101A. The control unit 108A also receives number-to-be used information from the input unit 102A, and outputs the received number-to-be used information to the recording medium 300A.

The control unit 108A also receives, from the recording medium 300A, the same types of information as the control unit 108 of the first embodiment, and outputs these pieces of received information to the output unit 101A. Furthermore, the control unit 108A receives, from the input unit 102A, the same types of information as the control unit 108A of the first embodiment, and outputs the pieces of received information to the recording medium 300A.

Further, the control unit 108A, upon receiving combination-impossible information from the recording medium 300A, outputs the received combination-impossible information to the output unit 101A.

In addition, the control unit 108A includes a memory just as the control unit 108 of the first embodiment does.

(9) The Input/Output Unit 109A

The input/output unit 109A is the same as the input/output unit 109 of the first embodiment, therefore the description thereof is omitted.

(10) The Power Supply Unit 110A

The power supply unit 110A is the same as the power supply unit 110 of the first embodiment, therefore the description thereof is omitted.

2.3 The Structure of the Recording Medium 300A

In this section, the structure of the recording medium 300A is described.

Figure 11:
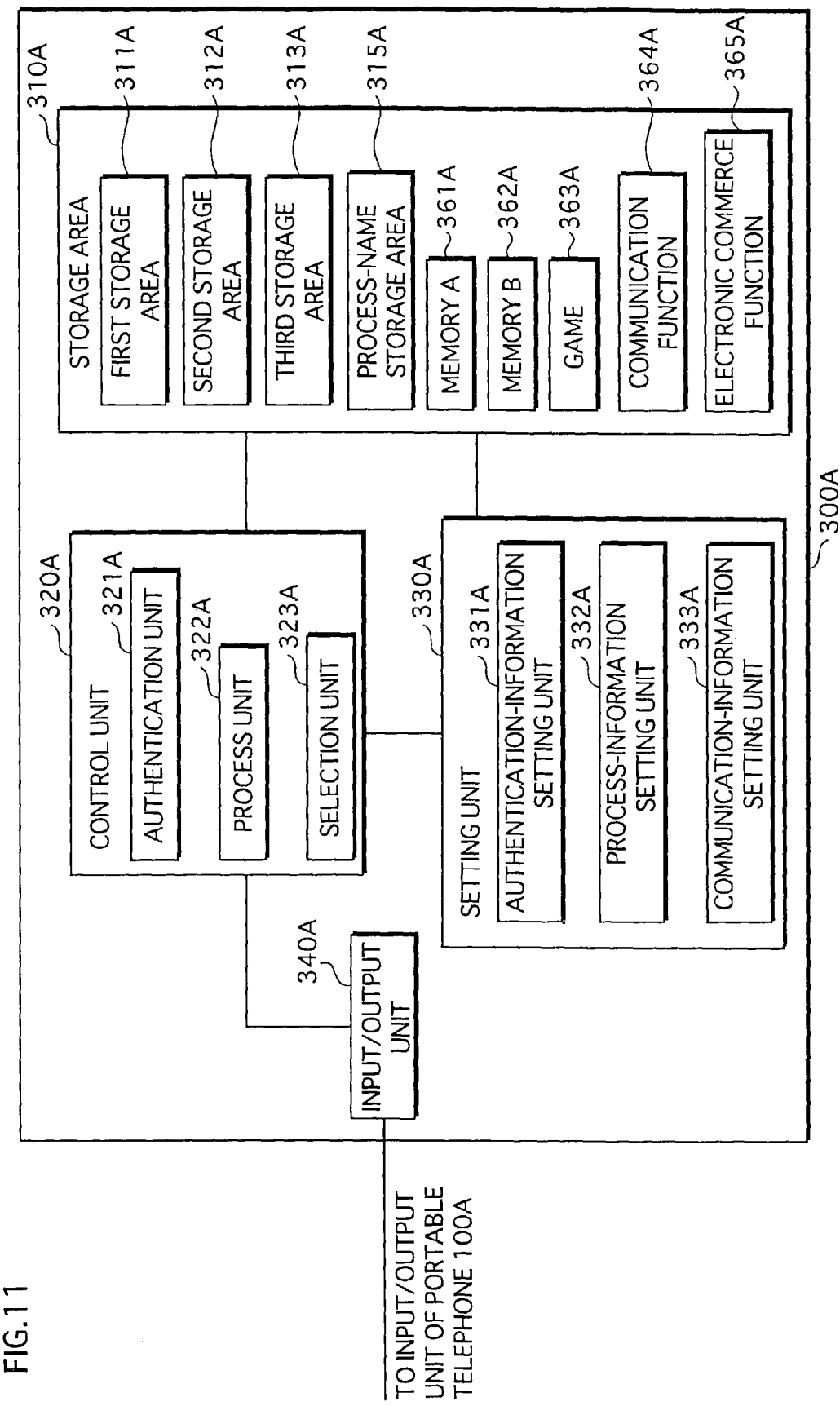
FIG. 11 is a block diagram illustrating the structure of the recording medium 300A that relates to the second embodiment.

As shown in FIG. 11, the recording medium 300A is comprised of a storage area 310A, a control unit 320A, a setting unit 330A, and an input/output unit 340A.

The recording medium 300A is specifically a computer system which is comprised of a microprocessor, a ROM, a RAM, and the like. The ROM stores thereon a computer program. The recording medium 300A performs functions by using the microprocessor which performs according to the computer program.

(1) The Storage Area 310A

The storage area 310A includes a first storage area 311A, a second storage area 312A, a third storage area 313A, and a process-name storage area 315A. The storage area 310A further includes a memory A 361A, a memory B 362A, a game 363A, a communication function 364A, and an electronic commerce function 365A, that are respectively either data or function accessible to a user. Note here that the memory A 361A, the memory B 362A, the game 363A, the communication function 364A, and the electronic commerce function 365A have been stored in the recording medium 300A before purchase.

(a) The First Storage Area 311A

Figure 12:
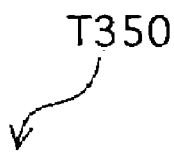
FIG. 12 illustrates the data structure of the authentication information table T350 of the first storage area 311A according to the second embodiment.

The first storage area 311A has an authentication information table T350, one example of which is shown in FIG. 12.

This authentication information table T350 stores thereon at least one set of an authentication number and authentication information.

Each set of items therein is the same as that in the authentication information table T300 of the first embodiment, therefore further description is omitted.

(b) The Third Storage Area 313A

The third storage area 313A has a communication information table T351, one example of which is shown in FIG. 13.

The communication information table T351 stores thereon at least one set of a communication number and communication information. The communication number is a number assigned to each piece of communication information. The communication information is a telephone number used when the portable telephone 100A is used as a telephone.

(c) The Second Storage Area 312A

The second storage area 312A has a process information table T352, one example of which is shown in FIG. 14.

The process information table T352 stores thereon at least one set of a process number and process information.

The process number is composed of first number and second number. A set of a first number and a second number uniquely identifies a piece of the process information. Each first number represents a communication number, and each second number represents an authentication number.

The process information shows a name of a process which becomes accessible after authentication.

The process which becomes accessible after authentication includes a memory function, a communication function, an electronic commerce function, and a game function, all of which require access to the data stored in the memory of the recording medium 300A. The process information is a name of a process that corresponds to one of the above-mentioned functions.

Here, the process information representing a memory function is "memory A" and "memory B", which represent the names for the memory A 361A and the memory B 362A, each memory being a memory area that the storage area 310A owns. Likewise, the process information representing a game function is "game" which represents the name of the game 363A.

If "memory A" has been registered as process information, such processes are enabled as writing to and reading from the data files within the area of the memory A 361A, and registering of a new data file to the area of the memory A 361A. The same thing as the aforementioned case of "memory A" applies to the case in which "memory B" has been registered. The stated arrangement enables use of a proper memory area when storing information acquired through the communication function according to importance level of the information, and then to set communication number and authentication number to each memory area.

If "game" has been registered, it enables use of program data and data files necessary for the execution of the game 363A. The game is executed by using these program data and data files.

If "communication function" has been registered, it enables use of program data and data files necessary for the execution of the communication function 364A. The communication function is executed by using the above-mentioned program data and data files.

If "electronic commerce function" has been registered, it enables use of program data and data files necessary for the execution of the electronic commerce function 365A. The electronic commerce function is executed by using the above-mentioned program data and data files.

Note here that the same authentication information may be assigned to different pieces of communication information. In the process information table T352, for example, an authentication number "3" is assigned to two different communication numbers 1 and 3. The process information assigned to the set of the communication number "1" and the authentication number "3" is "memory B"; and the process information assigned to the set of the communication number "3" and the authentication number "3" is "game".

(d) The Process-Name Storage Area 315A

The process-name storage area 315A is the same as the process-name storage area 315 of the first embodiment, therefore the description thereof is omitted.

(2) The Setting Unit 330A

The setting unit 330A is tamper-resistant, and includes therein an authentication-information setting unit 331A, a process-information setting unit 332A, and a communication-information setting unit 333A.

(a) The Authentication-Information Setting Unit 331A

The authentication-information setting unit 331A registers authentication information received from an external terminal into the first storage area 311A, either at the time when the recording medium 300A is purchased or at the time when usage is commenced.

The authentication-information setting unit 331A receives, as authentication information, one of character information, fingerprint information, or a combination of character information and fingerprint information from the external terminal via the input/output unit 340A, then judges whether or not the received authentication information has already been registered. If the authentication information has already been registered, the authentication-information setting unit 331A acquires the corresponding authentication number, and stores the acquired authentication number temporarily in the setting unit 330A.

Note here that the method of judging whether or not the received authentication information has been registered is the same as that of the first embodiment, therefore the description thereof is omitted here.

If the authentication information has not been registered yet, the authentication-information setting unit 331 registers the authentication information. The registration of the authentication information performed by the authentication-information setting unit 331A is the same as that performed by the authentication-information setting unit 331, therefore the description thereof is omitted here.

(b) The Communication-Information Setting Unit 333A

The communication-information setting unit 333A registers communication information received through an external terminal into the third storage area 313A, either at the time when the recording medium 300A is purchased or at the time when usage is commenced.

The communication-information setting unit 333A receives a telephone number from the input/output unit 340A via the control unit 320A, judges whether or not the received telephone number has already been registered. If the telephone number has already been registered, the communication-information setting unit 333A acquires the corresponding communication number, and stores the acquired communication number temporarily in the setting unit 330A.

If the received telephone number has not yet been registered, the telephone number will be registered as follows. The communication-information setting unit 333A calculates, with use of the communication information table T351, a communication number to be used for the telephone number, and registers the telephone number with the calculated communication number into the communication-information table T351 of the third storage area 313A. Note here that the calculated communication number will be temporarily stored in the setting unit 330A.

(c) The Process-Information Setting Unit 332A

The process-information setting unit 332A registers process information received from an external terminal into the second storage area 312A, either at the time when the recording medium 300A is purchased or at the time when usage is commenced.

The process-information setting unit 332A receives process information to be registered into the second storage area 312A, from the input/output unit 340A via the control unit 320A. The process-information setting unit 332A then registers into the process information table T352 the received process information together with the communication number and the authentication number that have been temporarily stored in the setting unit 330A. The process-information setting unit 332A further makes inaccessible the process for the process name registered as the process information.

Note, in the above, that if process information that has the same communication number and the same authentication number has been already registered, another registration therefore will not be performed.

By the above operations, each set of communication information and authentication information is associated with the corresponding process information.

(3) The Control Unit 320A

The control unit 320A is tamper-resistant, and includes an authentication unit 321A, a process unit 322A, and a selection unit 323A.

The control unit 320A receives authentication-start information and other kinds of information, from the portable telephone 100A via the input/output unit 340A. Upon receiving information from the portable telephone 100A, the control unit 320A judges whether or not the received information is authentication-start information. If it is judged that the received information is authentication-start information, the control unit 320A outputs the received authentication-start information to the authentication unit 321A, and instructs the authentication unit 321A to start authentication. If the received information is judged to not be the authentication-start information, authentication will not be performed.

(a) The Selection Unit 323A

The selection unit 323A, upon receiving an instruction to output list information from the authentication unit 321A, generates list information composed of the telephone numbers stored in the communication information table T351 of the third storage area 313A, then outputs the generated list information to the portable telephone 100A via the input/output unit 340A, in order to prompt the user to select the desired communication information.

The selection unit 323A receives number-to-be used information from the portable telephone 100A via the input/output unit 340A, and acquires the communication number that corresponds to the received number-to-be used information. In addition, the selection unit 323A retains the acquired communication number and the corresponding communication information until the next authentication.

(b) The Authentication Unit 321A

The authentication unit 321A, upon receiving authentication-start information from the control unit 320A, instructs the selection unit 323A to output list information.

After the communication number has been received by the selection unit 323A, the authentication unit 321A outputs the input-means information to the portable telephone 100A via the input/output unit 340A.

The authentication unit 321A receives from the portable telephone 100A one of first input information, second input information, and third input information. Then according to the received input information, the authentication unit 321A receives user information from the portable telephone 100A, as shown in the first embodiment. The authentication unit 321A then performs authentication using the received user information and the authentication information table T350. When it is necessary to output an acquired authentication number to the process unit 322A, the authentication unit 221A outputs the acquired authentication number and the communication number acquired at the selection unit 323A, as a set, to the process unit 322A.

Note here that the authentication method is the same as that performed by the authentication unit 321 of the first embodiment, therefore a description thereof is omitted.

(c) The Process Unit 322A

The process unit 322A receives an authentication number and a communication number from the authentication unit 321A, and judges whether or not there is a set of a first number and a second number that matches the received set of the authentication number and the communication number.

If such a set of the first number and the second number exists, the following operation will be performed. First, the process unit 322A judges whether or not process-in-use information is stored in the process-name storage area 315A. If the process-in-use information is stored, the process unit 322A reads the process-in-use information from the process-name storage area 315A, and acquires the process name of the process that has been made accessible. Then the process unit 322A sets an access right so that the process for the acquired process name is made inaccessible. Next, the process unit 322A reads, from the process information table T352, the process information that corresponds to the set of the first number and the second number that matches the received set of the authentication number and the communication number, and sets access rights so that only the process of the process name registered in the read process information is accessible. Further, the process unit 322A updates the content of the process-name storage area 315A, so that the process name registered in the acquired process information will be new process-in-use information.

If no such set of the first number and the second number exists, the process unit 322A generates combination-impossible information, and outputs the generated combination-impossible information to the portable telephone 100A via the input/output unit 340A.

After authentication, the process unit 322A receives information indicating process execution from the portable telephone 100A via the input/output unit 340A, and performs, using the received information, various controls targeted to a communication function, an electronic commerce function, and a memory function. If the communication function is used, the process unit 322A communicates with the base station using the communication information selected in the selection unit 323A. Note that in transmitting information to the base station, the process unit 322A encodes the information in advance, just as conventional portable telephones do. The reception of information from the base station is also performed in the same way as in conventional telephones.

(4) The Input/Output Unit 340A

The input/output unit 340A is the same as the input/output unit 340 of the first embodiment, therefore the description thereof is omitted.

2.4 The Operations of the Recording-Medium Unauthorized Use Prevention System 2

In this section, each operation of the recording-medium unauthorized use prevention system 2 is described.

(1) The Setting Operations for Communication Information, Authentication Information, and Process Information Here, the operations for setting communication information, authentication information, and process information are described with reference to the flowchart of FIG. 15.

The communication-information setting unit 333A receives, from the input/output unit 340A, communication information input through an external device (Step S100), and judges whether or not the received communication information has already been registered (Step S105). If the received communication information has not yet been registered, the communication-information setting unit 333A calculates a communication number using the communication information table T351, registers the calculated communication number together with the received communication information into the communication information table T351 of the third storage area 313A, and temporarily stores therein the calculated communication number to be referred to by the process-information setting unit 332A (Step S115). Next, the authentication-information setting unit 331A receives, from the input/output unit 340A, authentication information input through the external device (Step S120), and judges whether or not the received authentication information has already been registered (Step S125). If the received authentication information has not yet been registered, the authentication-information setting unit 331A calculates an authentication number using the authentication information table T350, registers the calculated authentication number together with the received authentication information into the authentication information table T350 of the first storage area 311A, and temporarily stores therein the calculated authentication number to be referred to by the process-information setting unit 332A (Step S135). The process-information setting unit 332A receives process information (Step S140), then sets the temporarily stored communication number a first number and the temporarily stored authentication number a second number, and judges whether or not the first number and the second number, as a set, have been in use or not (Step S145). If this set of the first number and the second number is not in use, the process-information setting unit 332A registers the first number, the second number, and the received process information into the process information table T352, and sets the process corresponding to the process name of the registered process information inaccessible (Step S150). If this set of first number and second number is in use, the operation ends there.

Note here that the process information registered at Step S150 may be either process information not yet registered in the process-information table T352, or may be already registered process information.

If the received authentication information has already been registered, the authentication-information setting unit 331A acquires the corresponding authentication number, and temporarily stores therein the acquired authentication number to be referred to by the process-information setting unit 332A (Step S130), and the operation from Step S140 will be performed.

If the received communication information has already been registered, the communication-information setting unit 333A acquires the corresponding communication number, and temporarily stores therein the acquired communication number to be referred to by the process-information setting unit 332A (Step S110), and the operation from Step S120 will be performed.

If only communication information should be registered, the received communication information is judged at Step S105 whether or not it has already been registered, and if the communication information has been registered, the operation ends there. If the communication information has not been registered, Step S115 will be performed, then the operation ends.

If only authentication information should be registered, Step 120 is performed. Then at Step 125, the received authentication information is judged whether or not it has already been registered, and if the authentication information has been registered, the operation ends there. If the authentication information has not been registered, Step S135 will be performed, then the operation ends.

Further, if only process information should be registered, it will be realized by receiving already registered process information, at Step 100, and receiving already registered authentication information, at step S120.

(2) The Authentication Operation

Here, the authentication operation is described with reference to the flowchart of FIG. 16.

The control unit 320A receives information from the portable telephone 100A (Step S195), and judges whether or not the received information is authentication-start information (Step S198). If the authentication-start information is judged not to be authentication-start information, authentication will not be performed. If the authentication-start information is judged to be authentication-start information, the control unit 320A outputs the authentication-start information to the authentication unit 321A (Step S200). Upon receiving the authentication-start information, the authentication unit 321A instructs the selection unit 323A to output list information (Step S201).

The selection unit 323A generates the list information with use of each telephone number registered in the communication information table T351, and outputs the generated list information to the portable telephone 100A (Step S203). Next, the selection unit 323A receives number-to-be used information from the portable telephone 100A via the input/output unit 340A, and acquires a communication number for the communication information that corresponds to the received number-to-be used information (Step S205). Note here that until the number-to-be used information is received, the operation is in a state of waiting to receive such number-to-be used information at Step S205.

Next, the authentication unit 321A generates input-means information, and outputs the generated input-means information to the portable telephone 100A (Step S206). The authentication unit 321A receives, from the portable telephone 100A, one of first input information, second input information, and third input information (Step S207), and performs operation for accepting user information (Step S210).

Next, the authentication unit 321A judges whether or not the authentication information table T350 has authentication information that matches the received user information (Step S215).

If there is authentication information matching the received user information, the authentication unit 321A acquires the authentication number of the matching authentication information from the authentication information table T350, and outputs the acquired authentication number and the communication number acquired at Step S205 to the process unit 322A (Step S220). The process unit 322A judges whether or not there is process information that corresponds to the acquired set of communication number and authentication number (Step S240). If there is such process information, the access right setting operation is performed (Step S245).

If there is no process information that corresponds to the set of the communication number and the authentication number, the process unit 322A generates combination-impossible information, and outputs the generated combination-impossible information to the portable telephone 100A via the input/output unit 340A (Step S250).

If there is no authentication information that matches the received user information, the authentication unit 321A generates authentication-impossible information, and outputs the generated authentication-impossible information to the portable telephone 100A via the input/output unit 340A (Step S225). Next, the authentication unit 321A judges, from the authentication information table T350, whether or not there is any authentication-unnecessary number (Step S230). If there is such authentication-unnecessary number, the authentication unit 321A acquires the authentication-unnecessary number (Step S235), and performs the operation from Step S240. If there is no authentication-unnecessary number, the operation ends there.

(3) The User Information Reception Operation

Figure 8:
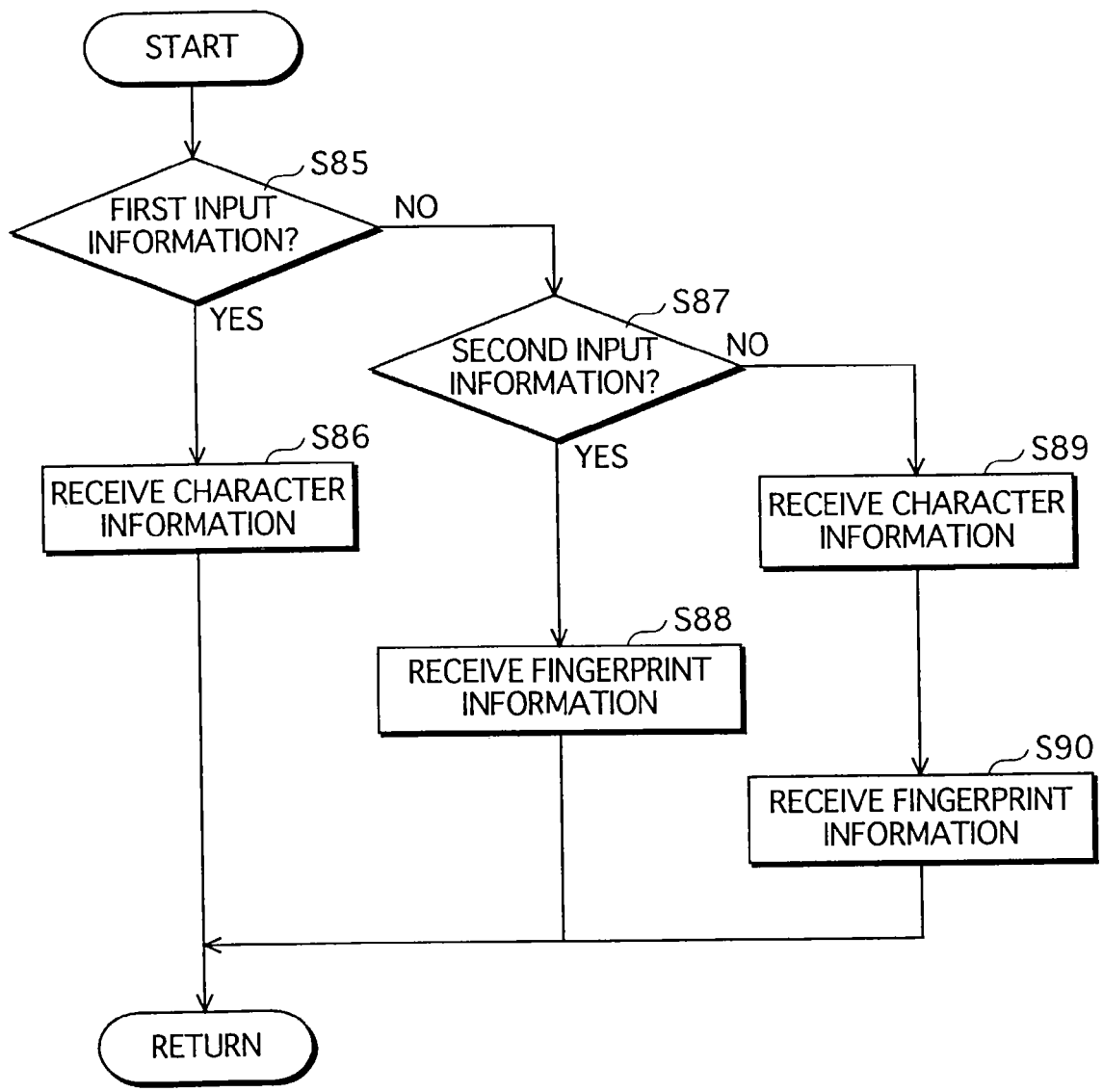
FIG. 8 is a flowchart illustrating the user information reception operation.
Figure 16:
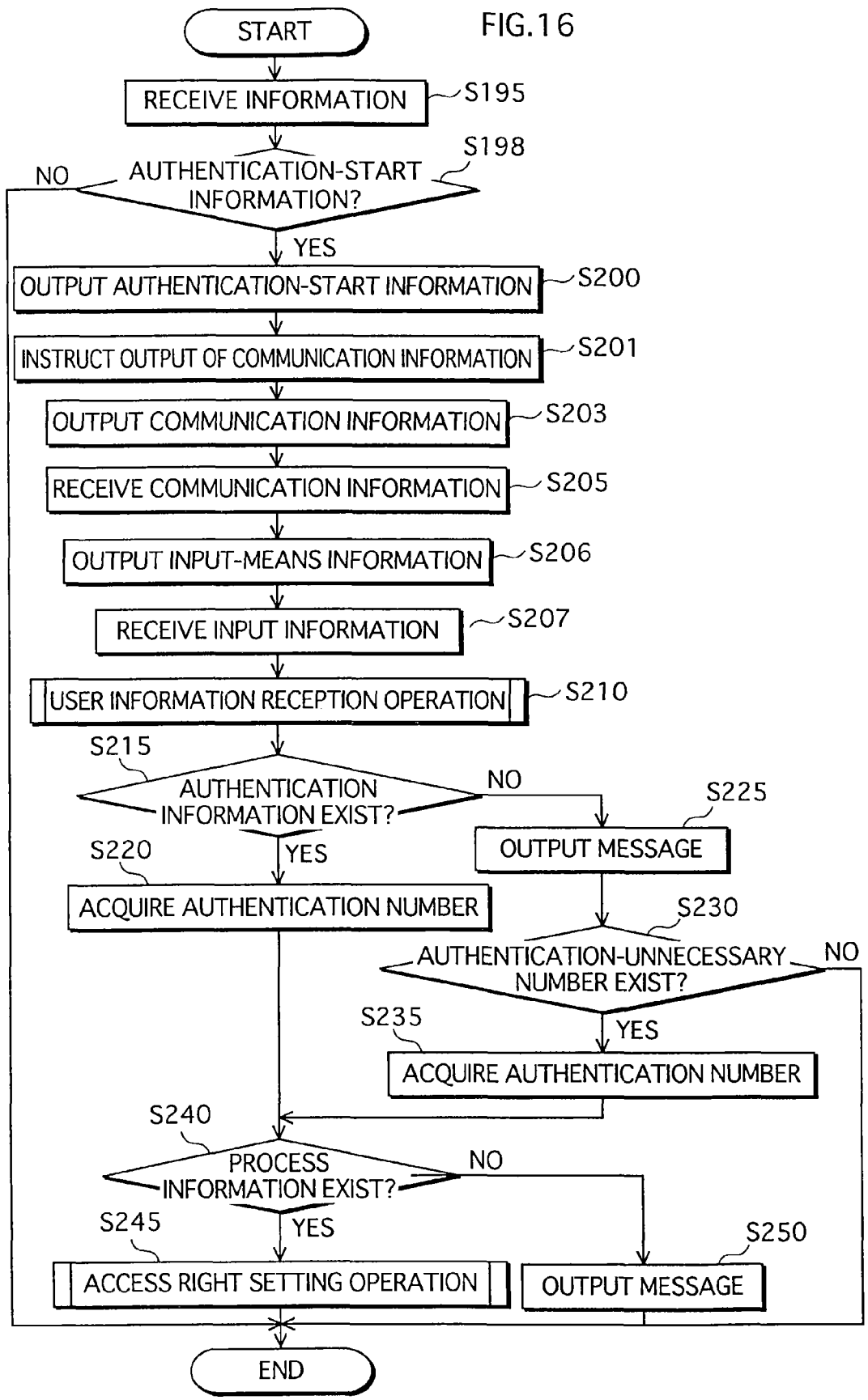
FIG. 16 is a flowchart illustrating the authentication operation that relates to the second embodiment.

The user information reception operation shown in FIG. 16 is the same as the user information reception operation of the first embodiment which is shown in FIG. 8. Therefore, a description is omitted.

(4) The Access Right Setting Operation

Figure 17:
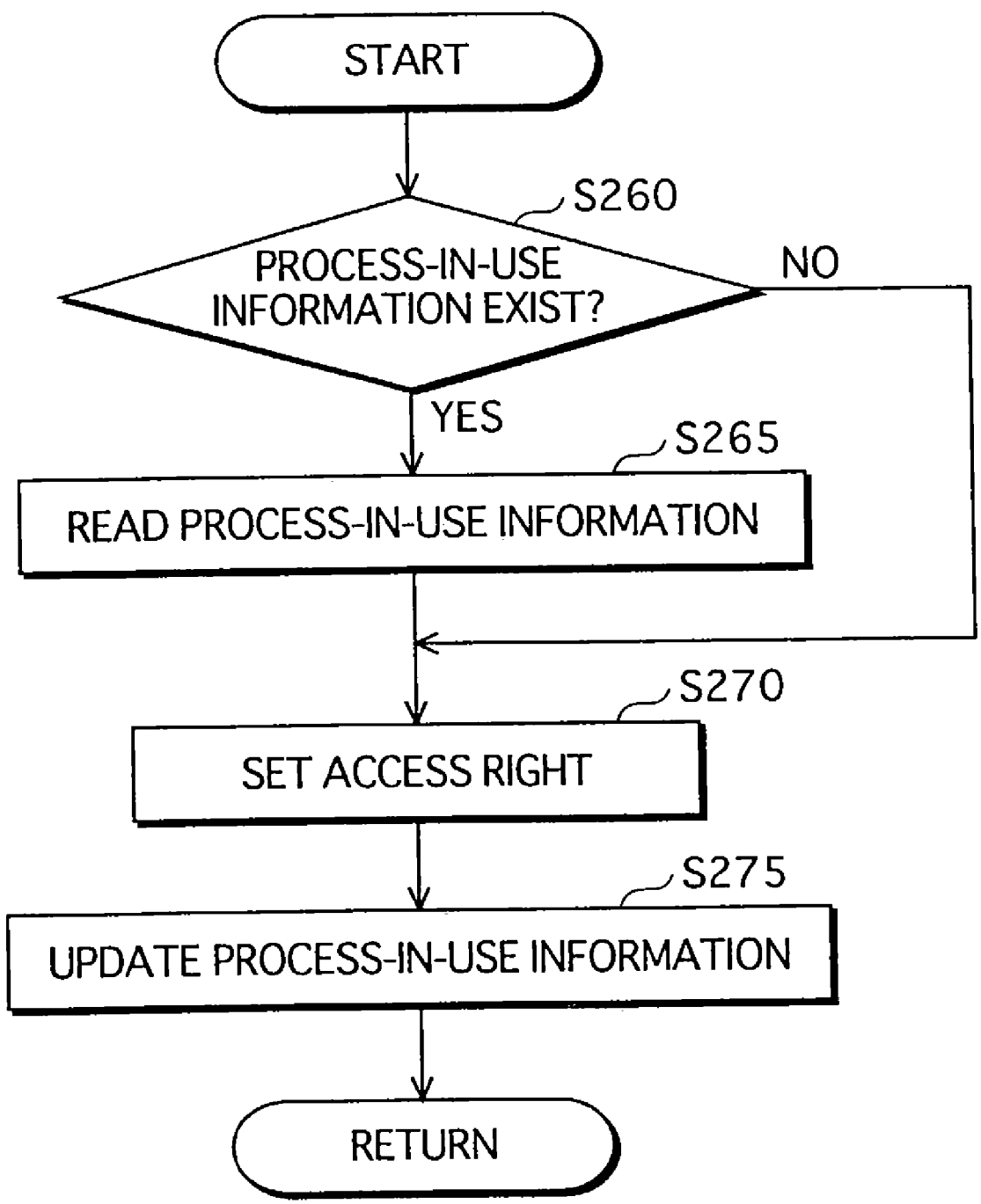
FIG. 17 is a flowchart illustrating the access right setting operation that relates to the second embodiment.

Here, the access right setting operation mentioned in FIG. 16 is detailed with reference to the flowchart of FIG. 17.

The process unit 322A judges whether there is process-in-use information (Step S260).

If there is process-in-use information, the process unit 322A reads the process-in-use information from the process-name storage area 315A, acquires the process name of the process that has been made accessible, and sets access rights so that the process corresponding to the acquired process name is made inaccessible (Step S265). The process unit 322A then acquires process information that corresponds to the set of first number and second number, which matches the set of the communication number and the authentication number that has been received from the authentication unit 321A. The process unit 322A sets access rights to the process for the process name registered in the acquired process information, so that the process is made accessible (Step S270). The process unit 322A updates the process-in-use information of the process-name storage area 315A, using the process name registered in the process information acquired at Step S270.

If there is no process-in-use information, the operation from Step S270 will be performed.

(5) Examples of Authentication Operation

Here, a specific flow of the authentication operation is described with reference to each table shown in FIGS. 12, 13, and 14.

The selection unit 323A, upon receiving from the portable telephone 100A communication information of "corporate", acquires the communication number of "1".

The authentication unit 321A, upon receiving from the portable telephone 100A, fingerprint information as user information, acquires the authentication number of "2" from the authentication information table T350.

The process unit 322A acquires the first number "1" and the second number "2", from the communication number "1" and the authentication number "2", and acquires the process information that corresponds to both the acquired first number "1" and the second number "2" from the process information table T352. In this case, the process information in which "communication function" has been registered is acquired, and the communication function will be made accessible.

If the selection unit 323A receives communication information of "corporate", and the authentication unit 321A receives character information of "PW2" as user information, the communication function and the electronic commerce function are made accessible.

If the selection unit 323A receives communication information of "corporate", and the authentication unit 321A receives character information of "PW10" as user information, a message reporting that there is no authentication information that matches the "PW10" in the authentication information table T350 is output to the portable telephone 100A.

Further, the authentication unit 321A judges whether or not there is any authentication-unnecessary number in the authentication information table T350, and acquires the authentication number "1". The process unit 322A acquires the first number "1" and the second number "1" from the communication number "1" and the authentication number "1", and acquires the process information that corresponds to both the acquired first number "1" and the second number "1", from the process information table T352. In this case, the process information in which "memory B" has been registered is acquired, then memory B is made accessible.

If the selection unit 323A receives communication information of "private 1", and the authentication unit 321A receives character information of "PW2", the process unit 322A acquires the first number "2" and the second number "3", from the communication number "2" and the authentication number "3", and judges whether or not the process information table T352 has process information that matches both the acquired first number "2" and the second number "3". In this case, there is no process information that matches both the first number "2" and the second number "3", therefore a message reporting that there is no such process information is output to the portable telephone 100A.

2.5 Summary of the Second Embodiment

As described above, the recording-medium unauthorized use prevention system 2 has, within the recording medium 300A, a tamper-resistant authentication unit 321A. This prevents third parties from decoding and tampering with the authentication structure of the authentication unit. Therefore, it prevents unauthorized third parties from accessing the recording medium 300A.

In addition, the recording medium 300A stores thereon one or more pieces of communication information, one or more pieces of authentication information, and further one or more pieces of process information that each correspond to a piece of communication information and to a piece of authentication information. Therefore, the user can use appropriate communication information and user information according to functions the user wants to use. This makes it possible to restrict use of functions stored in the recording medium 300A, thereby heightening security. Therefore, the recording medium 300A will have heightened security for the owner.

In addition, while conventional recording media record thereon only one communication information, the recording medium 300A stores thereon a plurality of pieces of communication information. Therefore, the user of the recording medium 300A does not have to carry a plurality of recording media, which reduces possibility of unauthorized use thereof, incident to loss or robbery.

For example, there is a system that a user ID card which is called an SIM (subscriber identity module) card is mounted to the main body of a telephone so as to enable communication. This SIM card stores therein individual information of the owner, such as an ID code and telephone number data. By mounting this SIM card to such as a portable telephone of the user, a telephone of others, and a public telephone, it becomes possible to perform various operations with use of the ID code stored in the SIM card, such as calling and billing, and even calling based on the telephone number data stored in the memory is made possible.

However, One SIM card can store therein only one ID code and related information. Therefore, if a person owns a plurality of ID codes, he accordingly has to own the corresponding number of SIM cards. However, the recording medium of the second embodiment is operable to store therein a plurality of pieces of communication information. Therefore, even if a person owns a plurality of ID codes, he has to carry only one recording medium. This reduces possibility of unauthorized use incident to loss or robbery.

3. The Third Embodiment

As the third embodiment according to the present invention, a recording-medium unauthorized use prevention system 3 is described as follows.

3.1 The Structure of a Recording-Medium Unauthorized Use Prevention System 3

The recording-medium unauthorized use prevention system 3 has the same structure as the recording-medium unauthorized use prevention systems 1 and 2, and is comprised of portable telephones 100B, 200B, and a recording medium 300B to which each portable telephone is mountable.

In this section, the description mainly focuses on the differences with the recording-medium unauthorized use prevention systems 1 and 2.

The recording-medium unauthorized use prevention system 3 detects the incident when the recording medium 300B is mounted to the portable telephone 100B, records information indicating thereof, into the recording medium 300B, and judges whether or not it is necessary to receive a password by comparing the information recorded this time with the information recorded last time. The password being composed of a combination of one or more numbers and letters, and being used for identifying the owner of the recording medium 300B. Hereinafter, the password is called "input password."

When reception of an input password is necessary, the recording-medium unauthorized use prevention system 3 receives the input password, and if the input password matches the password stored in the recording medium 300B receives communication information and user information, so as to enable restriction of accessible process information, just as in the second embodiment.

Note here that the same operation as in the above will be performed when the power is turned on while the recording medium 300B is being mounted to the portable telephone 100B.

The same thing applies to the case when the recording medium 300B is mounted to the portable telephone 200B.

3.2 The Structure of the Portable Telephone 100B

In this section, the description focuses on the difference with the portable telephone 100 or with the portable telephone 100A.

Figure 18:
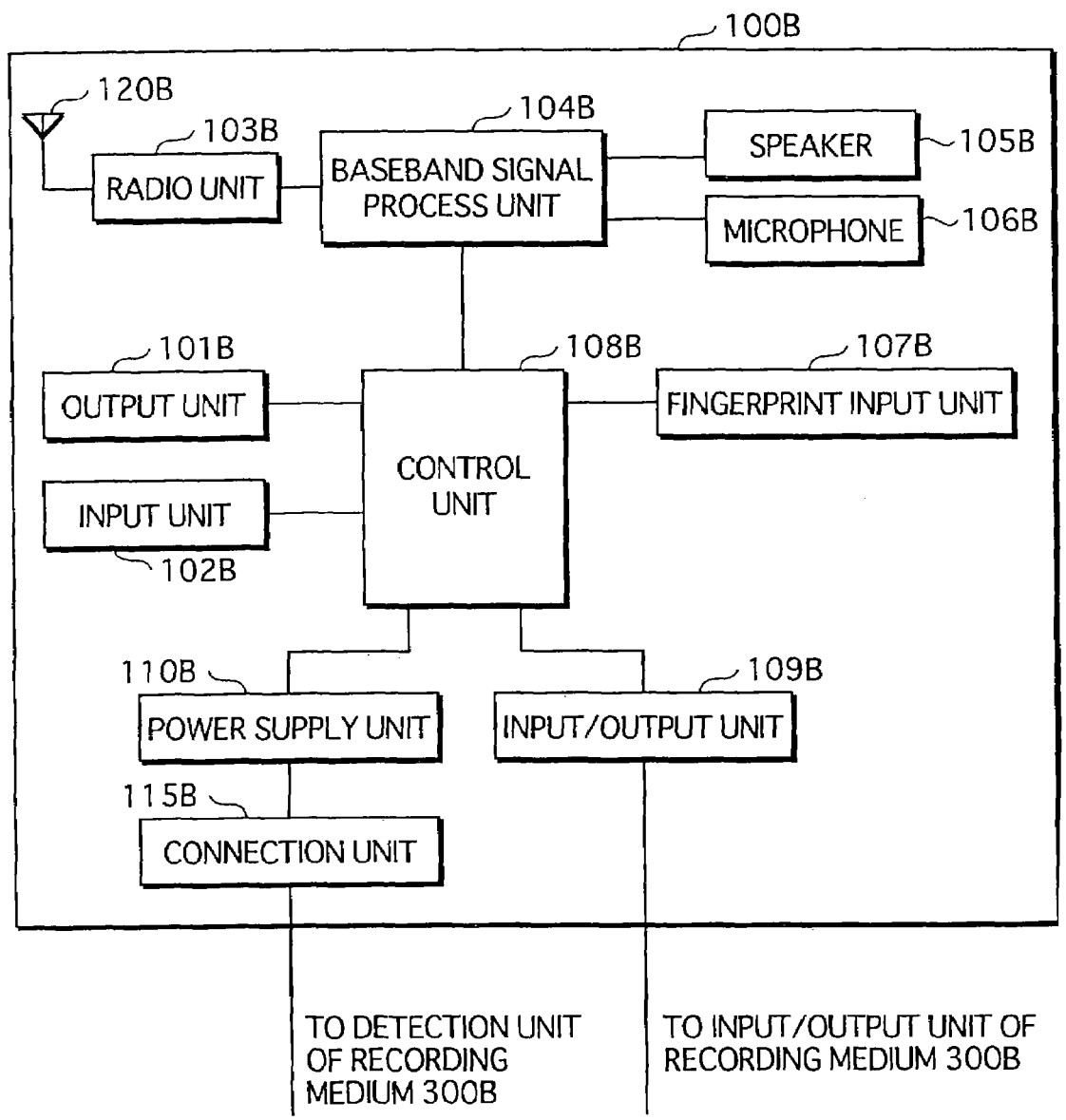
FIG. 18 is a block diagram illustrating the structure of the portable telephone 100B that relates to the third embodiment.

As shown in FIG. 18, the portable telephone 100B is comprised of an output unit 101B, an input unit 102B, a radio unit 103B, a baseband signal process unit 104B, a speaker 105B, a microphone 106B, a fingerprint input unit 107B, a control unit 108B, an input/output unit 109B, a power supply unit 110B, and a connection unit 115B.

The portable telephone 100B is specifically a computer system comprised of a microprocessor, a ROM, a RAM, a display unit, and the like. The ROM stores thereon a computer program. The portable telephone 100B performs functions by using the microprocessor according to the computer program.

Note here that the portable telephone 200B has the same structure as the portable telephone 100B, therefore a description thereof is omitted.

(1) The Output Unit 101B

The output unit 101B receives, from the recording medium 300B, a password input request indicating an input request of an input password, outputs a message prompting the user to input an input password.

Further, if the output unit 101B receives identification-impossible information indicating that the input password input through the input unit 102B does not match the password stored in the recording medium 300B, outputs a message reporting thereof.

Furthermore, the output unit 101B outputs the same messages as those output from the output unit 101 of the first embodiment, or as those output from the output unit 101A of the second embodiment.

(2) The Fingerprint Input Unit 107B

The fingerprint input unit 107B is the same as the fingerprint input unit 107 of the first embodiment, therefore a description thereof is omitted here.

(3) The Input Unit 102B

The input unit 102B is comprised of a touch panel, a keyboard having a ten key input function, and the like, and outputs to the control unit 108B an input instruction from the user, the input instruction including coordinate information showing the location at the touch panel that has been pushed, and a key operation signal generated by a key input through the keyboard.

In addition, when the output unit 101B outputs a message prompting the user to input an input password, the input unit 102B receives the input password, and outputs the received input password to the control unit 108B.

The input unit 102B also accepts input of the same kinds of information as those accepted by the input unit 102 of the first embodiment or by the input unit 102A of the second embodiment, and outputs the pieces of accepted information to the control unit 108B.

(4) The Radio Unit 103B

The radio unit 103B is the same as the radio unit 103 of the first embodiment, therefore a description thereof is omitted.

(5) The Baseband Signal Process Unit 104B

The baseband signal process unit 104B is the same as the baseband signal process unit 104 of the first embodiment, therefore a description thereof is omitted.

(6) The Speaker 105B

The speaker 105B is the same as the speaker 105 of the first embodiment, therefore a description thereof is omitted.

(7) The Microphone 106B

The microphone 106B is the same as the microphone 106 of the first embodiment, therefore a description thereof is omitted.

(8) The Control Unit 108B

The control unit 108B controls the portable telephone 100B as a whole.

The control unit 108B, upon receiving a password input request from the recording medium 300B via the input/output unit 109B, outputs the received password input request to the output unit 101B.

The control unit 108B receives from the input unit 102B either number-to-be used information or an input password, outputs the number-to-be used information or the input password to the recording medium 300B.

The control unit 108B, upon receiving an identification-impossible information from the recording medium 300B via the input/output unit 109B, outputs the received identification-impossible information to the output unit 101B.

The control unit 108B also receives, from the recording medium 300B, the same types of information as the control unit 108 of the first embodiment, and as the control unit 108A of the second embodiment, and outputs the above-mentioned pieces of received information to the output unit 101B. Further, the control unit 108B receives, from the input unit 102B, the same types of information as the control unit 108 of the first embodiment, or as the control unit 108A of the second embodiment, and outputs the pieces of received information to the recording medium 300B.

In addition, the control unit 108B has a calendar function and a clock function, and upon receiving information for inquiring about the current date and time from the recording medium 300B, acquires the current date and time with use of the calendar function and the clock function, and outputs the acquired date and time to the recording medium 300B. Furthermore, the control unit 108B has a GPS (global positioning system) function, and upon receiving information for inquiring about the current position from the recording medium 300B, acquires the current position information by communicating with the GPS satellites via the radio unit 103B, and outputs the acquired current position information to the recording medium 300B.

Here, the date and time to be output to the recording medium 300B is date, hour, and minute, and the position information to be output to the recording medium 300B is in a unit of municipalities.

In addition, the control unit 108B includes a memory just as the control unit 108 of the first embodiment does.

(9) The Input/Output Unit 109B

The input/output unit 109B is the same as the input/output unit 109 of the first embodiment, therefore a description thereof is omitted.

(10) The Power Supply Unit 110B

The power supply unit 110B is the same as the power supply unit 110 of the first embodiment, therefore a description thereof is omitted.

(11) The Connection Unit 115B

Figure 19:
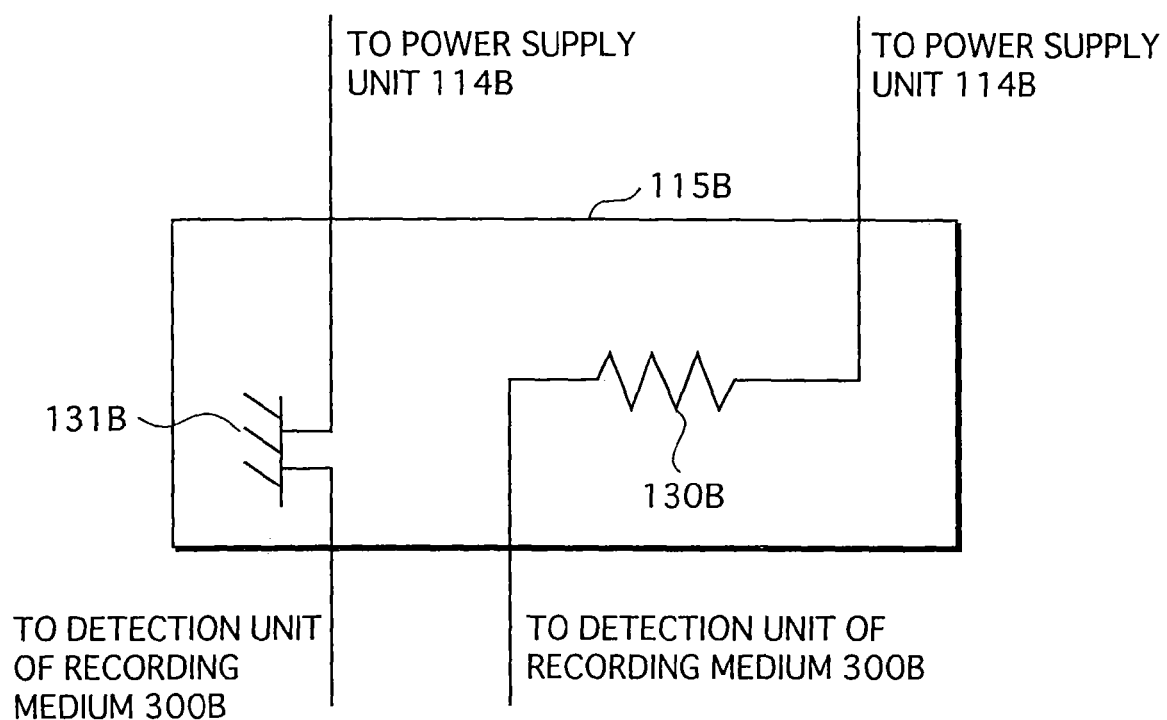
FIG. 19 is a schematic circuit diagram of the connection unit 115B of the portable telephone 100B according to the third embodiment.

The connection unit 115B has therein a pullup resistor 130B and a ground 131B, as shown in FIG. 19.

One end of the pullup resistor 130B is connected to the power supply unit 110B, and the other end thereof is connected to a detection unit of the recording medium 300B, which will be detailed later. In addition, the ground 131B is connected to the power supply unit 110B and to the detection unit of the recording medium 300B.

By the above arrangement, when the recording medium 300B is mounted to the portable telephone 100B, the portable telephone 100B is able to send, with use of the power voltage of the power supply unit 110B, to the detection unit of the recording medium 300B, a mounting-detect signal indicating that the recording medium 300B has been mounted to the portable telephone 100B. While the recording medium 300B is being mounted, the portable telephone 100B continues to output the mounting-detect signal to the detection unit of the recording medium 300B.

3.3 The Structure of the Recording Medium 300B

In this section, the structure of the recording medium 300B is described.

Figure 20:
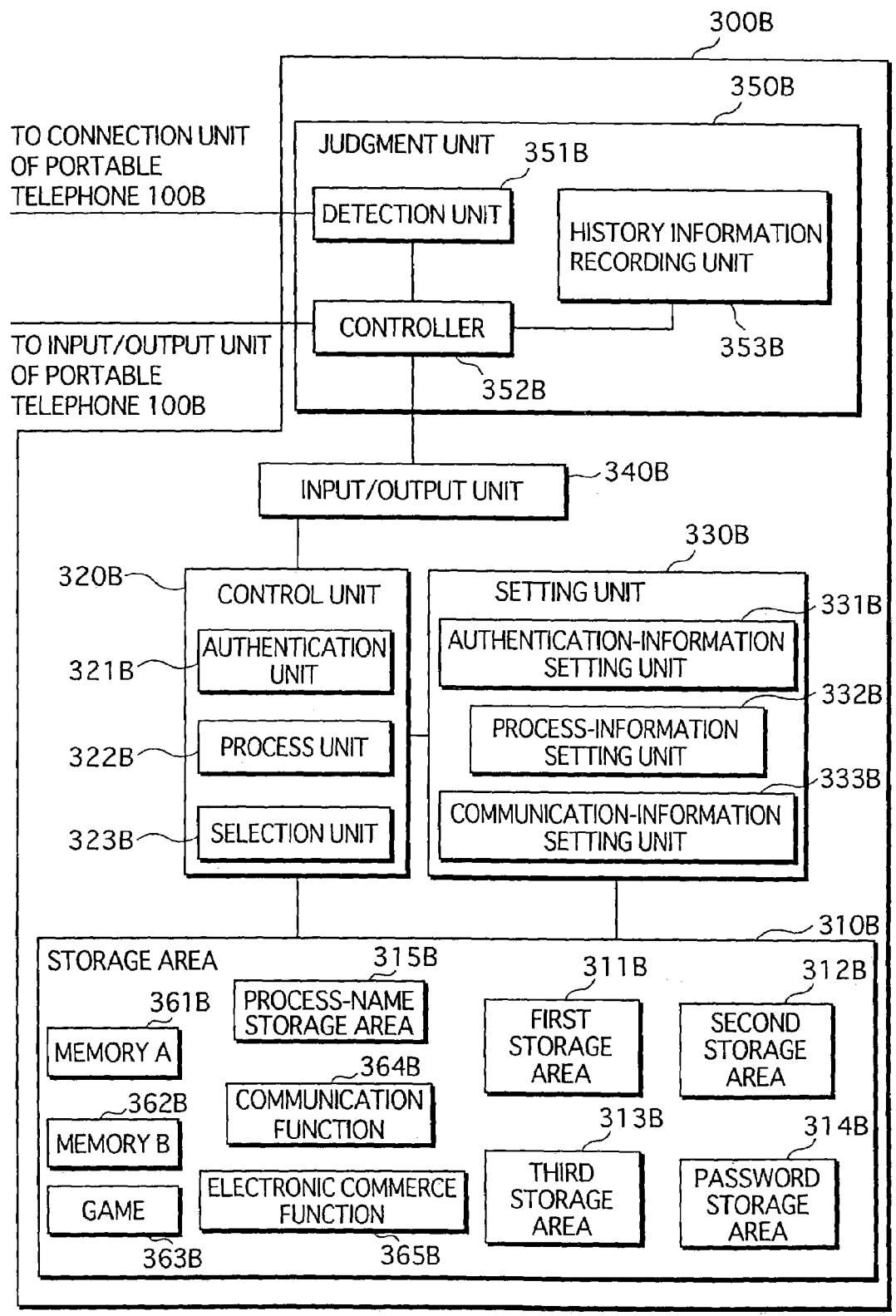
FIG. 20 is a block diagram illustrating the structure of the recording medium 300B that relates to the third embodiment.

As shown in FIG. 20, the recording medium 300B is comprised of a storage area 310B, a control unit 320B, a setting unit 330B, an input/output unit 340B, and a judgment unit 350B.

The recording medium 300B is specifically a computer system which is comprised of a microprocessor, a ROM, a RAM, and the like. The ROM stores thereon a computer program. The recording medium 300B performs functions by using the microprocessor according to the computer program.

(1) The Storage Area 310B

The storage area 310B includes a first storage area 311B, a second storage area 312B, a third storage area 313B, a password storage area 314B, and a process-name storage area 315B. The storage area 310B further includes a memory A 361B, a memory B 362B, a game 363B, a communication function 364B, and an electronic commerce function 365B, just as the storage area 310A of the second embodiment. Note here that the memory A 361B, the memory B 362B, the game 363B, the communication function 364B, and the electronic commerce function 365B have been stored in the recording medium 300B before purchase.

(a) The First Storage Area 311B

The first storage area 311B is the same as the first storage area 311A of the second embodiment, therefore a description thereof is omitted here.

(b) The Second Storage Area 312B

The second storage area 312B is the same as the second storage area 312A of the second embodiment, therefore a description thereof is omitted here.

(c) The Third Storage Area 313B

The third storage area 313B is the same as the third storage area 313A of the second embodiment, therefore a description thereof is omitted.

(d) The Password Storage Area 314B

The password storage area 314B stores thereon the password which identifies the owner of the recording medium 300B, that is used in judging whether or not a user matches the owner of the recording medium 300B.

Note that herein after, the password stored in the password storage area 314B is called "registration password."

(e) The Process-Name Storage Area 315B

The process-name storage area 315B is the same as the process-name storage area 315 of the first embodiment, and as the process-name storage area 315A of the second embodiment, therefore a description thereof is omitted.

(2) The Judgment Unit 350B

The judgment unit 350B includes therein a detection unit 351B, a controller 352B, and a history information recording unit 353B.

(a) The Detection Unit 351B

When the recording medium 300B is mounted to the portable telephone 100B, the detection unit 351B is connected to the connection unit 115B included in the portable telephone 100B, receives a mounting-detect signal from the connection unit 115B, and outputs the received mounting-detect signal to the history information recording unit 353B via the controller 352B.

While the recording medium 300B is being mounted to the portable telephone 100B, the detection unit 351B continues to output the mounting-detect signal to the history information recording unit 353B via the controller 352B.

(b) The Controller 352B

The controller 352B receives the mounting-detect signal from the detection unit 351B, and outputs the received mounting-detect signal to the history information recording unit 353B. The controller 352B also outputs information received from the history information recording unit 353B to the input/output unit 340B, and further performs an input/output of information with the portable telephone 100B via the input/output unit 119B of the portable telephone 100B.

(c) The History Information Recording Unit 353B

The history information recording unit 353B has a history information storage area 354B for storing therein history information. The history information storage area 354B includes a history information table T400 as illustrated in FIG. 21. Here, the history information is composed of: category information showing that the recording medium 300B is mounted to the portable telephone 100B; date/time information showing the date and time in which the recording medium 300B is mounted to the portable telephone 100B; and position information showing the position at which the recording medium 300B is mounted to the portable telephone 100B.

The history information table T400 stores therein at least one set of such history information showing category, date/time, and position.

"Category" in this figure represents category information indicating that the recording medium 300B is mounted to the portable telephone 100B; "date/time" in this figure represents date/time information indicating the date and time of the mounting; and "position" therein represents position information indicating the position of the mounting and is registered in a unit of municipalities.

When the recording medium 300B is mounted, the history information recording unit 353B receives a mounting-detect signal from the controller 352B. Upon receiving the mounting-detect signal, the history information recording unit 353B outputs, to the portable telephone 100B, information for inquiring about the current date/time and the current position, receives from the portable telephone 100B information relating to the current date/time and information on the current position, generates history information for the use of each piece of the received information, and registers the generated history information into the history information table T400. After the registration of the history information, the history information recording unit 353B outputs authentication-instruction information for instructing an authentication-start to the authentication unit 321B.

(3) The Setting Unit 330B

The setting unit 330B is tamper-resistant, and includes therein an authentication-information setting unit 331B, a process-information setting unit 332B, and a communication-information setting unit 333B.

(a) The Authentication-Information Setting Unit 331B

The authentication-information setting unit 331B registers authentication information into the first storage area 331B, and a registration password into the password storage area 314B.

The registration of the registration password is performed as follows. That is, the authentication-information setting unit 331B receives, from the input/output unit 340B via the control unit 320B information composed of the registration password and information for instructing registration of the registration password, and registers the registration password into the password storage area 314B with use of the received information. Note that the registration password can be changed even after registration.

The registration of authentication information is the same as those of the first embodiment and the second embodiment, therefore a description thereof is omitted.

Note that the setting of the registration password is performed from an external terminal or from the portable telephone 100B, and the registration of the authentication information is performed from an external terminal.

(b) The Communication-Information Setting Unit 333B

The communication-information setting unit 333B registers communication information received from the input/output unit 340B via the control unit 320B, and registers the communication information.

The registration of the communication information is the same as that performed by the communication-information setting unit 333A shown in the second embodiment, therefore a description thereof is omitted.

(c) The Process-Information Setting Unit 332B

The process-information setting unit 332B receives process information from the input/output unit 340B via the control unit 320B, and registers the process information.

The registration of the process information is the same as that performed by the process-information setting unit 332A shown in the second embodiment, therefore a description thereof is omitted.

(4) The Control Unit 320B

The control unit 320B is tamper-resistant, and includes an authentication unit 321B, a process unit 322B, and a selection unit 323B.

The control unit 320B receives authentication-start information and other types of information, from the portable telephone 100B via the input/output unit 340B. Upon receiving information from the portable telephone 100B, the control unit 320B judges whether or not the received information is authentication-start information. If it is judged that it is authentication-start information, the control unit 320B outputs the received authentication-start information to the authentication unit 321B and instructs the authentication unit 321B to start authentication. If the received information is judged to not be authentication-start information, authentication will not be performed.

(a) The Authentication Unit 321B

Here, the authentication unit 321B is described.

(i) The Authentication while the Recording Medium 300B is Being Mounted

The authentication unit 321B, upon receiving authentication-instruction information from the history information recording unit 353B, reads first history information, which is the latest history information, and second history information, which is the history information from the last time, then calculates the difference in date/time there between, with use of the date/time item of the first history information and the date/time item of the second history information. Then, the authentication unit 321B judges whether or not the calculated difference in date/time exceeds the predetermined time interval stored in the authentication unit 321B. In this example, the predetermined time interval stored in the authentication unit 321B is 30 minutes, and is set at the time of purchase of the recording medium 300B from an external terminal.

If the difference in date/time is judged to exceed the predetermined time interval, the authentication unit 321B outputs a password input request to the portable telephone 100B via the input/output unit 340B.

If the difference in date/time is judged not to exceed the predetermined time interval, the authentication unit 321B judges whether or not the position of mounting differs between the first history information and the second history information. If the positions of mounting are judged to be identical, the authentication unit 321B outputs, to the process unit 322B, authentication-unnecessary information for instructing to not perform authentication. On the contrary, if the positions of mounting are judged to differ, the authentication unit 321B outputs a password input request to the portable telephone 100B via the input/output unit 340B.

When receiving the input password from the portable telephone 100B, the authentication unit 321B judges whether or not the received input password matches the registration password stored in the password storage area 314B. If the received input password is judged to match, the authentication unit 321B instructs the selection unit 323B to output list information.

If the received input password is judged not to match, the authentication unit 321B outputs a message reporting that the input password is not correct to the portable telephone 100B via the input/output unit 340B.

Note that the operation of instructing the selection unit 323B to output list information is the same as that performed by the authentication unit 321A of the second embodiment, therefore a description thereof is omitted.

(ii) The Authentication According to a User Instruction

The authentication unit 321B receives authentication-start information from the control unit 320B. Upon receiving the authentication-start information, the authentication unit 321B outputs a password input request to the portable telephone 100B via the input/output unit 340B. Upon receiving an input password from the portable telephone 100B, the authentication unit 321B judges whether or not the received input password matches the registration password that has been registered in the password storage area 314B. If they are judged to match each other, the authentication unit 321B instructs the selection unit 323B to output list information.

If the passwords are judged to not match each other, the authentication unit 321B outputs, to the portable telephone 100B via the input/output unit 340B, a message reporting that the input password is not correct.

Note that the operation instructing the selection unit 323B to output list information is the same as that performed by the authentication unit 321A of the second embodiment, therefore a description thereof is omitted.

(b) The Process Unit 322B

The process unit 322B receives either authentication-unnecessary information from the authentication unit 321B, or an authentication number and a communication number from the authentication unit 321B.

When receiving authentication-unnecessary information from the authentication unit 321B, the process unit 322B judges whether or not process-in-use information has been stored in the process-name storage area 315B. If process-in-use information has been stored, it will be read from the process-name storage area 315B, and the process name is acquired from the read process-in-use information. Then, the access right is given to the process corresponding to the process whose process name has been acquired, so as to enable execution of the process.

When receiving an authentication number and a communication number from the authentication unit 321B, the process unit 322B performs the same operation as the process unit 322A of the second embodiment, therefore a description thereof is omitted.

(c) The Selection Unit 323B

The selection unit 323B, upon receiving, from the authentication unit 321B, an information instruction to output list information, requests the portable telephone 100B to input number-to-be used information, and accepts the number-to-be used information corresponding to the number that the user wants to use.

Note that the acceptance of the number-to-be used information is the same as that performed by the second embodiment, therefore a description thereof is omitted.

(5) The Input/Output Unit 340B

The input/output unit 340B receives, from the controller 352B of the judgment unit 350B, information of either the portable telephone 100B or an external terminal, and outputs the received information either to the control unit 320B, or to the setting unit 320B via the control unit 320B, according to the content of the received information.

The input/output unit 340B also outputs information received from the control unit 320B, to the portable telephone 100B via the controller 352B of the judgment unit 350B.

3.4 The Operations of the Recording-Medium Unauthorized Use Prevention System 3

In this section, each operation of the recording-medium unauthorized use prevention system 3 is described. Note that the operations for setting authentication information, communication information, and process information are the same as those of the second embodiment, therefore a description thereof is omitted.

(1) The Registering Operation of History Information

Figure 22:
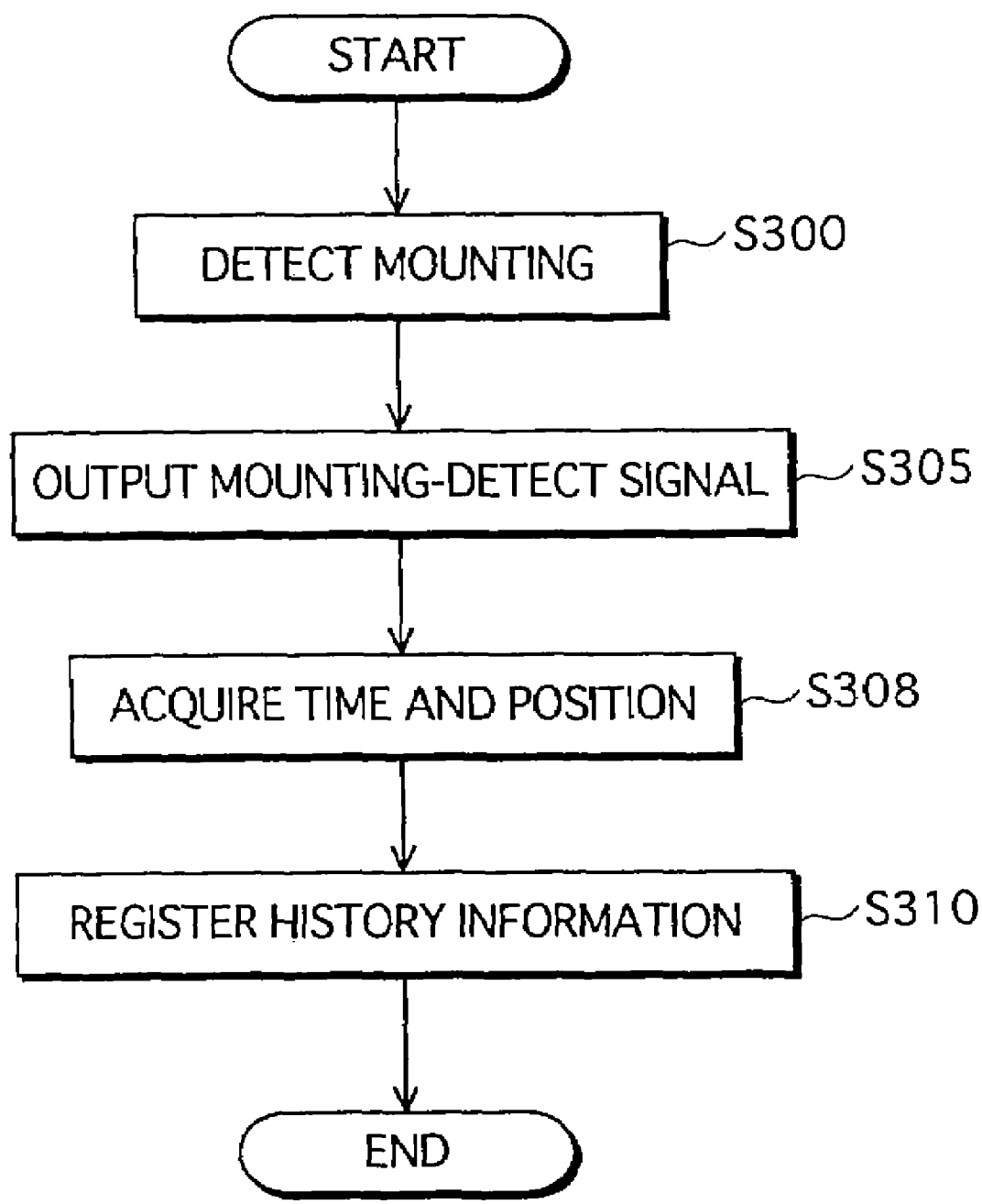
FIG. 22 is a flowchart illustrating the operation for registering history information, which relates to the third embodiment.

Here, the operation for registering history information is described with reference to the flowchart shown in FIG. 22.

The detection unit 351B receives a mounting-detect signal from the connection unit 115B of the portable telephone 100B, by being connected to the connection unit 115B, and outputs the received mounting-detect signal to the controller 352B (Step S300).

The controller 352B, upon receiving the mounting-detect signal, outputs the received mounting-detect signal to the history information recording unit 353B (Step S305).

The history information recording unit 353B, upon receiving the mounting-detect signal, outputs, to the portable telephone 100B, information inquiring about the current date/time and the current position, then receives, from the portable telephone 100B, information relating to the current date/time and the current position (Step S308). The history information recording unit 353B generates history information with use of each piece of the received information, and registers the generated history information into the history information table T400, and instructs the authentication unit 321B to start authentication (Step S310).

(2) The Authentication Operation

Here, the authentication operation is described with reference to the flowcharts shown in FIGS. 23 and 24.

Upon receiving an instruction to start authentication from the history information recording unit 353B, the authentication unit 321B acquires first history information and second history information from the history information table T400 (Step S400), and judges whether or not the difference between the date/time of mounting the last (i.e., previous) time and the date/time of mounting this (i.e., present) time is within a predetermined time period, with use of date/time items in the acquired pieces of information (Step S405).

If the difference is judged to be within the predetermined time period, the authentication unit 321B judges whether or not the position of mounting the last time and the position of mounting this time differ from each other, with use of the position items in the acquired pieces of information (Step S410).

If the positions are judged to be the same, the authentication unit 321B outputs authentication-unnecessary information to the process unit 322B, and an access right setting operation is performed at the process unit 322B (Step S475).

If the positions are judged to differ, the authentication unit 321B outputs a password input request to the portable telephone 100B, receives an input password from the portable telephone 100B (Step S415), and judges whether or not the received input password matches the registration password (Step S420).

If the mentioned passwords are judged to not match each other, the authentication unit 321B generates identification-impossible information, outputs the generated identification-impossible information to the portable telephone 100B, and ends the operation (Step S425).

If the mentioned passwords are judged to match each other, the selection unit 323B generates list information with use of each telephone number stored in the third storage area 313B, and outputs the generated list information to the portable telephone 100B (Step S430). Next, the number-to-be used information inputted from the portable telephone 100B is received through the input/output unit 340B, and the communication number of the communication information that corresponds to the received number-to-be used information is acquired (Step S435). Note that until the number-to-be used information is received, the operation is in a wait state for receiving number-to-be used information, at Step S435.

Next, the authentication unit 321B generates input-means information, and outputs the generated input-means information to the portable telephone 100B (Step S436). The authentication unit 321B then receives, from the portable telephone 100B, one of first input information, second input information, or third input information (Step S437), and performs user information reception operation (Step S440).

Next, the authentication unit 321B judges whether or not there is, within the first storage area 311B, authentication information that matches the received user information (Step S445).

If there is authentication information matching the received user information, the authentication unit 321B acquires the authentication number of the matching authentication information from the first storage area 311B, and outputs, to the process unit 322B, the acquired authentication number together with the communication number that has been acquired at Step S435 (Step S450). The process unit 322B judges whether or not there is process information that corresponds to the received set of the communication number and the authentication number (Step S470). If there is such process information, an access right setting operation is performed (Step S475) If there is no such process information that corresponds to the set of the communication number acquired at the selection unit 323B and the authentication number acquired at the authentication unit 321B, the process unit 322B generates combination-impossible information, and outputs the generated combination-impossible information to the portable telephone 100B via the input/output unit 340B (Step S480).

If there is no authentication information that matches the received user information, the authentication unit 321B generates authentication-impossible information, and outputs the generated authentication-impossible information to the portable telephone 100B via the input/output unit 340B (Step S455). Then judgment is performed whether any authentication-unnecessary number exists (Step S460). If no such authentication-unnecessary number exists, the operation ends. If such an authentication-unnecessary number exists, it is acquired (Step S465), and the operation from Step S470 is performed.

If, at Step S405, the difference is judged not to be within the predetermined time period, the operation from Step 415 is performed.

Note that the authentication according to user instruction is performed as follows.

That is, the control unit 320B receives information from the portable telephone 100B, and judges whether or not the received information is authentication-start information. If it is judged that the received information is authentication-start information, the control unit 320B outputs the received authentication-start information to the authentication unit 321B. After receipt of the authentication-start information, the operation from Step S415 shown in FIG. 23 is performed, so as to realize the authentication.

If the information received at the control unit 320B is judged not to be authentication-start information, authentication will not be performed.

(3) The User Information Reception Operation

Figure 23:
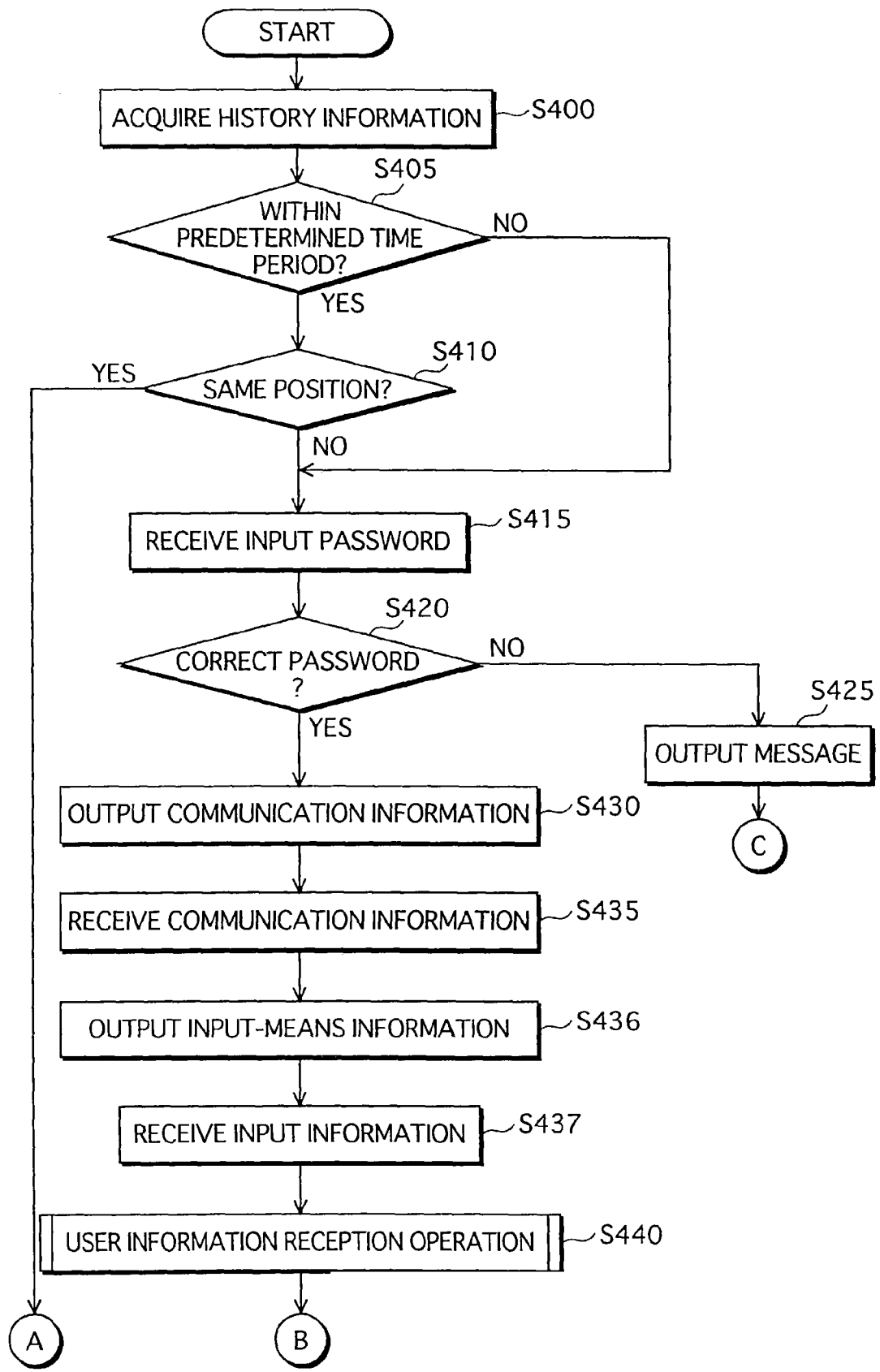
FIG. 23 is a flowchart illustrating the authentication operation that relates to the third embodiment, which continues to FIG. 24.

The user information reception operation shown in FIG. 23 is the same as the user information reception operation of the first embodiment which is shown in FIG. 8. Therefore, a description thereof is omitted.

(4) The Access Right Setting Operation

Figure 24:
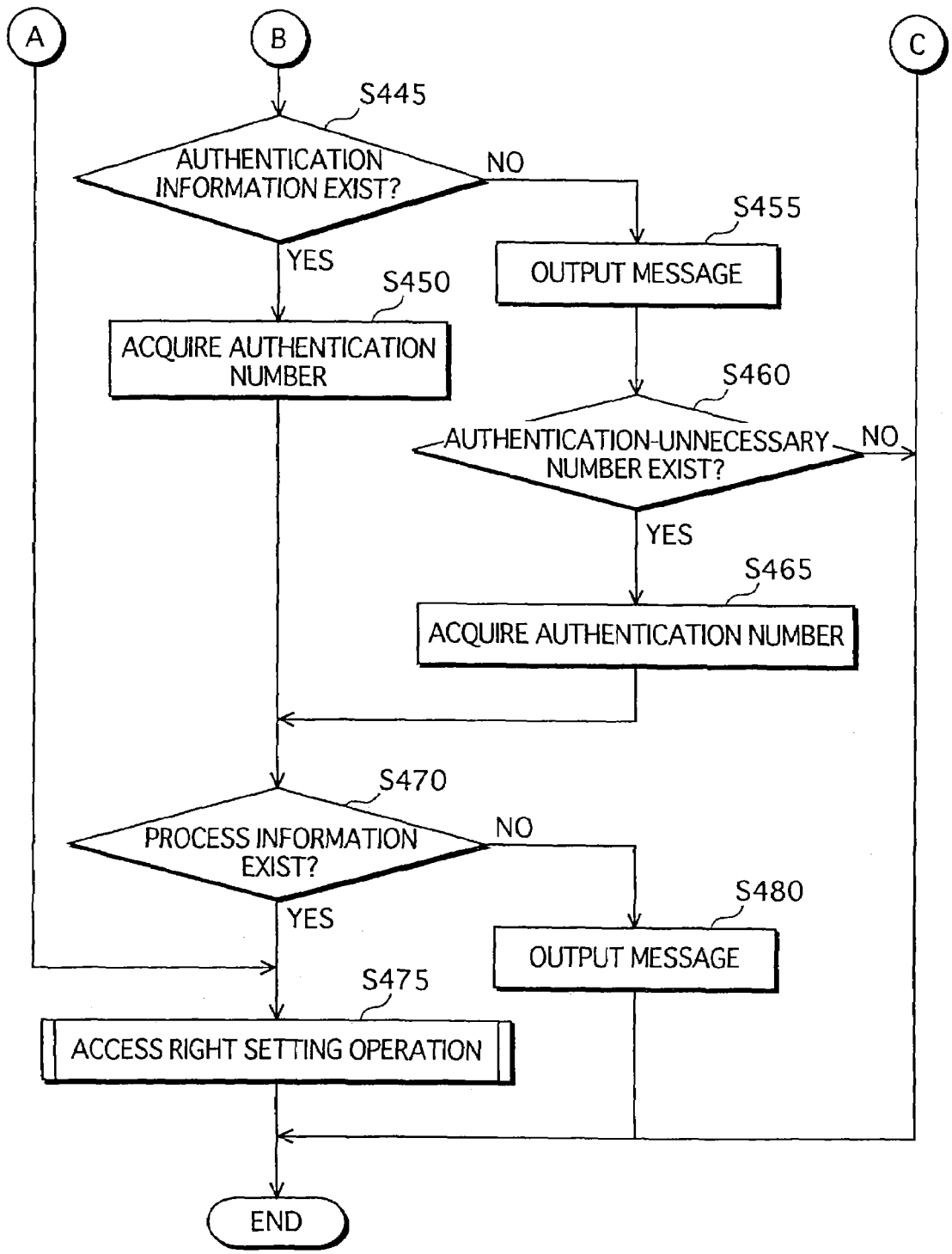
FIG. 24 is a flowchart illustrating the authentication operation that relates to the third embodiment, which is a continuation from FIG. 23.
Figure 25:
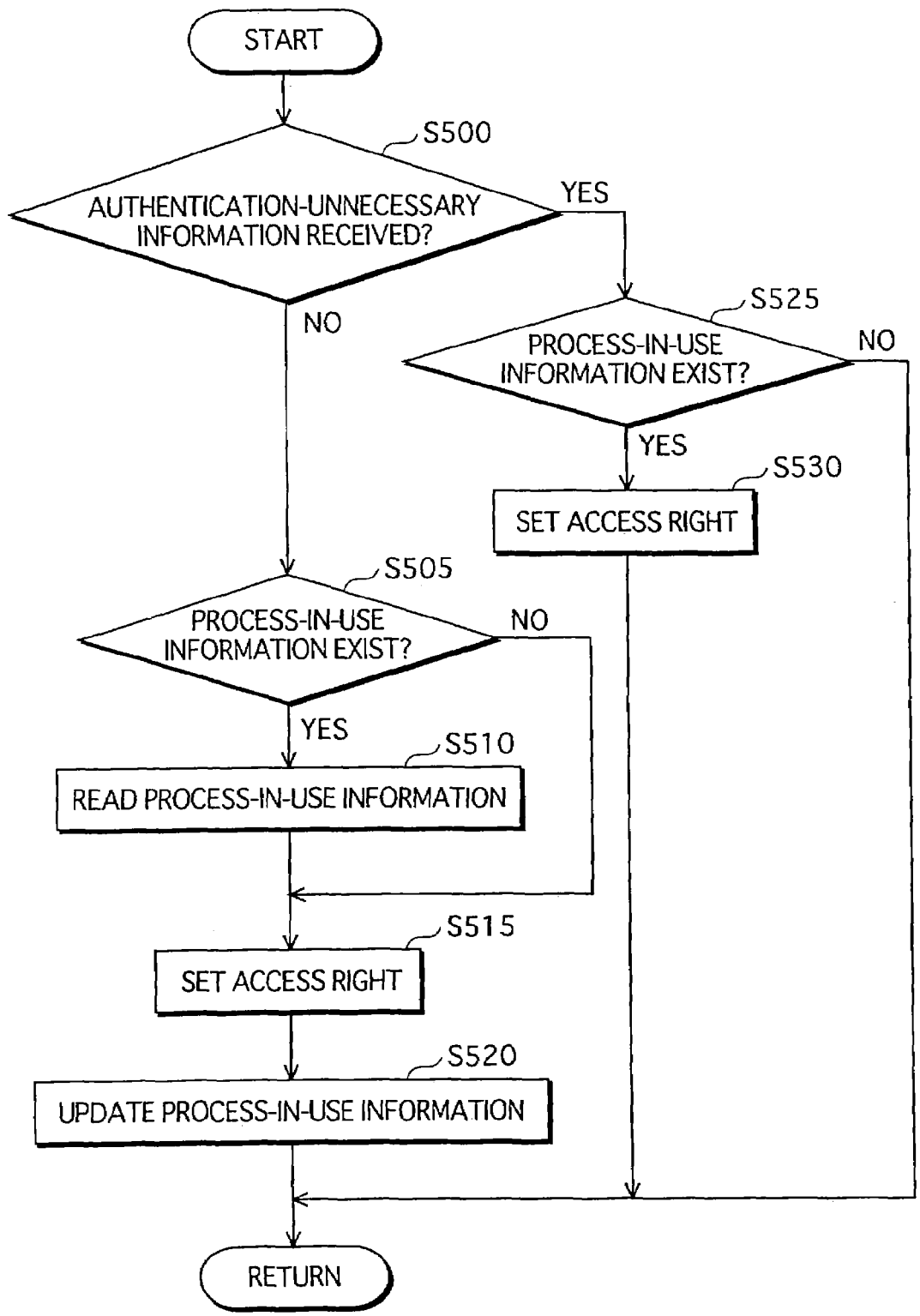
FIG. 25 is a flowchart illustrating the access right setting operation that relates to the third embodiment.

Here, the access right setting operation mentioned in FIG. 24 is detailed with reference to the flowchart of FIG. 25.

The process unit 322B judges whether or not authentication-unnecessary information is received from the authentication unit 321B (Step S500).

If the authentication-unnecessary information is not received, the process unit 322B further judges whether or not there is process-in-use information (Step S505). If there is process-in-use information, the process unit 322B reads the process-in-use information and acquires the process name of the process having been made accessible, and sets access rights so that the process corresponding to the acquired process name is made inaccessible (Step S510). Further, the process unit 322B acquires, from the second storage area 312B, process information corresponding to the set of the first number and the second number that matches the set of communication number and the authentication number that has been received from the authentication unit 321B, sets the access rights to the process corresponding to the process name registered in the acquired process information, so that the process is made accessible (Step S515). The process unit 322B updates the process-in-use information in the process-name storage area 315B, with use of the process name registered in the process information acquired at Step S515 (Step S520). If there is no process-in-use information, the operation from Step S270 is performed.

If the process unit 322B judges that it has received authentication-unnecessary information, it further judges whether or not there is process-in-use information (Step S525). If there is process-in-use information, the process unit 322B reads process-in-use information from the process-name storage area 315B, acquires the process name of the process that has been made accessible, and sets access right to the process for the acquired process name, so that the process is made accessible (Step S530). If there is no process-in-use information, the operation ends.

(5) Examples of Authentication Operation

Here, a specific flow of authentication operation up to Step S420 is described with use of the history information table T400 shown in FIG. 21. Note that the flow from Step S430 is the same as the corresponding authentication operation flow of the second embodiment, therefore a description thereof is omitted.

A case is taken as an example in which history information 402 has been registered as latest information.

The authentication unit 321B, upon receiving authentication-instruction information, acquires the history information 402 as first history information, and history information 401 as second history information. Then, the authentication unit 321B judges whether or not the latest mounting was performed within a predetermined time period, with use of date/time items in the acquired pieces of history information. Since the difference is 50 minutes in this case, the authentication unit 321B accepts an input password, and judges the correctness of the accepted input password.

Next, a case is detailed in which history information 403 has been registered as latest information.

The authentication unit 321B, upon receiving authentication-instruction information from the history information storage area 353B via the input/output unit 340B, acquires the history information 403 as first history information, and the history information 402 as second history information. Then, the authentication unit 321B judges whether or not the latest mounting was performed within a predetermined time period, with use of date/time items in the acquired pieces of history information. Since the difference is 20 minutes in this case, the authentication unit 321B judges whether or not the mounting for both times was performed at the same position. Since the positions of mounting are different in this case, the authentication unit 321B accepts an input password, and judges the correctness of the accepted input password.

Next, a case is detailed in which history information 404 has been registered as the latest information.

The authentication unit 321B, upon receiving authentication-instruction information from the history information storage area 353B via the input/output unit 340B, acquires the history information 404 as first history information, and the history information 403 as second history information. Then, the authentication unit 321B judges whether or not the latest mounting was performed within a predetermined time period, with use of date/time items in the acquired pieces of history information. Since the difference is 5 minutes in this case, the authentication unit 321B judges whether or not the mounting for both times was performed at the same position. Since the positions of mounting are the same in this case, the authentication unit 321B does not accept an input password. Further, the process unit 322B sets access rights and the like with use of the process information having been acquired the last time and retained thereafter, so that the process is made accessible.

3.5 Summary of the Third Embodiment

As described above, the recording-medium unauthorized use prevention system 3 has, within the recording medium 300B, an authentication unit 321B that is tamper-resistant. This makes it difficult for third parties to encode or tamper the authentication system of the authentication unit. Therefore, it prevents unauthorized third parties from accessing the recording medium 300B.

In addition, the recording medium 300B detects mounting of itself to the portable telephone 100B, and once it is removed from the portable telephone 100B, the recording medium 300B requires the user to input the input password and the user information, if it is re-mounted after a predetermined time has passed, or if the position of mounting differs from last time. According to this, even when a third party has removed the recording medium 300B from the portable telephone 100B, this person has to input the input password and the user information, if the recording medium 300B is re-mounted after a predetermined time has passed, or if the position of mounting differs from the last time. This makes the recording medium 300B more difficult to be subject to unauthorized use, than conventionally.

4. Other Modification Examples

As described above, the recording medium includes therein an authentication unit that is tamper-resistant. This makes it difficult for third parties to encode or tamper the authentication system of the authentication unit. Accordingly, the recording medium is more effective in preventing third parties from using the recording medium, than conventional recording media.

In addition, the recording medium stores thereon one or more pieces of authentication information, and further one or more pieces of process information that each correspond to a piece of authentication information. Therefore, the user can use appropriate user information according to functions the user wants to use. This makes it possible to restrict use of functions stored in this recording medium. Accordingly, this recording medium is more effective in preventing an unauthorized use thereof by third parties, than conventional recording media.

In addition, the recording medium stores thereon one or more pieces of communication information, and further one or more pieces of process information that each correspond to both a piece of communication information and a piece of authentication information. Therefore, the user can use appropriate user information according to functions the user wants to use. This makes it possible to restrict use of the functions stored in this recording medium. Accordingly, this recording medium is more effective in preventing unauthorized use thereof by third parties, than conventional recording media. In addition, since the recording medium is operable to store thereon a plurality of pieces of communication information, the user does not have to carry a plurality of recording media, unlike conventional SIM cards. This reduces possibility of unauthorized use incident to loss or robbery.

In addition, the recording medium can detect mounting of itself to the portable telephone, and once it is removed from the portable telephone, the recording medium requires the user to input the input password and the user information, if it is re-mounted after a predetermined time has passed, or if the position of mounting differs from the last time. According to this, even when a third party has removed the recording medium from the portable telephone, this person has to input the input password and the user information if the recording medium is re-mounted after a predetermined time has passed or if the position of mounting differs from the last time. This makes the recording medium more difficult to be subject to unauthorized use, than conventionally.

So far, the present invention has been described based on the aforementioned embodiments. However, needless to say, the present invention is not limited to the aforementioned embodiments, and includes the following examples.

(1) In the aforementioned description, the recording-medium unauthorized use prevention system has a portable telephone to which a recording medium is mountable. However, the present invention is not limited to such structure, and may have any kind as long as it is a terminal device to which a recording medium is mountable. Such terminal devices include a PDA (personal digital assistant), a personal computer, a car navigation system, a facsimile machine, and a digital camera.

(2) In the aforementioned description, user information is received from the portable telephone. However, the present invention is not limited to such a structure, and may be a structure in which a recording medium is equipped with a fingerprint input unit, from which fingerprint information is received.

(3) In the present invention, the authentication information may be one of character information, biological information that represents biological characteristics of the user, and a combination of character information and biological information. Accordingly, the user information may also be one of character information, biological information that represents biological characteristics of the user, and a combination of character information and biological information. Furthermore, in the third embodiment, input password and the registration password may also be one of character information, biological information that represents biological characteristics of the user, and a combination of character information and biological information.

Here, the biological information is, for example, fingerprint information, voice print information that represents characteristics of voice print of the user, iris information that represents characteristics of iris of the user, face-outline information that represents characteristics of face-outline of the user, DNA information that represents characteristics of DNA of the user, and a combination of any of the aforementioned information.

To accept voice print information, the portable telephone has to have a voice print input unit that receives voice of the user and generates voice print information of the user, using the received voice. To accept iris information, the portable telephone has to have an iris input unit that reads (scans) the iris of the user and generates iris information of the user, using the read (scanned) iris. Likewise, to accept face-outline information, the portable telephone has to have a face-outline input unit that reads (scans) the face-outline of the user and generates face-outline information of the user, using the read (scanned) face-outline. To accept DNA information, the portable telephone has to have a DNA-information input unit that accepts DNA information resulting from analyzing the DNA of the user. Here, the DNA information is analytical information of hair, blood, or saliva of the user.

Note here that matching of authentication information with the voice print information received at the recording medium happens when at least 80% of the received voice print information matches authentication information. The same restriction applies to matching of authentication information with the iris information, matching of authentication information with the face-outline information, matching of authentication information with the DNA information. The reference value 80% may be another value. Matching of authentication information with a combination of any of the aforementioned information happens when all the information included in the authentication information matches all the information included in the combination of information.

(4) In the present invention, user information may be encrypted before being output from the portable telephone to the recording medium.

An example operation performed in this case is shown as follows.

A common key is owned by the portable telephone and the recording medium. The portable telephone encrypts the input user information using the common key, and outputs the encrypted user information to the recording medium, and the recording medium decrypts the encrypted user information using the common key, to obtain the user information input from the portable telephone.

(5) In the aforementioned description, the first storage area is set in the recording medium. However, the present invention is not limited to this structure, and the first storage area may be set in the portable telephone.

Furthermore, the second storage area set in the recording medium may be set in the portable telephone.

Likewise, the third storage area set in the recording medium may be set in the portable telephone.

Likewise, the password storage area set in the recording medium may be set in the portable telephone.

Likewise, the process unit set in the recording medium may be set in the portable telephone.

(6) In the aforementioned description, registration performed at the setting unit is operated through an external device. However, the present invention is not limited to such structure, and another structure is also possible in which registration is performed through a network such as the Internet to which the portable telephone is connected.

(7) In the aforementioned description, the setting unit is used to register each piece of information to the storage area. However, the present invention is not limited to such a structure, and another structure is also possible in which the setting unit performs modification and deletion of already registered information, not only registration.

The following describes how modification and deletion are performed to the authentication information and the process information of the first embodiment. In modifying authentication information, the recording medium receives, from an external terminal, the authentication number that corresponds to the authentication information to be modified, together with the authentication information after modified, and updates the authentication information table with use of the received pieces of information. In deleting authentication information, the recording medium receives, from an external terminal, the authentication number to be deleted, deletes the authentication information using the received authentication number, and further deletes the process information that corresponds to the deleted authentication information. In modifying process information, the recording medium receives, from an external terminal, the process number that corresponds to the process information to be modified, together with the process information after the modification, and updates the process information table with use of the received pieces of information. In deleting process information, the recording medium receives, from an external terminal, the process number to be deleted, and deletes the process information using the received process number, and further deletes the authentication information that corresponds to the deleted process information.

Next, the following describes how modification and deletion are performed on the authentication information, the communication information, and the process information, of the second and third embodiments.

In modifying authentication information, the recording medium receives, from an external terminal, the authentication number that corresponds to the authentication information to be modified, together with the authentication information after the modification, and updates the authentication information table with use of the received pieces of information. In deleting authentication information, the recording medium receives, from an external terminal, the authentication number to be deleted, deletes the authentication information using the received authentication number, and further deletes the process information that corresponds to the deleted authentication information.

In modifying communication information, the recording medium receives, from an external terminal, the communication number that corresponds to the communication information to be modified, together with the communication information after the modification, and updates the communication information table with the received pieces of information. In deleting communication information, the recording medium receives, from an external terminal, the communication number to be deleted, and deletes the communication information using the received communication number, and further deletes the process information that corresponds to the deleted communication information.

In modifying process information, the recording medium receives, from an external terminal, a set of first number and second number that corresponds to the process information to be modified, together with the process information after the modification, and updates the process information table with use of the received pieces of information. In deleting process information, the recording medium receives from an external terminal the set of the first number and the second number to be deleted, and deletes the process information using the received set of the first number and the second number.

(8) In the aforementioned description, the process name of process information to be registered in the second storage area is the process name owned by the recording medium. However, the present invention is not limited to such, and the process name of process information to be registered in the second storage area may be the process name owned by the portable telephone.

(9) In the aforementioned description, the recording-medium unauthorized use prevention system comprises a portable telephone and a recording medium. However, the present invention is not limited to such structure, and the system may include only a portable telephone. In this case, each process that corresponds to the process information to be registered in the second storage area may be set in a recording medium located inside the portable telephone, or may be set in a recording medium that can be mounted to the portable telephone, or may be set in both of them.

In this case, one example of the timing when the judgment should be performed as to whether or not to receive an input password is as follows. That is, the portable telephone detects every time the power supply starts the portable telephone, and stores the detected timing as history information. The judgment whether or not to receive an input password is performed with use of this history information. Alternatively, the password may be received every time the starting of the power supply is detected.

Figure 6:
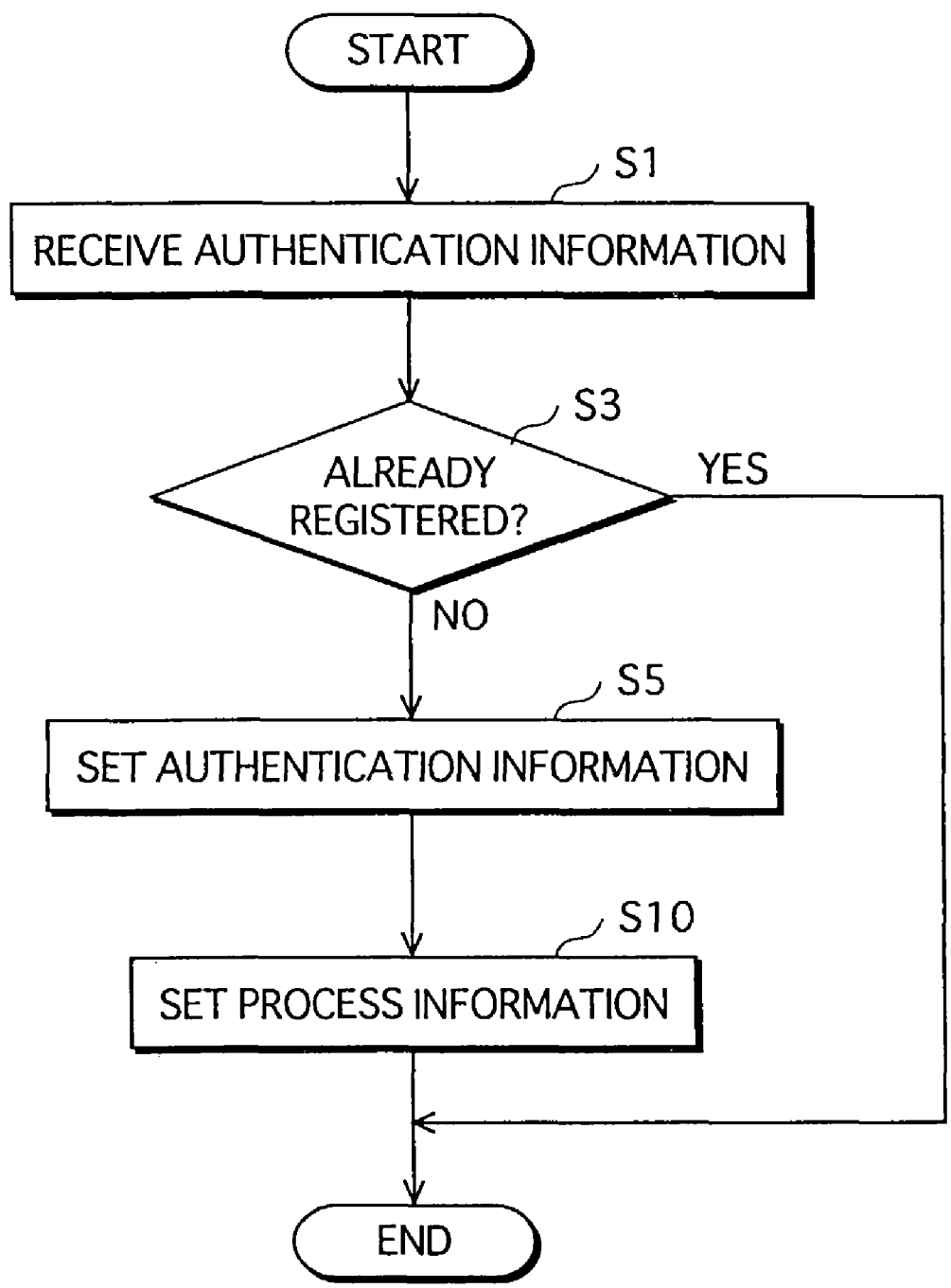
FIG. 6 is a flowchart illustrating the operations for setting authentication information and process information, which relate to the first embodiment.

(10) The operation for setting authentication information and process information, which is shown in the first embodiment, is not limited to the flowchart of FIG. 6. An other structure is also possible in which process information is set first, and then authentication information is set afterward.

An example of operation for this case is described as follows. The recording medium receives, from an external terminal, process information to be registered, then calculates a process number, and with use of the calculated process number, sets the received process information. Next, the recording medium receives from an external terminal, authentication information to be registered, and judges whether or not the received authentication information has already been registered. If the received authentication information has not yet been registered, the process number calculated in the setting of the process information is used as an authentication number, and the recording medium performs authentication information setting this authentication number and the received authentication information. If the received authentication information has already been registered, different authentication information is received and a setting operation is performed.

(11) In the second embodiment, a telephone number is stored as communication information. However, the present invention is not limited to such. An other structure is possible in which a telephone number is encrypted using a function, and the encrypted information is stored. In performing communication, the encrypted information is transmitted to the base station. An example of encryption method is stream cipher.

According to the structure in which a telephone number is stored after being encrypted using a function, any third party is prevented from easily knowing the telephone number, even if this person has acquired the communication information stored in the third storage area 313A. This prevents unauthorized use by third parties.

Here, the function used in encryption of a telephone number may be stored in the recording medium, or may be retained by an agent who provides the portable telephone with communication functions through the communication information.

Alternatively, in advance, the owner of the communication information may convert a telephone number into information that only he can know. In this case, too, unauthorized use by third parties is prevented.

In this case, list information may be generated with use of the communication information stored in the communication information table, as it is. Or the encrypted information may be decrypted first, then list information is generated with use of the decrypted information.

Alternatively, the communication information table may be provided with an item for registering therein such encrypted information in correspondence with a telephone number. In this structure, a registered telephone number is used for generating list information, and encrypted information corresponding to the selected telephone number is used in communication.

Alternatively, it is possible to register encrypted information in the communication information item of the communication information table, and to have a new table in which encrypted information is stored in correspondence with information before encryption, and to use this new table for the generation of list information.

Figure 15:
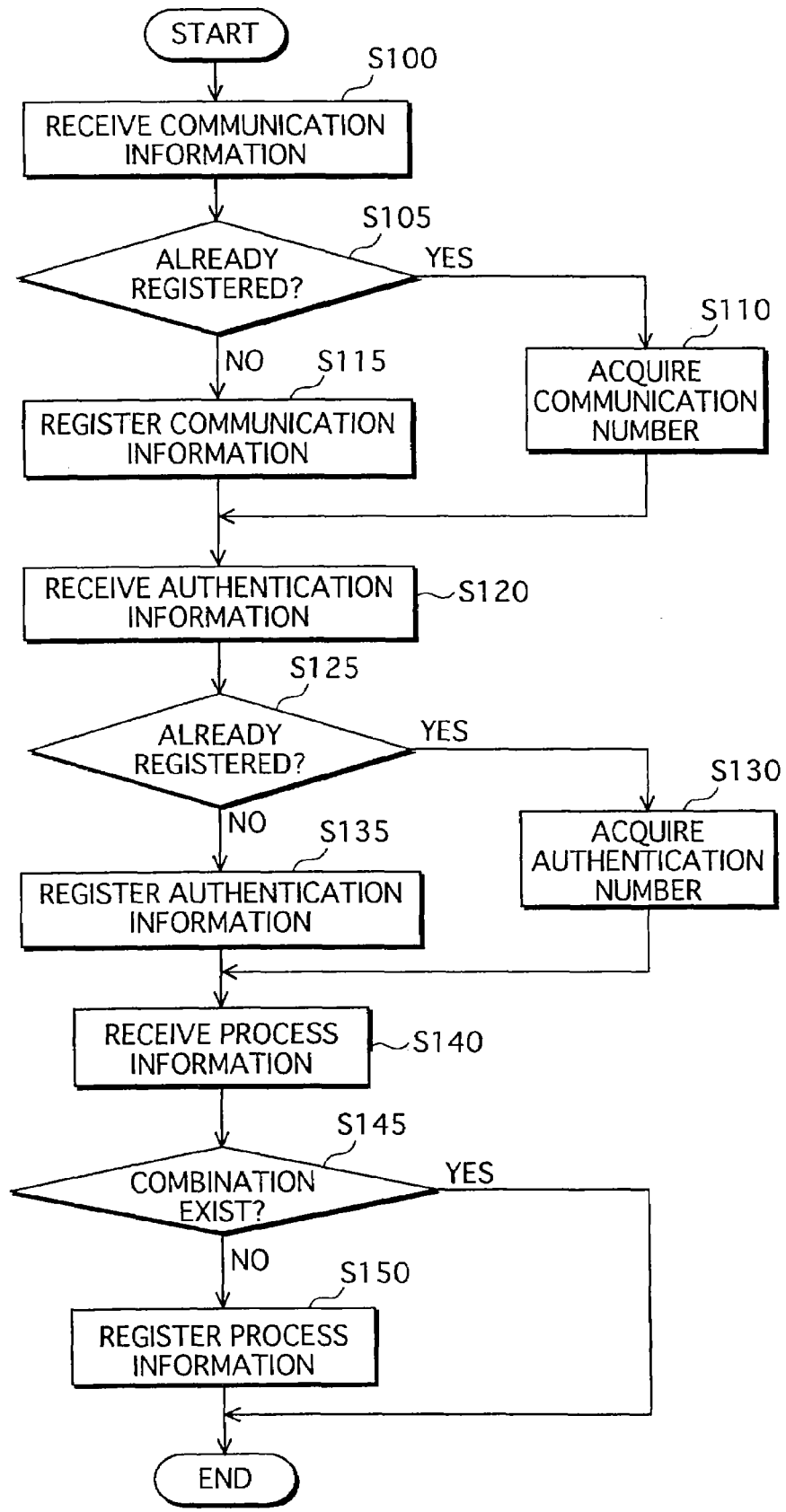
FIG. 15 is a flowchart illustrating the operations for setting communication information, authentication information, and process information, which relate to the second embodiment.

(12) Registration into each storage area described in the second embodiment is not limited to the order shown in FIG. 15, and may be in any order.

(13) In the second embodiment, a plurality of pieces of communication information are stored in the communication information table. However, the communication information table may have only one piece of communication information.

In this case, the process information is stored in the second storage area, after being associated with both of the communication information and the authentication information that has been registered in the second storage area. When user information is input in authentication, authentication information that corresponds to the input user information is recognized, and process information corresponding to both the authentication information and the communication information is acquired, and the process for the process name registered in the acquired process information is made accessible.

At this time, the selection unit may be eliminated from the structure, and the process unit may always read communication information from the third storage area.

(14) In the second embodiment, "N.A." as communication information which indicates that no communication information is necessary may be registered in the communication information table. In this case, process information is registered in association with the set of the communication information "N. A." and the corresponding authentication information. Note here that in setting process information, the process information setting unit has to control a disable setting of a communication function to the set of the communication information "N.A." and the corresponding authentication information.

(15) In the third embodiment, judgment as to whether or not an input password should be received is affirmative, either when the difference in date/time is no smaller than a predetermined value, or when the difference in position is no smaller than a predetermined value. However, the present invention is not limited to such. The judgment may be affirmative when the difference in date/time is no smaller than a predetermined value, and the difference in position is no smaller than a predetermined value.

In addition, judgment as to whether or not an input password should be received is based on both date/time information and position information. However, the present invention is not limited to such. Only one of date/time information or position information may be used in the judgment. Alternatively, it is also possible to structure so as to request an input password every time the mounting of the recording medium to the portable telephone is detected. In this case, the authentication unit may request the portable telephone to input the input password, upon receiving from the history information recording unit an instruction to start authentication.

Alternatively, the input password reception may be omitted. In this case, when the mounting of the recording medium to the portable telephone is detected, judgment as to whether or not authentication is required may be performed using the first history information and the second history information, and if the judgment is affirmative, communication information to be used and user information are accepted, and authentication is performed. Alternatively, it is also possible to structure so that communication information to be used and user information are accepted, every time the mounting of the recording medium to the portable telephone is detected. Here, if authentication should be performed according to a user instruction, it is only required that the recording medium request the portable telephone to input communication information and authentication information, upon receiving authentication-start information from the portable telephone.

(16) In the authentication in the third embodiment, the operation is not limited to what is shown in the flowchart of FIGS. 23 and 24. For example, if the recording medium is mounted to the portable telephone within the predetermined time period, and that at the same position, the operation from Step S430 may be performed.

(17) In the third embodiment, registration of history information may be performed at regular time intervals. In this case, the history information recording unit owns a timer function for setting a time at which history information is written regularly. After history information is written and the time set in the timer function has elapsed, judgment is performed as to whether or not a mounting-detect signal is received from the detection unit. If receiving a mounting-detect signal, the recording medium acquires date/time information and position information from the portable telephone, and with use of the acquired pieces of information, generates history information, and registers the generated history information to the history information table. The category information of the history information may be "mounting", or may be information indicating that the registration of history information is performed by a regular inspection, such as "regular".

In addition, after registration of history information, the registered history information is compared with the history information registered last time, for judging whether or not an input password should be received. If the judgment is affirmative, an input password is received, and correctness of the user is judged. If the user is judged to be a correct user, the operation from Step S430 in FIG. 23 may be performed. In the alternative, only judgment as to the correctness of the user may be performed, and as for the accessible processes, the already stored information may continue to be used. In this case, comparison of history information may be performed using only the position information.

(18) Steps S70-S83 of the first embodiment shown in FIG. 7 are not essential steps. If there is no authentication information that matches the received user information, the steps after Step S70 may be omitted, or even Step S70 and thereafter may be omitted.

Furthermore, in FIG. 16 which is for the second embodiment, steps S225-S250 are performed when there is no authentication information that matches the received user information. However, the present invention is not limited to this. If there is no such authentication information, the steps after Step S225 may be omitted, or even Step S225 and thereafter may be omitted. Furthermore, Step S250 is not essential, and may be omitted.

Furthermore, in FIG. 23 which is for the third embodiment, Step S425 is not essential and may be omitted. Furthermore in FIG. 24, if there is no authentication that matches the received user information, Steps S455 to S480 are performed. However, the present invention is not limited to such, and the steps after Step S455 may be omitted, or even Step S455 may be omitted. In addition, Step S480 is not essential and may be omitted.

(19) At Step S75 of FIG. 7 which is for the first embodiment, if there is no authentication-unnecessary number, the operation ends there. However, the present invention is not limited to such. If there is no authentication-unnecessary number, the process-in-use information stored in the process-name storage area may be used to control so that the process of the process name registered in the process-in-use information is made inaccessible.

In addition, if there is no authentication information at Step S55, it is also possible to perform Step S70, then control so that the process for the process name registered in the process-in-use information is made inaccessible with use of the process-in-use information stored in the process-name storage area, then end the operation. Alternatively, only the aforementioned control may be performed.

(20) Likewise, at Step S230 of FIG. 16 which is for the second embodiment, if there is no authentication-unnecessary number, control may be performed so that the process for the process name registered in the process-in-use information is made inaccessible, with use of the process-in-use information stored in the process-name storage area.

In addition, if there is no authentication information at Step S215, it is also possible to perform Step S225, then control so that the process for the process name registered in the process-in-use information is made inaccessible with use of the process-in-use information stored in the process-name storage area, then end the operation. Alternatively, only the aforementioned control may be performed.

In addition, at Step S240 of FIG. 16 which is for the second embodiment, if there is no process information, a message is output then the authentication operation ends. But the present invention is not limited to such, and another structure is also possible in which a message is output, and control is performed so that the process for the process name registered in the process-in-use information is made inaccessible with use of the process-in-use information registered in the process-name storage area, and the operation ends. In the alternative, if there is a set of a first number and a second number that corresponds to the set of the communication number acquired at the selection unit and the authentication-unnecessary number, access rights are set to the process for the process name registered in the process information that corresponds to the aforementioned set of the first number and the second number, so as to make the process accessible.

Furthermore, if there is no set of the first number and the second number that corresponds to the communication number and the authentication-unnecessary number, the following operation may be performed.

If there is a set of the first number and the second number that corresponds to a set of a communication number that corresponds to the communication information "N.A." and the authentication-unnecessary number, access rights are set to the process for the process name registered in the process information that corresponds to the set of the first number and the second number, so that the process is made accessible. If there is no such set of the first number and the second number, control is performed so that the process for the process name registered in the process-in-use information is made inaccessible, with use of the process-in-use information stored in the process-name storage area, then the operation ends.

(21) At step S420 of FIGS. 23 and 24 for the third embodiment, if the password is judged not to be correct, a message is output and the authentication operation ends. However, the present invention is not limited to this. An other structure is also possible in which, after a message is output, control is performed so that the process for the process name registered in the process-in-use information is made inaccessible with use of the process-in-use information stored in the process-name storage area, then the operation ends.

In addition, at Step S460, the same operation may be performed as that performed at Step S230 in the aforementioned modification example (20). At Step S445, the same operation may be performed as that performed at Step S215 in the aforementioned modification example (20). In addition, at Step S470, the same operation may be performed as that performed at Step S240 in the aforementioned modification example (20).

(22) In the aforementioned modification examples (19), (20), and (21), in controlling so that the process for the process name registered in the process-in-use information is made inaccessible, the process-in-use information stored in the process-name storage area may be deleted after the process has been made inaccessible, so that there will be nothing stored in the process-name storage area.

(23) In the first embodiment, the storage area has two tables, an authentication information table, and a process information table. However, not limited to such, the first embodiment may have a structure in which the storage area has only one table that has both corresponding authentication information and process information.

Here, one example of such a table is shown in FIG. 26. Each item therein is the same as that in the first embodiment, therefore will not be detailed here.

Likewise, in the second and third embodiments, the storage area has an authentication information table, a process information table, and a communication information table. However, not limited to such, the three tables may be integrated into one table.

Here, one example of such a table is shown in FIGS. 27 and 28. FIG. 27 has only one piece of communication information, and FIG. 28 has a plurality of pieces of communication information. Each item therein is the same as those in the second and third embodiments, therefore will not be detailed here.

(24) As for the communication function described in the second and third embodiments, each function to be included therein such as a calling function, an electric mail function, and a call-reception function, may be registered individually. In the alternative, a communication number and an authentication number may be set to correspond to the content of the function. Further, it is possible to set a limit for the calling bill in using the communication function, so as to correspond a communication number and an authentication number, to the limit.

Furthermore, in the electronic commerce function, a communication number and an authentication number may be set according to the goods to be dealt with, or to the prices thereof.

Furthermore, in the second and third embodiments, functions that users can use are a memory function, a game function, a communication function, and an electronic commerce function. However, not limited to such, the functions may include others as long as they are accessible through the recording medium.

For example, it is possible to include an electric money function therein, and accordingly include "electric money function" in the process information table as process information item. At that time, it is possible to set a communication number and an authentication number for each function included in the electric money function, such assaying, balance-inquiry, and withdrawal.

Furthermore, it is possible to include a navigation function therein, and accordingly include "navigation function" in the process information table as process information item.

In addition, in the first embodiment, the processes that the user can use are the memory A, the memory B, and the game. However not limited to such, the processes may include others as long as they are accessible through the recording medium.

In addition, in the first, second, and third embodiments, the functions accessible to the user that are stored in the storage area of the recording medium have been stored at the time of purchase of the recording medium. However, not limited to such, the functions may be registered in the storage area at the time of setting the purchase information after the purchase.

(25) The present invention only permits use of the process for the process name acquired in authentication. However, not limited to such, the present invention may have a structure of including processes whose process names are acquired at the time of authentication, as processes that are allowed to be used, in addition to the processes that have been allowed to be used prior to starting of the authentication.

The following shows one example of a realization method in a case when process information storing process names corresponds to authentication information. The recording medium receives from the portable telephone process-add information that instructs to add processes to be allowed. Upon receiving the process-add information, the recording medium requests the portable telephone to input user information. The recording medium acquires an authentication number of the authentication information that matches the user information received from the portable telephone, and acquires process information that corresponds to the acquired authentication number. Then, the process whose process name has been registered in the acquired process information will be allowed to be used.

The following shows one example of a realization method in a case when process information storing process names corresponds to a set of communication information and authentication information. The recording medium stores therein the communication number selected in the last authentication. The recording medium, upon receiving process-add information from the portable telephone, requests the portable telephone to select communication information, then judges whether or not the communication information received from the portable telephone matches the communication information selected in the last authentication. If the two pieces of communication information are judged to match each other, the recording medium requests the portable telephone to input user information. The recording medium then acquires an authentication number for the authentication information that matches the user information received from the portable telephone, and acquires process information that corresponds to the set of the acquired authentication number and a communication number. Then, the process whose process name has been registered in the acquired process information will be allowed to be used. If the two pieces of communication information are judged not to match each other, the operation ends.

(26) In the third embodiment, date, time, and minute are used to show the time of mounting in history information. However, date, hour, minute, and second may be used therefore.

Moreover, the predetermined time interval stored in the recording medium is 30 minutes. However, not limited to such, it may be other time intervals. In addition, the time interval may be in a unit of any one of hour, minute, and second.

In addition, an external terminal is used to register a predetermined time interval that is to be stored in the recording medium. However, the registration may be performed from the portable telephone.

In addition, the position information is registered as the history information in a unit of municipalities. However, the value of its longitude and latitude may be used in registration.

At this time, judgment as to whether or not the positions of mounting of the recording medium to the portable telephone are the same is based on the value of longitude and latitude of this time and the value of last time. If there is no difference there between, the positions may be judged to be the same. Or, it is also possible to calculate a distance of moving with use of the value of longitude and latitude of this time and the value of last time, and to judge that the positions are the same if the distance of moving is within a predetermined distance. In this case, the recording medium has to store the value of distance of moving that is to be considered the same position of mounting.

(27) In the present invention, the reference value which is the basis of judgment as to whether or not the fingerprint information matches the authentication information is 80%. However, other reference values may be used.

(28) In the present invention, the process for the process name that corresponds to the authentication-unnecessary number (herein after "authentication-unnecessary process") is allowed when there is no authentication information that matches the user information received in authentication. However, not limited to this, the recording medium may allow use of an authentication-unnecessary process when receiving from the portable telephone information instructing to use the authentication-unnecessary process.

In the following, an example of a realization method in this case is described with use of the first embodiment. The recording medium, upon receiving authentication-start information, outputs, to the portable telephone, information for inquiring about whether an authentication-unnecessary process should be used. The recording medium then judges whether or not information received from the portable telephone is information instructing to use an authentication-unnecessary process. If the information is judged to instruct the use of an authentication-unnecessary process, the recording medium permits use of the authentication-unnecessary process. If the information is judged not to instruct the use of an authentication-unnecessary process, the recording medium outputs input-means information to the portable telephone. The operations hereafter are the same as those of the first embodiment, therefore will not be detailed here.

(29) In the present invention, it is also possible to enable use of an authentication-unnecessary process every time the recording medium is mounted to the portable telephone.

(30) In the present invention, the recording medium receives user information, and then permits use of a process that corresponds to authentication information that matches the received user information. However, the procedure is not limited to such, and it is also possible to have a procedure in which process information for the process that the user wants to use is received, and after that, the corresponding authentication information is received, which is then used for authentication.

The following shows one example of a realization method in a case when the process information corresponds to authentication information.

After receiving authentication-start information, the recording medium outputs to the portable telephone a list of process information registered in the process information table. The portable telephone, upon receiving the list of process information, displays the received list of process information, receives from the process information of his choice, and outputs the received process information to the recording medium. The recording medium acquires the authentication number that corresponds to the received process information, and judges whether or not the acquired authentication number is an authentication-unnecessary number. If it is judged to be an authentication-unnecessary number, the recording medium permits use of the process corresponding to the process information received from the portable telephone, without performing authentication. If it is judged not to be an authentication-unnecessary number, the recording medium requests the portable telephone to input user information that corresponds to the content of the authentication information for the acquired authentication number, then receives input of user information from the portable telephone. For example, if the content of the authentication information that corresponds to the acquired authentication number is fingerprint information, the recording medium requests input of fingerprint information. If the content thereof is character information, the recording medium requests input of character information. If the content thereof is both character information and fingerprint information, the recording medium requests input of both character information and fingerprint information.

The following shows one example of a realization method in a case when the process information corresponds to communication information and authentication information.

After receiving authentication-start information, the recording medium further receives number-to-be used information from the portable telephone. Next, the recording medium outputs to the portable telephone a list of process information registered in the process information table, and performs the procedure described above.

(31) In the present invention, use of a process is allowed at the time of authentication by setting an access rights to the process for the acquired process name. However, not limited to this, it is also possible to control in the following way. In advance, all the processes whose process name is registered in the process information are assigned access right so that they are accessible. The recording medium acquires process information according to the authentication content. After authentication, the recording medium receives, from the portable telephone, information instructing use of the process, judges whether or not the process to be used is a process whose process name has been registered in the process information acquired in authentication, and enables use of the process if the judgment is affirmative.

(32) In the present invention, if there are more than a piece of authentication information that match a received piece of user information, it is possible to set access rights to the corresponding number of processes, whose process names have being registered in pieces of process information that each correspond to each of the pieces of authentication information.

To explain the above, an example is taken where the recording medium has two pieces of fingerprint information taken from the same finger (herein after "first fingerprint information" and "second fingerprint information"). In this case, if the fingerprint information received in authentication matches both the first fingerprint information and the second fingerprint information, the authentication unit permits use of both the process for the process name registered in authentication information that corresponds to the first fingerprint information, and the process for the process name registered in authentication information that corresponds to the second fingerprint information.

(33) The present invention may be the methods described above. Furthermore, these methods may be a computer program that enables such a method to be executed by a computer. Moreover the present invention may be a digital signal comprised of the computer program.

In addition, the present invention may be a computer-readable recording medium such as a flexible disk, a hard disk, a CD-ROM, an MO, a DVD, a DVD-ROM, a DVD-RAM, a BD (Blu-ray Disc), and a semiconductor memory, that records thereon the aforementioned computer program or the digital signal. In addition, the present invention may be the aforementioned computer program or the digital signal, recorded on these recording media.

In addition, the present invention may be the aforementioned computer program or the digital signal, transmitted through a network and the like, represented by an electric communication circuit, a radio circuit, a cable communication circuit, and the Internet.

Furthermore, the present invention may be a computer system equipped with a microprocessor and a memory, where the memory stores thereon the aforementioned computer program, and the microprocessor performs according to the aforementioned computer program.

In addition, the present invention may be executed by an independent another computer system, by transmitting the aforementioned program or the digital signal recorded on the recording medium, or by transmitting the aforementioned program or the digital signal through the aforementioned network and the like.

(34) The present invention may be a combination of some of the described embodiments and the modification examples.

5. Summary

As described in the above sections, the present invention is a system of preventing unauthorized use of a recording medium which is mountable to a terminal device ("recording-medium unauthorized use prevention system"). This recording-medium unauthorized use prevention system is characterized by having a first storage area, a second storage area, an authentication unit, and a process unit, the first storage area storing thereon a plurality of pieces of authentication information used in determining whether or not use of the recording medium should be allowed, the second storage area storing thereon process means corresponding to the authentication information stored in the first storage area, the authentication unit performing authentication using the authentication information and user information that the owner of the recording medium has, and the process unit executing the process means according to the content of authentication performed by the authentication unit.

Here, the system may further have a third storage area for storing thereon communication information for using the communication function of the terminal device, and the process unit may execute the process means that corresponds to the communication information and the authentication content of the authentication unit.

Here, the system may further have a fourth storage area for storing thereon a plurality of pieces of communication information, and a selection unit that selects a piece of communication information that the user desires, and the process unit may execute the process means that corresponds to the communication information selected by the selection unit and the authentication content of the authentication unit.

Here, the system may further have a detection unit that detects mounting/dismounting of the recording medium to/from the terminal device, and authentication by the authentication unit may be performed, if the recording medium is to be used again after the detection unit has detected dismounting of the recording medium from the terminal device.

Here, the system may further have an authentication-information setting unit that sets the authentication information, and the authentication information set by the authentication-information setting unit may be stored in the first storage area.

Here, the system may further have a process-means setting unit that sets the process means, and the process means set by the process-means setting unit may be stored in the second storage area.

Here, the system may further have a communication-information setting unit that sets the communication information, and the communication information set by the communication-information setting unit may be stored in the third or fourth storage area.

Moreover, the present invention is a recording medium that is used in the system and is mountable to a terminal device. This recording medium is characterized by including at least a first storage area and a second storage area, the first storage area storing thereon a plurality of pieces of authentication information used for determining whether the recording medium can be used, and the second storage area storing thereon pieces of process means that are in correspondence with the pieces of authentication information.

Here, the recording medium may further have a third storage area storing thereon communication information for using the communication function of the terminal device.

Here, the recording medium may further have a fourth storage area storing thereon a plurality of pieces of communication information for using the communication function of the terminal device.

Here, the recording medium may further have an authentication unit that performs authentication using the authentication information and user information that the owner of the recording medium has.

Here, the recording medium may further have a detection unit that detects mounting/dismounting of the recording medium to/from the terminal device, and authentication by the authentication unit may be performed, if the recording medium is to be used again after the detection unit has detected dismounting of the recording medium from the terminal device.

In addition, the present invention is a terminal device which is used in the system and to which a recording medium is mountable. This terminal device is characterized by having at least a first storage area, a second storage area, an authentication unit, and a process unit, the first storage area storing thereon a plurality of pieces of authentication information used in determining whether or not use of the recording medium should be allowed, the second storage area storing thereon process means corresponding to the authentication information stored in the first storage area, the authentication unit performing authentication using the authentication information and user information that the owner of the terminal device has, and the process unit executing the process means according to the content of authentication performed by the authentication unit.

Here, the terminal device may further have a fourth storage area storing thereon a plurality of pieces of communication information for using the communication functions of the terminal device, and a selection unit that selects a piece of communication information that the user desires out of the pieces of communication information stored in the fourth storage area.

In addition, the present invention is a method of preventing unauthorized-use of a recording medium that is mountable to a terminal device. This unauthorized-use prevention method is characterized by having: a first storing step of storing a plurality of pieces of authentication information for determining whether or not use of the recording medium should be allowed; a second storing step of storing process means corresponding to the authentication information; an authentication step of performing authentication using the authentication information and user information that the owner of the recording medium has; and a process step of executing the process means according to the content of authentication performed at the authentication step. Furthermore, the present invention is a recording-medium unauthorized use prevention system for executing this method.

Furthermore, the present invention is a method of preventing unauthorized-use of a recording medium that is mountable to a terminal device. This method is characterized by having: a first storing step of storing a plurality of pieces of authentication information for determining whether or not use of the recording medium should be allowed; a second storing step of storing pieces of process means corresponding to the pieces of authentication information; a third storing step of storing communication information for using the communication function of the terminal device; an authentication step of performing authentication using the authentication information and user information that the owner of the recording medium has; and a process step of executing the process means according to the communication information and the content of authentication performed at the authentication step. Furthermore, the present invention is a recording-medium unauthorized use prevention system that executes this method.

Furthermore, the present invention is a method of preventing unauthorized use of a recording medium that is mountable to a terminal device. This method is characterized by having: a first storing step of storing a plurality of pieces of authentication information for determining whether or not use of the recording medium should be allowed; a second storing step of storing pieces of process means corresponding to the authentication information; a fourth storing step of storing a plurality of pieces of communication information for using the communication function of the terminal device; a selection step of selecting a piece of communication information that the user desires out of the pieces of communication information stored at the fourth storing step; an authentication step of performing authentication using the authentication information and user information that the owner of the recording medium has; and a process step of executing the process means according to the piece of communication information selected at the selection step and the content of authentication performed at the authentication step. Furthermore, the present invention is a recording-medium unauthorized use prevention system that executes this method.

6. The Effects of the Present Invention

As described in the above, the present invention is a portable recording medium including: a storage unit which stores therein storage authentication information that authenticates a user, and has an area that corresponds to the storage authentication information; a judgment unit operable to judge whether or not to perform authentication; a reception unit operable to receive reception authentication information that authenticates a user, if the judgment unit judges affirmative; an authentication unit that is tamper-resistant and is operable to judge whether or not the received reception authentication information matches the storage authentication information; and a process unit operable to permit use of the area if the reception authentication information is judged to match the storage authentication information.

According to the stated structure, the recording medium has an authentication unit that is tamper-resistant. Because of being tamper-resistant, the authentication unit is prevented from being decoded or tampered by third parties. According to this, the recording medium prevents unauthorized use of areas included therein by third parties.

Here, the storage unit may further store therein other storage authentication information different from the storage authentication information, and have another area that corresponds to the other storage authentication information, the authentication unit, instead of judging whether or not the received reception authentication information matches the storage authentication information, may judge whether or not the received reception authentication information matches the storage authentication information, and judge whether or not the received reception authentication information matches the other storage authentication information, and the process unit may further permit use of the other area, if the reception authentication information is judged to match the other storage authentication information.

According to the stated structure, the recording medium stores thereon other storage authentication information different from the storage authentication information, and has another area that corresponds to the other storage authentication information, and so it becomes possible to permit, if the received reception authentication information is judged to match the storage authentication information, use of the area corresponding thereto, and to permit, if the received reception authentication information is judged to match the other storage authentication information, use of the other area corresponding thereto.

Here, the recording medium may further include a detection unit operable to detect that the recording medium is mounted to a terminal device, where the judgment unit may judge that authentication is to be performed, after the detection unit has detected the mounting.

According to the stated structure, the recording medium is able to judge whether or not to perform authentication, if the mounting thereof to an external device is detected.

Here, the recording medium may further include a recording unit operable to record, when the detection unit has detected the mounting, first history information that indicates the mounting, the recording unit recording in advance second history information that indicates another mounting that occurred prior to the mounting, where the judgment unit may judge whether or not to perform authentication, using the first history information and the second history information.

According to the stated structure, the judgment unit is able to perform judgment whether or not to perform authentication, with use of the first and second history information.

Here, the first history information may have first date/time information that shows date and time in which the mounting is detected, the second history information may have second date/time information that shows date and time in which the other mounting is detected, and the judgment unit may judge that authentication is to be performed, if a difference in date and time between the first date/time information and the second date/time information is no smaller than a predetermined value.

According to the stated structure, the judgment unit is able to judge whether or not to perform authentication, if the difference in date and time is no smaller than a predetermined value.

Here, the first history information may have first position information that shows a position at which the mounting is detected, the second history information may have second position information that shows a position at which the other mounting is detected, and the judgment unit may judge that authentication is to be performed, if a difference in position between the first position information and the second position information is no smaller than a predetermined value.

According to the stated structure, the judgment unit is able to judge whether or not to perform authentication, if the difference in position is no smaller than a predetermined value.

Here, the storage authentication information may be one of first character information, first biological information, and first combination information, the first character information comprising at least one number, letter, and symbol, the first biological information showing biological characteristics of the user, and the first combination information comprising first character information and first biological information. Further, the reception authentication information may have second character information, second biological information, and second combination information. The second character information comprising at least one number, letter, and symbol, the second biological information showing biological characteristics of the user, and the second combination information comprising second character information and second biological information, and the authentication unit, when the received reception authentication information is the second character information, may judge whether or not the second character information matches the first character information, and when the received reception authentication information is the second biological information, judge whether or not the second biological information matches the first biological information, and when the received reception authentication information is the second combination information, judge whether or not all information included in the second combination information matches all information included in the first combination information.

According to the stated structure, the authentication unit is able to perform judgment as to one of: whether or not the first character information matches the second character information; whether or not the first biological information matches the second biological information; and whether or not the first combination information matches the second combination information.

Here, the first biological information and the second biological information may be one of fingerprint information, voice print information, iris information, face-outline information, and DNA information, the fingerprint information showing characteristics of the user's fingerprint pattern, the voice print information showing characteristics of the user's voice print, the iris information showing characteristics of the user's iris, the face-outline information showing characteristics of outline of the user's face, and the DNA information showing characteristics of the user's DNA.

According to the stated structure, the first biological information and the second biological information may be one of fingerprint information, voice print information, iris information, face-outline information, and DNA information.

Here, the recording medium may be assigned a telephone number that the terminal device uses in communication, the storage unit may further store therein communication information that represents the telephone number, the area may further correspond to the communication information, and the process unit may further permit use of the area that corresponds to the communication information.

According to the stated structure, the area of the storage unit is further be corresponded to communication information, and the process unit is further able to permit use of the area corresponded to the communication information.

Here, the recording medium may further include a selection unit operable to receive selection of the communication information, where the process unit may further permit use of the area that corresponds to the communication information selected through the selection unit.

According to the stated structure, the communication information is able to be selected by the selection unit, and the process unit is further able to permit use of the area corresponded to the communication information that has been received by the selection unit.

Here, the recording medium may further include a setting unit operable to receive the storage authentication information and to write to the storage unit the received storage authentication information in correspondence with the area of the storage unit.

According to the stated structure, storage authentication information is able to correspond to the area of the storage unit, before being stored.

Here, the setting unit may further receive communication information that represents a telephone number assigned to the recording medium, and write to the storage unit the received communication information in correspondence with the area.

According to the stated structure, the setting unit is further able to store communication information in correspondence with the area of the storage unit.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

The invention claimed is:

1. A portable recording apparatus for connecting to a terminal apparatus and for detecting times and places of connections, said portable recording apparatus comprising:
- a storage unit configured for prestoring first authentication information relating to and given by an original user, and having a first user area corresponding to the first storage authentication information;
- a judgment unit configured for, upon detection of a connection of said portable recording apparatus to the terminal apparatus, obtaining (i) a time difference, which is a difference between a time at which the connection was detected and a prestored time at which a prior connection was detected, the time at which the connection was detected being obtained from the terminal apparatus, and the prestored time at which the prior connection was detected being a time previously obtained, and (ii) a place difference, which is a difference between a place at which the connection was detected and a prestored place at which a prior connection was detected, the place at which the connection was detected being obtained from the terminal apparatus, and the prestored place at which the prior connection was detected being a place previously obtained, and for judging whether or not one or both of the obtained time difference and the obtained place difference is greater than or equal to a corresponding predetermined value;
- a reception unit configured for requesting and receiving authentication information from a current user if said judgment unit judges that one or both of the obtained time difference and the obtained place difference is greater than or equal to the corresponding predetermined value;
- a tamper-resistant authentication unit configured for authenticating the received authentication information of the current user based on the prestored first authentication information; and
- a permission unit configured for permitting use of the first user area to the current user if (i) said tamper-resistant authentication unit authenticates the received authentication information of the current user based on the first authentication information, or (ii) said judgment unit judges that one or both of the obtained time difference and the obtained place difference is not greater than or equal to the corresponding predetermined value.

2. The portable recording apparatus of claim 1, wherein said tamper-resistant authentication unit is configured for determining whether or not the received authentication information of the current user matches the first authentication information, and for authenticating the current user if the received authentic information of the current user matches the first authentication information.

3. The portable recording apparatus of claim 1, wherein:
- said storage unit is configured for storing second authentication information which (i) is different from the first authentication information, and (ii) relates to and is given by the original user, and includes a second user area corresponding to the second authentication information;
- said tamper-resistant authentication unit is configured for judging whether or not the received authentication information of the current user matches the second authentication information, and for authenticating the current user if the received authentication information of the current user matches the second authentication information; and
- said permission unit is configured for permitting use of the second user area to the current user if (i) said tamper-resistant authentication unit authenticates the received authentication information of the current user based on the second authentication information, or (ii) said judgment unit judges that one or both of the obtained time difference and the obtained place difference is not greater than or equal to the corresponding predetermined value.

4. The portable recording apparatus of claim 1, wherein said judgment unit includes:
- a history storage subunit configured for prestoring connection history information, which is information indicating one or both of (i) the prestored prior connection time, and (ii) the prestored prior connection place;
- a connection detection subunit configured for detecting the connection to the terminal apparatus;
- an information obtaining subunit configured for, when the connection to the terminal apparatus is detected by said connection detection subunit, obtaining current connection information from the terminal apparatus, which is information indicating one or both of (i) the current connection time, and (ii) the current connection place; and
- an information judgment subunit configured for obtaining a time difference and/or a place difference using the connection history information and the current connection information, and for judging whether or not the time difference or the place difference is greater than or equal to a corresponding predetermined value.

5. The portable recording apparatus of claim 4, wherein:
- the connection history information is information which indicates a time at which a most recent prior connection to the terminal apparatus was detected;
- the current connection information is information which indicates a time at which the current connection to the terminal apparatus was detected; and said information judgment unit is configured for judging whether or not the time difference between the time indicated by the connection history information and the time indicated by the current connection information is greater than or equal to the predetermined value.

6. The portable recording apparatus of claim 4, wherein:
the connection history information is information which indicates a place at which a most recent prior connection to the terminal apparatus was detected;
the current connection information is information which indicates a place at which the current connection to the terminal apparatus was detected; and
said information judgment unit is configured for judging whether or not the place difference between the place indicated by the connection history information and the place indicated by the current connection information is greater than or equal to the predetermined value.

7. The portable recording apparatus of claim 4, wherein:
the first authentication information is one of (i) a first set of one or more characters, (ii) biological characteristics of the original user, or (iii) a combination of the first set of characters and the biological characteristics of the original user; and
the received authentication information of the current user is one of (i) a second set of one or more characters, (ii) biological characteristics of the current user, or (iii) a combination of the second set of characters and the biological characteristics of the current user.

8. The portable recording apparatus of claim 7, wherein:
the biological characteristics of the original user includes information which is one of (i) fingerprint information representing characteristics of the original user's fingerprint pattern, (ii) voiceprint information representing characteristics of the original user's voiceprint, (iii) iris information representing characteristics of the original user's iris, (iv) face-outline information relating to characteristics of an outline of the original user's face, or (v) DNA information relating to characteristics of the original user's DNA; and
the biological characteristics of the current user includes information which is one of (i) fingerprint information representing characteristics of the current user's fingerprint pattern, (ii) voiceprint information representing characteristics of the current user's voiceprint, (iii) iris information representing characteristics of the current user's iris, (iv) face-outline information relating to characteristics of an outline of the current user's face, or (v) DNA information relating to characteristics of the current user's DNA.

9. The portable recording apparatus of claim 1, wherein:
said portable recording apparatus includes an assigned telephone number which is an identifier of the terminal apparatus connected thereto;
said storage unit is configured for storing communication information which is information representing the assigned telephone number;
the first user area corresponds to the communication information;
said reception unit is configured for receiving a specification of a telephone number when said judgment unit judges that one or both of the obtained time difference and the obtained place difference is greater than or equal to the corresponding predetermined value; and
said permission unit is configured for permitting, to the current user, use of the first user area corresponding to both the first authentication information and the communication information representing the telephone number of the received specification if (i) said tamper-resistant authentication unit authenticates the received authentication information of the current user based on the first authentication information, or (ii) said judgment unit judges that one or both of the obtained time difference and the obtained place difference is not greater than or equal to the corresponding predetermined value.

10. The portable recording apparatus of claim 9, further comprising a setting unit configured for receiving the first authentication information and the communication information from the original user, and for writing, to said storage unit, the first authentication information and the communication information in correspondence with the first user area of said storage unit.

11. The portable recording apparatus of claim 1, further comprising a setting unit configured for receiving the first authentication information from the original user, and for writing to said storage unit the first storage authentication information in correspondence with the first user area of said storage unit.

12. The portable recording apparatus of claim 1, wherein:
said judgment unit includes:
a first judgment subunit configured for, upon detection of the connection to the terminal apparatus, judging whether or not the time difference is greater than or equal to a first value; and
a second judgment unit configured for, when said first judgment unit judges that the time difference is not greater than or equal to the first value, judging whether or not the place difference is greater than or equal to a second value; and
said tamper-resistant authentication unit is configured for requesting, from the current user, the authentication information when at least one of said first judgment unit judges that the time difference is greater than or equal to the first value or said second judgment unit judges that the place difference is greater than or equal to the second value.

13. A system including a portable recording apparatus and a terminal apparatus and for preventing unauthorized use of said portable recording apparatus, wherein:
said portable recording apparatus is for connecting to said terminal apparatus and for detecting times and places of connections, and said portable recording apparatus comprises:
a storage unit configured for prestoring first authentication information relating to and given by an original user, and having a first user area corresponding to the first storage authentication information;
a judgment unit configured for, upon detection of a connection of said portable recording apparatus to said terminal apparatus, obtaining (i) a time difference, which is a difference between a time at which the connection was detected and a prestored time at which a prior connection was detected, the time at which the connection was detected being obtained from said terminal apparatus, and the prestored time at which the prior connection was detected being a time previously obtained, and (ii) a place difference, which is a difference between a place at which the connection was detected and a prestored place at which a prior connection was detected, the place at which the connection was detected being obtained from said terminal apparatus, and the prestored place at which the prior connection was detected being a place previously obtained, and for judging whether or not one or both of the obtained time difference and the obtained place difference is greater than or equal to a corresponding predetermined value;

a reception unit configured for requesting and receiving authentication information from a current user if said judgment unit judges that one or both of the obtained time difference and the obtained place difference is greater than or equal to the corresponding predetermined value;

a tamper-resistant authentication unit configured for authenticating the received authentication information of the current user based on the prestored first authentication information; and a permission unit configured for permitting use of the first user area to the current user if (i) said tamper-resistant authentication unit authenticates the received authentication information of the current user based on the first authentication information, or (ii) said judgment unit judges that one or both of the obtained time difference and the obtained place difference is not greater than or equal to the corresponding predetermined value; and said terminal apparatus comprises an input/output unit configured for receiving, as an input, the authentication information from the current user, and configured for outputting the received authentication information to said portable recording apparatus.

14. The system of claim 13, wherein said tamper-resistant authentication unit is configured for determining whether or not the received authentication information of the current user matches the first authentication information, and for authenticating the current user if the received authentic information of the current user matches the first authentication information.

15. The system of claim 13, wherein:
said storage unit is configured for storing second authentication information which (i) is different from the first authentication information, and (ii) relates to and is given by the original user, and includes a second user area corresponding to the second authentication information;

said tamper-resistant authentication unit is configured for judging whether or not the received authentication information of the current user matches the second authentication information, and for authenticating the current user if the received authentication information of the current user matches the second authentication information; and said permission unit is configured for permitting use of the second user area to the current user if (i) said tamper-resistant authentication unit authenticates the received authentication information of the current user based on the second authentication information, or (ii) said judgment unit judges that one or both of the obtained time difference and the obtained place difference is not greater than or equal to the corresponding predetermined value.

16. The system of claim 13, wherein said judgment unit includes:
a history storage subunit configured for prestoring connection history information, which is information indicating one or both of (i) the prestored prior connection time, and (ii) the prestored prior connection place;

a connection detection subunit configured for detecting the connection to said terminal apparatus;

an information obtaining subunit configured for, when the connection to said terminal apparatus is detected by said connection detection subunit, obtaining current connection information from said terminal apparatus, which is information indicating one or both of (i) the current connection time, and (ii) the current connection place; and an information judgment subunit configured for obtaining a time difference and/or a place difference using the connection history information and the current connection information, and for judging whether or not the time difference or the place difference is greater than or equal to a corresponding predetermined value.

17. The system of claim 16, wherein:
the connection history information is information which indicates a time at which a most recent prior connection to said terminal apparatus was detected;

the current connection information is information which indicates a time at which the current connection to said terminal apparatus was detected; and said information judgment unit is configured for judging whether or not the time difference between the time indicated by the connection history information and the time indicated by the current connection information is greater than or equal to the predetermined value.

18. The system of claim 16, wherein:
the connection history information is information which indicates a place at which a most recent prior connection to said terminal apparatus was detected;

the current connection information is information which indicates a place at which the current connection to said terminal apparatus was detected; and said information judgment unit is configured for judging whether or not the place difference between the place indicated by the connection history information and the place indicated by the current connection information is greater than or equal to the predetermined value.

19. The system of claim 13, wherein:
said portable recording apparatus includes an assigned telephone number which is an identifier of said terminal apparatus connected thereto;

said storage unit is configured for storing communication information which is information representing the assigned telephone number;

the first user area corresponds to the communication information;

said reception unit is configured for receiving a specification of a telephone number when said judgment unit judges that one or both of the obtained time difference and the obtained place difference is greater than or equal to the corresponding predetermined value; and said permission unit is configured for permitting, to the current user, use of the first user area corresponding to both the first authentication information and the communication information representing the telephone number of the received specification if (i) said tamper-resistant authentication unit authenticates the received authentication information of the current user based on the first authentication information, or (ii) said judgment unit judges that one or both of the obtained time difference and the obtained place difference is not greater than or equal to the corresponding predetermined value.

20. The system of claim 13, wherein:
said judgment unit includes:
a first judgment subunit configured for, upon detection of the connection to the terminal apparatus, judging whether or not the time difference is greater than or equal to a first value; and a second judgment unit configured for, when said first judgment unit judges that the time difference is not greater than or equal to the first value, judging whether or not the place difference is greater than or equal to a second value; and said tamper-resistant authentication unit is configured for requesting, from the current user, the authentication information when at least one of said first judgment unit judges that the time difference is greater than or equal to the first value or said second judgment unit judges that the place difference is greater than or equal to the second value.

21. A terminal apparatus for connecting to a portable recording apparatus and for detecting times and places of connections, said terminal apparatus comprising:

a storage unit configured for prestoring first authentication information relating to and given by an original user, and having a first user area corresponding to the first storage authentication information;

a judgment unit configured for, upon detection of a connection of the portable recording apparatus to said terminal apparatus, obtaining (i) a time difference, which is a difference between a time at which the connection was detected and a prestored time at which a prior connection was detected, the time at which the connection was detected being obtained from said terminal apparatus, and the prestored time at which the prior connection was detected being a time previously obtained, and (ii) a place difference, which is a difference between a place at which the connection was detected and a prestored place at which a prior connection was detected, the place at which the connection was detected being obtained from said terminal apparatus, and the prestored place at which the prior connection was detected being a place previously obtained, and for judging whether or not one or both of the obtained time difference and the obtained place difference is greater than or equal to a corresponding predetermined value;

a reception unit configured for requesting and receiving authentication information from a current user if said judgment unit judges that one or both of the obtained time difference and the obtained place difference is greater than or equal to the corresponding predetermined value;

a tamper-resistant authentication unit configured for authenticating the received authentication information of the current user based on the prestored first authentication information; and a permission unit configured for permitting use of the first user area to the current user if (i) said tamper-resistant authentication unit authenticates the received authentication information of the current user based on the first authentication information, or (ii) said judgment unit judges that one or both of the obtained time difference and the obtained place difference is not greater than or equal to the corresponding predetermined value.

22. The terminal apparatus of claim 21, wherein:

said storage unit is configured for storing second authentication information which (i) is different from the first authentication information, and (ii) relates to and is given by the original user, and includes a second user area corresponding to the second authentication information;

said tamper-resistant authentication unit is configured for judging whether or not the received authentication information of the current user matches the second authentication information, and for authenticating the current user if the received authentication information of the current user matches the second authentication information; and said permission unit is configured for permitting use of the second user area to the current user if (i) said tamper-resistant authentication unit authenticates the received authentication information of the current user based on the second authentication information, or (ii) said judgment unit judges that one or both of the obtained time difference and the obtained place difference is not greater than or equal to the corresponding predetermined value.

23. A method for using a portable recording apparatus, for connecting to a terminal apparatus, and for detecting times and places of connections, the portable recording apparatus including a storage unit configured for prestoring first authentication information relating to and given by an original user and having a first user area corresponding to the first authentication information and including a tamper-resistant authentication unit, said method comprising:

detecting a connection of the portable recording apparatus to the terminal apparatus;

obtaining (i) a time difference, which is a difference between a time at which the connection was detected and a prestored time at which a prior connection was detected, the time at which the connection was detected being obtained from the terminal apparatus, and the prestored time at which the prior connection was detected being a time previously obtained, and (ii) a place difference, which is a difference between a place at which the connection was detected and a prestored place at which a prior connection was detected, the place at which the connection was detected being obtained from the terminal apparatus, and the prestored place at which the prior connection was detected being a place previously obtained;

judging whether or not one or both of the obtained time difference and the obtained place difference is greater than or equal to a corresponding predetermined value;

requesting and receiving authentication information from a current user if said judging judges that one or both of the obtained time difference and the obtained place difference is greater than or equal to the corresponding predetermined value;

authenticating the received authentication information of the current user based on the prestored first authentication information; and permitting use of the first user area to the current user if (i) said authenticating authenticates the received authentication information of the current user based on the first authentication information, or (ii) said judging judges that one or both of the obtained time difference and the obtained place difference is not greater than or equal to the corresponding predetermined value.

24. A program stored on a computer-readable storage medium for using a portable recording apparatus, for connecting to a terminal apparatus, and for detecting times and places of connections, the portable recording apparatus including a storage unit configured for prestoring first authentication information relating to and given by an original user and having a first user area corresponding to the first authentication information and including a tamper-resistant authentication unit, said program causing a computer to execute a method comprising:

detecting a connection of the portable recording apparatus to the terminal apparatus;

obtaining (i) a time difference, which is a difference between a time at which the connection was detected and a prestored time at which a prior connection was detected, the time at which the connection was detected being obtained from the terminal apparatus, and the prestored time at which the prior connection was detected being a time previously obtained, and (ii) a place difference, which is a difference between a place at which the connection was detected and a prestored place at which a prior connection was detected, the place at which the connection was detected being obtained from the terminal apparatus, and the prestored place at which the prior connection was detected being a place previously obtained;

judging whether or not one or both of the obtained time difference and the obtained place difference is greater than or equal to a corresponding predetermined value;

requesting and receiving authentication information from a current user if said judging judges that one or both of the obtained time difference and the obtained place difference is greater than or equal to the corresponding predetermined value;

authenticating the received authentication information of the current user based on the prestored first authentication information; and permitting use of the first user area to the current user if (i) said authenticating authenticates the received authentication information of the current user based on the first authentication information, or (ii) said judging judges that one or both of the obtained time difference and the obtained place difference is not greater than or equal to the corresponding predetermined value.

25. The portable recording apparatus of claim 1, wherein:

said judgment unit is configured for judging whether the time difference is greater than or equal to a first predetermined value, and judging whether the place difference is greater than or equal to a second predetermined value; and when said judgment unit determines that the time difference is not greater than or equal to the first predetermined value and determines that the place difference is not greater than or equal to the second predetermined value, said reception unit requests the authentication information from the current user.

\* \* \* \* \*